US011595312B2

(12) United States Patent
Savarese et al.

(10) Patent No.: US 11,595,312 B2
(45) Date of Patent: Feb. 28, 2023

(54) MOBILE MANAGEMENT SYSTEM

(71) Applicant: MOBILE SONIC, INC., Seattle, WA (US)

(72) Inventors: Joseph T. Savarese, Edmonds, WA (US); Steven Heckt, Edmonds, WA (US); Michael E. Bryant, Bellevue, WA (US); Eric C. McNeill, Seattle, WA (US); Carter Smith, Redmond, WA (US); Elizabeth Kihslinger, De Forest, WI (US); Thomas Gunther Helms, Kent, WA (US); Camilla Keenan-Koch, Seattle, WA (US); Joseph G. Souza, Seattle, WA (US); Paul Hoover, Seattle, WA (US); S. Aaron Stavens, Auburn, WA (US); Christian E. Hofstaedter, Lansdale, PA (US); Jonathan Scott, Seattle, WA (US); Erik Olson, Seattle, WA (US); James Scott Simpkins, Sammamish, WA (US); Stephen Gregory Fallin, Bothell, WA (US); John Harvey Hillock, Bellevue, WA (US); Eivind Naess, Auburn, WA (US); Michael Lee Snyder, Seattle, WA (US); David Michael Mirly, Seattle, WA (US); Marius Lee, Redmond, WA (US); Glenn Patrick Aranas, Renton, WA (US); Norman C. Hamer, Shoreline, WA (US); Tridib Dutta, Snoqualmie, WA (US); Andrew James Hoover, Seattle, WA (US); Thomas A. Sweet, Snohomish, WA (US); Mark Anacker, Lake Forest Park, WA (US); An Phan, Tacoma, WA (US)

(73) Assignee: MOBILE SONIC, INC., Seattle, WA (US)

( * ) Notice: Subject to any disclaimer, the term of this patent is extended or adjusted under 35 U.S.C. 154(b) by 0 days.

(21) Appl. No.: 17/230,409

(22) Filed: Apr. 14, 2021

(65) Prior Publication Data

US 2021/0320871 A1 Oct. 14, 2021

Related U.S. Application Data

(60) Provisional application No. 63/009,830, filed on Apr. 14, 2020.

(51) Int. Cl.
*H04L 47/20* (2022.01)
*H04L 12/46* (2006.01)
(Continued)

(52) U.S. Cl.
CPC ............ *H04L 47/20* (2013.01); *G06N 20/00* (2019.01); *H04L 12/4641* (2013.01); *H04L 61/4511* (2022.05)

(58) Field of Classification Search
CPC . H04L 47/20; H04L 12/4641; H04L 61/1511; G06N 20/00
See application file for complete search history.

(56) References Cited

U.S. PATENT DOCUMENTS

| | | | |
|---|---|---|---|
| 6,193,152 | B1 | 2/2001 | Fernando et al. |
| 6,198,920 | B1 | 3/2001 | Doviak et al. |

(Continued)

OTHER PUBLICATIONS

Int'l Search Report (Form PCT/ISA/210) conducted in counterpart Int'l Appln. No. PCT/US2021/27305) (dated Aug. 24, 2021).

(Continued)

*Primary Examiner* — Cheikh T Ndiaye
(74) *Attorney, Agent, or Firm* — Greenblum & Bernstein, P.L.C.

(57) ABSTRACT

Mobile management method and system. The method includes receiving from an application on a client a DNS
(Continued)

query for a host name; retrieving reputation data associated with the host name from a local cache on the client; determining whether a policy associated with the host name and the reputation data associated with the host name exists; and one of: sending network flows one of: through a VPN tunnel to a server or out a local proxy on the client to a private or public network; or blocking the network flow based on the determined policy for the host name.

17 Claims, 80 Drawing Sheets

(51) Int. Cl.
*G06N 20/00* (2019.01)
*H04L 61/4511* (2022.01)

(56) References Cited

U.S. PATENT DOCUMENTS

| | | | |
|---|---|---|---|
| 6,347,340 | B1 | 2/2002 | Coelho et al. |
| 6,418,324 | B1 | 7/2002 | Doviak et al. |
| 6,826,405 | B2 | 11/2004 | Doviak et al. |
| 6,981,047 | B2 | 12/2005 | Hanson et al. |
| 7,136,645 | B2 | 11/2006 | Hanson et al. |
| 7,346,370 | B2 | 3/2008 | Spaur et al. |
| 7,574,208 | B2 | 8/2009 | Hanson et al. |
| 7,602,782 | B2 | 10/2009 | Doviak et al. |
| 7,778,260 | B2 | 8/2010 | Sturniolo et al. |
| 2002/0122394 | A1 | 9/2002 | Whitmore et al. |
| 2003/0017845 | A1 | 1/2003 | Doviak et al. |
| 2003/0120811 | A1 | 6/2003 | Hanson et al. |
| 2004/0170181 | A1 | 9/2004 | Bogdon et al. |
| 2004/0264402 | A9 | 12/2004 | Whitmore et al. |
| 2005/0002419 | A1 | 1/2005 | Doviak et al. |
| 2005/0223114 | A1 | 10/2005 | Hanson et al. |
| 2005/0223115 | A1 | 10/2005 | Hanson et al. |
| 2005/0237982 | A1 | 10/2005 | Pankajakshan et al. |
| 2006/0009213 | A1 | 1/2006 | Sturniolo et al. |
| 2006/0023676 | A1 | 2/2006 | Whitmore et al. |
| 2006/0046716 | A1 | 3/2006 | Hofstaedter et al. |
| 2006/0146825 | A1 | 7/2006 | Hofstaedter et al. |
| 2006/0187956 | A1 | 8/2006 | Doviak et al. |
| 2006/0203804 | A1 | 9/2006 | Whitmore et al. |
| 2007/0206591 | A1 | 9/2007 | Doviak et al. |
| 2009/0083835 | A1 | 3/2009 | Olson |
| 2009/0307522 | A1 | 12/2009 | Olson et al. |
| 2010/0046436 | A1 | 2/2010 | Doviak et al. |
| 2010/0057895 | A1* | 3/2010 | Huang ................ H04L 63/1483 709/222 |
| 2015/0201322 | A1 | 7/2015 | Kim et al. |
| 2016/0044054 | A1 | 2/2016 | Stiansen et al. |
| 2017/0325113 | A1 | 11/2017 | Markopoulou et al. |
| 2018/0077146 | A1* | 3/2018 | Lonas .................... G06N 5/022 |
| 2019/0372937 | A1* | 12/2019 | Song ..................... H04L 63/029 |
| 2020/0084241 | A1 | 3/2020 | Sinha et al. |
| 2019/0260801 | A1 | 8/2020 | Reddy et al. |

OTHER PUBLICATIONS

Int'l Written Opinion (Form PCT/ISA/237) conducted in counterpart Int'l Appln. No. PCT/US2021/27305) (dated Aug. 24, 2021).

* cited by examiner

Fig. 6
MOBILE
High Risk Traffic Audit

Fig. 12
MOBILE
Cellular Bandwidth Summary by Carrier

4400

{"startTime":"2021-02-04T11:24:35Z","sequence":123532337,"endTime":"2021-02-04T12:03:54Z","baseline":[],"discreteEvents":[{"time":"2021-02-04T11:24:35Z","fields":{"wifi.n11.txbytes":6144,"impRxPackets":10,"impTxBytes":60,"wifi.n11.rxbytes":4096,"app.unknown.flows":[{"passive":false,"lport":50776,"rx":0,"cat":[],"event":"Open","lip":"172.31.52.158","mobility":false,"prot":17,"passthrough":false,"ip":"10.199.2.11","rep":0,"pid":2,"tx":0,"port":53},{"passive":false,"lport":62709,"rx":0,"cat":[],"event":"Open","lip":"172.31.52.158","mobility":false,"prot":17,"passthrough":false,"ip":"10.199.2.11","rep":0,"pid":2,"tx":0,"port":53},{"passive":false,"lport":49905,"rx":0,"cat":[],"event":"Open","lip":"172.31.52.158","mobility":false,"prot":17,"passthrough":false,"ip":"10.199.2.11","rep":0,"pid":2,"tx":0,"port":53},{"passive":false,"name":"MOB-WP-AM1.qanmw.com", "lport":51334,"cat":[],"rx":0,"event":"Open", "lip":"172.31.52.158", "mobility":true,"prot":6,"ip":"10.199.20.55","passthrough":false,"rep":7000,"pid":2,"tx":0,"port":443}],"impRxBytes":2004,"wwan.pdp_ip.txbytes":1024,"impTxPackets":2}},{"time":"2021-02-04T11:24:51Z","fields":{"impRxBytesDecompressed":2287,"impRxPackets":14,"impRxBytesDecompressible":1258,"impTxBytesCompressed":6508,"impTxBytes":7028,"impRxBytes":1816,"impTxBytesCompressible":7558,"impTxPackets":17}},{"time":"2021-02-04T11:25:37Z","fields":{ wifi.n11.txbytes":16384,"impRxPackets":7,"impRxBytesDecompressible":48,"wifi.n11.rxbytes":2048,"impRxBytesDecompressed":57,"impRxDuplicateFrames":2,"impRxBytes":496,"app.unknown.flows":[{"passive":false,"lport":56867,"rx":94,"cat":[],"event":"Close","lip":"172.31.52.158","mobility":false,"prot":17,"passthrough":false,"ip":"10.199.2.11","rep":0,"pid":2,"tx":38,"port":53},{"passive":false,"lport":49905,"rx":145,"cat":[],"event":"Close","lip":"172.31.52.158","mobility":false,"prot":17,"passthrough":false,"ip":"10.199.2.11","rep":0,"pid":2,"tx":32,"port":53},{"passive":false,"lport":50776,"rx":222,"cat":[],"event":"Close","lip":"172.31.52.158","mobility":false,"prot":17,"passthrough":false,"ip":"10.199.2.11","rep":0,"pid":2,"tx":31,"port":53},{"lport":57592,"passive":false,"rx":166,"cat":[],"event":"Close","mobility":false,"lip":"172.31.52.158","prot":17,"passthrough":false,"ip":"10.199.2.11","rep":0,"pid":2,"tx":43,"port":53},{"lport":52999,"passive":false,"rx":182,"cat":[],"event":"Close","mobility":false,"lip":"172.31.52.158","prot":17,"passthrough":false,"ip":"10.199.2.11","rep":0,"pid":2,"tx":31,"port":53},{"lport":53396,"passive":false,"rx":197,"cat":[],"event":"Close","mobility":false,"lip":"172.31.52.158","prot":17,"passthrough":false,"ip":"10.199.2.11","rep":0,"pid":2,"tx":43,"port":53},{"lport":54332,"passive":false,"rx":56,"cat":[],"event":"Close","mobility":false,"lip":"172.31.52.158","prot":17,"passthrough":false,"ip":"10.199.2.11","rep":0,"pid":2,"tx":40,"port":53},{"lport":59786,"passive":false,"rx":60,"cat":[],"event":"Close","mobility":false,"lip":"172.31.52.158","prot":17,"passthrough":false,"ip":"10.199.2.11","rep":0,"pid":2,"tx":44,"port":53}]}}],"deltas":[{"time":"2021-0204T11:24:35Z", "fields": {"mobilityState":"Connected"}},{"time":"2021-02-04T11:42:51Z","fields":{"mobilityState": "Unreachable","battPercent":82}},{"time":"2021-02-04T11:53:13Z","fields": {"mobilityState": "Connected"}}]}

Fig. 46

MOBILE MANAGEMENT SYSTEM

CROSS REFERENCE TO RELATED APPLICATIONS

This application is a Nonprovisional Application claiming the benefit of U.S. Provisional Application No. 63/009,830 filed Apr. 14, 2020, the disclosure of which is expressly incorporated by reference herein in its entirety.

BACKGROUND OF THE INVENTION

1. Field of the Invention

The present invention relates to the field of network communications on mobile devices. More particularly, the present invention relates to the combined practices of Network Security, Network Control, Network Performance Management and Mobile Device Management.

Even more particularly, the present invention provides visibility and control for all network applications to expand the set of application traffic mobility clients can act upon to include traffic sent outside the VPN tunnel, on all platforms to apply policy and publish data for non-tunneled and tunneled traffic. The present invention also provides the ability to "bridge" DNS queries with the other packets that pertain to the resolved address and control all of those connections with name-based policy rules.

The present invention also provides the ability to process information of the network traffic through machine learning algorithms and use the results to control traffic with policy rules. More particularly, the present invention relates to aggregating the collected information using statistical algorithms and processing the aggregated information through Machine Learning algorithms to automatically detect abnormal data transfers. More particularly, the present invention relates to aggregating the collected information using statistical algorithms and processing the aggregated information through Machine Learning algorithms to automatically detect usage that is abnormal for a device's typical user. More particularly, the present invention relates to the usage of the machine learning algorithms of Variational Autoencoder, Undercomplete Autoencoder, and Overcomplete Autoencoder to process aggregated network traffic information without human supervision or pre-labeled data.

2. Discussion of Background Information

Within the last several decades, mobile enterprise workers using mobile computing devices have become commonplace. With the widespread adoption, many enterprises have realized the need for greater visibility and control of the network communications taking place on the mobile devices used by their mobile workers. Many enterprises have also realized the need for greater flexibility over the way in which policy rules that govern the treatment of network flows are expressed.

Moreover, until recently, companies have turned to evermore complex network monitoring systems in an attempt to cope. Such systems helped mitigate the problem by "scaling up" traditional methods, but still relied on statistical algorithms driven by human interpretation. As the number of computer applications relying on computer networks continued to multiply, that approach, just like the more traditional methods they were derived from, became too cumbersome for the network administrators that relied on them.

Historically, enterprises have turned to network performance management tools to help control the problems listed above. Unfortunately, most existing products in the marketplace were designed for wired networks and for wireless networks that are fully controlled by the enterprise. Also, most existing products that provide control over a network do so via centralized mechanisms—and these can represent bottlenecks or chokepoints that degrade network performance and user experience.

Recently, some VPN solutions have been used to provide the visibility and control of the mobile network communications for devices using public networks. But even here, these VPN solutions can only monitor and control network flows that are sent over the VPN tunnel and cannot do so for network flows that are configured to bypass the VPN tunnel.

Also, with the widespread adoption of mobile enterprise workers using mobile computing devices, enterprises have had to deal with scaling the administration of the rules that govern mobile network control and visibility. For example, in the case of a split tunneling rule (a rule that governs which network flows are sent over the VPN tunnel and which bypass the VPN tunnel), current industry practice is to define the rules based on network addresses, ports, or some other bit of information that is actually present in the packets of the network flow. However, it is often impractical for users of these systems to express split tunnel rules using network addresses. Often, the most natural way to express a split tunnel rule is using host names (i.e. send all xyz.com over the tunnel and send everything else outside the tunnel). And, as the size of a mobile workforce grows, the ability to easily express these types of rules or have the rules automatically created or applied by an AI engine becomes more and more important.

In the marketplace, many VPNs currently support the ability to define a set of search domains. By configuring these search domains, any name queries that match the configured search domain will be sent to the VPN and any that do not will bypass the VPN. One problem with this model is that the VPN loses visibility into any name queries that do not match the search domain. But any name queries that do match the search domain are specifically sent to the VPN's DNS servers rather than the name servers of the local network. An unfulfilled need exists to have visibility into all name queries from a mobile device while allowing, without requiring, that the name query be fulfilled by the name servers defined for the VPN itself.

The market has not yet been able to meet the needs for monitoring and controlling network communications from mobile devices when those network communications take place over public networks and which were not sent over the VPN tunnel to the protected enterprise network. Also, there is presently an unfulfilled need to support visibility into all name queries generated on a device, control to steer any name query either inside or outside the VPN tunnel, and control to apply the same policy (inside/outside VPN tunnel) to any subsequent network flow that uses the same address to which the name query resolved. Also, there is an unfulfilled need to monitor the data stream of network behavior collected on a mobile device for the purpose of automatically creating and applying customized network policy rules and alleviating the human of the burden of doing so.

In an effort to relieve overburdened network administrators some network monitoring systems have recently started incorporating "machine learning" algorithms. Machine learning (ML) algorithms, as the name implies, can "learn" patterns within a given set of data. Once "trained", a ML algorithm can be used to identify when a pattern repeats or when a subset of data does not conform to a recognized pattern, thus relieving network administrators from having to identify recognizable or anomalous data patterns manually.

Currently there are still big challenges to applying ML algorithms, with the most significant being the data required to train them. ML algorithms require copious amounts of data and most ML algorithms require target patterns to be identified within the data in order to train properly (in ML parlance, this is called "supervised learning").

Current network monitoring systems gather the amount of data required by collecting meta-data on a packet-by-packet basis. This means they must analyze and record information about every packet sent and received over all monitored networks. This set of meta-data, while smaller than the actual network packets, is a non-trivial amount of data to transmit and analyze.

Also, to utilize "supervised learning" ML algorithms, network monitoring systems require all target patterns to be identified within the data used for training, thus shifting burden back onto network administrators.

The market is still struggling to efficiently apply ML algorithms in a way that minimizes human interaction. The more successful network monitoring systems collect copious amounts of data and often require the "interesting" parts of the data be identified interactively by a network administrator or by utilizing third party data sets where the "interesting" parts have been manually identified.

SUMMARY

In view of the foregoing, embodiments are directed to a system and method that combines Network Security, Network Control, Network Performance Management and Mobile Device Management.

Embodiments are directed to a system and method that provides for a data collection, control and monitoring system that has visibility to network flow data that may go over a VPN tunnel but may instead be rewritten to the local network stack in such a way that it bypasses the VPN entirely.

In other embodiments, the system and method are directed to capturing all name queries on a mobile device, steering name queries either inside or outside the VPN tunnel based on policy rules expressed using host names or partial hostnames with wildcards, tracking name queries and mapping them to the associated responses, storing the name to address associations from the queries and responses, and applying the same policy to any flows that use an address from a name resolution as the policy that was applied to the original name query.

Embodiments are directed to a method and system for capturing all network flows on a mobile device as well as a method and system for re-introducing the network flows back into the original network stack on the mobile device such that they will subsequently avoid being captured for monitoring any further. The method and system utilize steering name query flows according to configured policy defined using full or partial host names, tracking responses to name queries, and applying the same policy to flows that uses the resolved address for a name query as was used for the original name query. The method and system further include processing the stream of collected data in real-time for the purpose of automatically creating and applying the most appropriate network policy rules based on actual user and device behavior on the network and the goals of the enterprise.

In further embodiments, the system and method provide for real-time monitoring of user and device network behavior data collected on the mobile device in order to automatically create and apply the most appropriate network rules for the current environment.

In still other embodiment, the method can be performed on and the system can be operable with a roaming client moving between same or dissimilar networks including, but not limited to, WiFi, cellular networks technologies such as WiMax, 3G, 4G, 5G and Long Term Evolution (LTE), as well as other radio networks. By way of non-limiting example, a client may roam between two networks A and B, such that the DNS query is processed while the VPN tunnel is established over network A, but by the time the subsequent flow to the actual remote host occurs, the VPN tunnel has been established over network B. This may also apply to the sending the network flow vs the sending of the network flow metadata to the data gateway in the VPN server pool. Additional information regarding mobile devices roaming over plural dissimilar networks and maintaining connection between the roaming mobile device and an enterprise network through a VPN tunnel can be found in, e.g., U.S. Pat. Nos. 7,778,260, 7,602,782, 7,574,208, 7,346,370, 7,136,645, 6,981,047, 6,826,405, 6,418,324, 6,347,340, 6,198,920, 6,193,152, U.S. Patent Application Publication Nos. US2010/0046436, US2009/0307522, US2009/0083835, US2007/0206591, US2006/0203804, US2006/0187956, US2006/0146825, US20060046716, US2006/0023676, US2006/0009213, US2005/0237982, US2005/0002419, US2004/0264402, US2004/0170181, US2003/0017845, US2005/0223115, US2005/0223114, US2003/0120811, and US2002/0122394, the disclosures of which are expressly incorporated by reference herein in their entireties.

In another non-limiting example, the method and system can be employed as a standalone solution or can be built on top of an existing VPN. As a standalone solution, the method and system can be configured to capture all network flows so that information about them may be collected and then the method and system could rewrite all network flows back to the local network stack. If built on top of an existing VPN, after reading network flows and collecting information, control over the network flows may be asserted, thereby causing some flows to be rewritten to the local network stack, other flows to be sent over the VPN tunnel and other flows to be blocked.

For any name queries, a policy lookup would occur for the (potentially wildcarded) hostname from a local table and then either send the name query over the tunnel, send it outside the tunnel, or block it.

Since policy may be dynamic and user configurable, it may be necessary to ensure that any name query can be sent to a DNS server either inside or outside the tunnel. One method to accomplish this may be to proxy the name queries and responses to the appropriate server. Another method to accomplish this may be to simply forward the name query packets and rely on the underlying operating system behavior to generate name query packets to the appropriate name server.

The system must track name queries and responses so that it can apply the same policy to the flow resulting from a name resolution as the policy applied to the name resolution itself. In one embodiment, this name resolution cache may be used to "short-circuit" subsequent name lookups to the same name. In another embodiment, it might be advantageous to always resolve every query to ensure the local cache is kept up to date.

Moreover, embodiments are directed to a system and method to provide for a data collection and monitoring system that centralizes and aggregates the data and then uses the aggregated data to train and execute machine learning (ML) algorithms.

According to other embodiments, the system and method are directed to provide a ML algorithm that outputs the detection of possible data exfiltration by one or more computers based solely on previously gathered data, having such detections customizable by a network administrator in terms of overall sensitivity, and applying the ML algorithm to customizable groups of computers.

In still other embodiments, the system and method provide for the generation of reports, notifications, and alerts based on the output of the ML algorithm.

In further embodiments, the system and method provide conditions for accessing one or more computer networks and/or limiting the usage of said networks by one or more computers based on the output of the ML algorithm.

Embodiments are directed to a mobile management method that includes receiving from an application on a client a DNS query for a host name; retrieving reputation data associated with the host name from a local cache on the client; determining whether a policy associated with the host name and the reputation data associated with the host name exists; and one of: sending network flows one of: through a VPN tunnel to a server or out a local proxy on the client to a private or public network; or blocking the network flow based on the determined policy for the host name.

Further, embodiments are directed to a mobile management system that includes at least one data base comprising a stored set of instructions; and at least one processor coupled to the least one data base, wherein processor is configured to execute the stored set of instructions to: receive from an application on a client a DNS query for a host name; retrieve reputation data associated with the host name from a local cache on the client; determine whether a policy associated with the host name and the reputation data associated with the host name exists; and one of: send network flows one of: through a VPN tunnel to a server or out a local proxy on the client to a private or public network; or block the network flow based on the determined policy for the host name.

Moreover, embodiments are directed to a mobile management method that includes sending at least network flow metadata to a collector on a client; transmitting the network flow metadata in the collector to a VPN server pool via the VPN tunnel; processing the network flow metadata to find and detect events and conditions within the network; sending the found and detected events and conditions to the client; determining whether a policy associated with the found and detected events and conditions exists; and changing at least one of network usage or device behaviors based on the determined policy.

Embodiments are directed to a mobile management system that includes a VPN server pool; and a client device connectable to the VPN server pool via a VPN tunnel. The client device includes a reputation data store, a policy rules store and a VPN policy engine coupled to perform a policy lookup based upon a policy rule stored in the policy rules store for host name and reputation data for the host name stored in the reputation data store. Based upon the policy lookup, the VPN policy engine is configured to one of: send network flows one of: through a VPN tunnel to a server or out a local proxy on the client to a private or public network; or block the network flow.

BRIEF DESCRIPTION OF FIGURES

FIG. 46 shows exemplary cached collector data stored as textual data or JSON data.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A mobile cloud performance, security and cost management system according to the embodiments provide visibility and control for all network applications. The system expands the set of application traffic mobility clients can act upon to include traffic sent outside a VPN tunnel, on all platforms and applies policy and publishes data for both tunneled and non-tunneled traffic. Thus, regardless of mobile operating system, e.g., iOS, Android, Windows, Mac, etc., and whether the mobile user's traffic is tunnel or non-tunneled, policy can be review and applied and reports can be prepared and published.

Monitoring remote network clients for technological and legally risky behavior is difficult due to their separation from the enterprise network. Existing solutions depend on services running on a gateway network appliance, such as a router. Due in part to their scalability requirements, these routers typically remediate traffic based upon a security policy without any advanced reporting. Remote clients can also be difficult to reference when associating with traffic as their source addresses can change more often than on premise clients. This loose association adds to the complexity of connecting an agent/client (user or device) with its network traffic and its reputation data.

The reputation data collected from the client activity to the VPN server can be fed into a Security Information and Event Management (SIEM) system, a reporting engine (or business intelligence engine), and/or a machine learning algorithm of a machined learning engine Reporting engine to quickly identify suspicious network behavior. Because the reputation data is collected at the time of the client's connection, Reporting engine the reporting engine can quickly identify risky network activity coming from the VPN clients without any additional processing.

Figure 1:
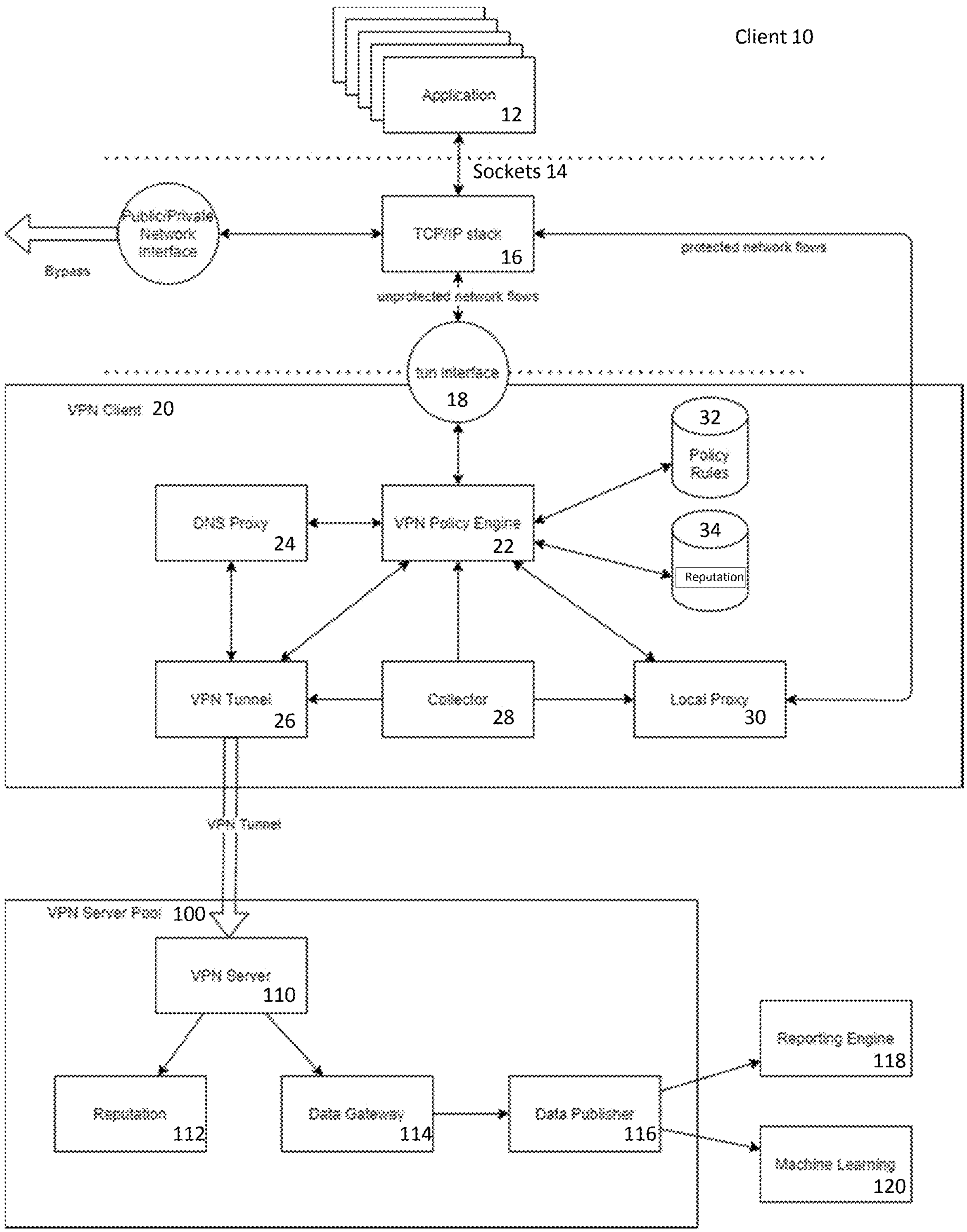
FIG. 1 is an exemplary diagram of a client-server system in which decisions are made in the client based on policy rules and/or reputation data for a requested host whether connect to the host through a protected tunnel or to locally connect to the host via a private or public network.

FIG. 1 illustrates an exemplary embodiment of the cloud management system. The exemplary system uses a client server arrangement. In the client 10, which can be a mobile device, e.g., laptops, netbooks, smartphones, handheld devices, workstations, PDAs, iPads, tablet computers, etc., one or more applications can be stored in a memory and can be executed by a processor. In executing an application 12, a socket 14 can be established for transmitting data, and a DNS request or query for the host name can be sent from a TCP/IP (or local) stack 16, which forwards unprotected network flows to a tunnel interface 18 of a virtual private network VPN client 20. VPN client 20 evaluates all packets, and includes a VPN policy engine 22, a DNS proxy 24, a VPN tunnel 26, a collector 28, a local proxy 30, policy rules store 32 and reputation data store 34. VPN tunnel 26 can connect client 10 and VPN server pool 100 via wired networks or wireless networks, including WiFi, cellular networks technologies such as WiMax, 3G, 4G, 5G and Long Term Evolution (LTE), as well as other radio networks. Policy rules 32 can be stored as memory tables, while reputation data can be stored in a local cache or reputation data store or cache 34 and updated over time or otherwise timed out. Local proxy 30, is provided to put packets back into the local network stack, so that these packets are protected from the VPN. Policy rules 32 and reputation data store 34 can be stored in one or more memories and can be accessed by VPN policy engine 22.

Each time a DNS request packet with the host name is received by VPN policy engine 22, VPN policy engine 22 can retrieve reputation data of the requested host name from reputation data store 34 based upon policy from policy rules store 32 perform a policy lookup for the requested (potentially wildcarded) host name. If the host name can be resolved in the client, the resolved host name is returned to application 12. If the host name cannot be resolved in client 10, the DNS query is sent through tunnel 26 to VPN server pool 100 via DNS proxy 24 to be resolved, and a DNS response with the resolved host name is returned application 12. VPN policy engine 22 looks up the reputation of the requested host name in reputation data store 34. If reputation data for the host is not found in the local cache (reputation data store 34), VPN policy engine 22 can request reputation data for the host from a VPN server pool 100, which can be located on a server on premises and/or in the cloud, and record the retrieved reputation data for the host in reputation data store 34. This reputation data can include things such as, e.g.: risk level, category, popularity, and potential security incidents noticed in the past. VPN policy engine 22 can also enforce policy rules based on the DNS host name and the reputation. When a policy exists, the packets can be treated according to the policy, e.g., to establish a connection through VPN tunnel 26 to the server or to establish a local connection to the host through a public or private network, thereby bypassing the VPN tunnel.

Moreover, to ensure that the local reputation data on the client is up to date, each time VPN policy engine 22 sees a DNS query, even when there is reputation data for the resolved host in the local cache and an established policy, VPN policy engine 22 can request and retrieve reputation data for that host from VPN server pool 100 and store (or update) that data in reputation data store 34 on client 10 in a table where, e.g., the key is the host name and the value is the reputation data.

Thus, in embodiments, regardless of whether policy rules pertaining to the host exist in VPN policy engine 22, reputation data can always be retrieved. This can be advantageous in that, because policy is dynamic and can change at any time, the reputation cache is up to date for all hosts for which DNS queries have been made. Therefore, even when VPN policy engine 22 does not find a policy rule for the host name, VPN policy engine 22 will retrieve reputation data for that host from VPN server pool 100 to update the reputation data in the local cache or reputation data store 34. In particular, DNS proxy 24 can resolve the packet request with the host name and send the host name through VPN tunnel 26 to a VPN server 110 of a VPN server pool 100. VPN server 110 can access a reputation data store 112, which can be a local cache in VPN server pool 100. The reputation data for the resolved host name is sent back to client 10 through VPN tunnel 26 and reputation data store 34 is updated and policy rules based upon the reputation data retrieved from VPN server pool 100 can be stored in policy rules store 32 for the host. Based on this new policy, a determination is made whether to establish a connection through VPN tunnel 26 or to establish a connection outside of VPN tunnel 26 to a private or public network or to block the flow.

When the server does not have reputation data in its local cache for the resolved host, VPN server 110 can query, e.g., an internet accessible reputation service that can resolve a hostname or URL into a reputation score. This retrieved reputation data can then be sent back through VPN tunnel 26 to VPN policy engine 28 to be stored in reputation data store 34.

Whether the DNS request is resolved locally or via the server, when the response comes back, application 12 will make a new request to the actual remote host. At this point another policy lookup can occur in VPN policy engine, as well as checking reputation data. The activities of the various processes can be collected or stored, preferably temporarily, on the client by collector 28. That is, after VPN policy engine 22 has processed the request packet and its associated reputation data, VPN policy engine 22 informs collector 28 of the packet and reputation. After VPN policy engine 22 has processed the packet to the actual host, its associated reputation data and a determination of how to handle the packet will have been made, i.e., connect through local proxy, connect through VPN tunnel 26, or block, VPN policy engine 22 informs collector 28 of the packet, reputation and network flow metadata. Collector 28 can store cached data about client 10, e.g., WiFi connection, data about the VPN tunnel, data about connection made through the VPN, etc., and, periodically, this collector data can be flushed to a data gateway 114 of VPN server pool 100, which is a server side data collection point.

Moreover, in embodiments, it is possible for no policy to exist that matches a given flow or for a remote host to be unknown in terms of reputation. If no policy exists and no reputation can be retrieved, a default behavior, e.g. to tunnel the flow to the VPN server pool, can be executed.

A non-limiting example of the cached collector data, which can be stored as textual data or JSON data is shown in FIG. 46.

Data gateway 114 receives the network flow information and/or metadata from the downloaded collector data and unpacks or normalizes the downloaded data. Data gateway 114 can forward the data to data publisher 116, which can instruct reporting engine 118 to prepare reports or dashboards. Reporting engine 118, e.g., can use the reputation data to prioritize and filter application flow data to present an overall cybersecurity posture of the network. Data publisher 116 can also send the data to a machine learning unit 120, which can use artificial intelligence and machine learning algorithms to update information based upon what it learns. Machine learning unit 120 can be coupled to transmit alerts to VPN server 110 for alerting clients or updating client's policies.

Figure 2:
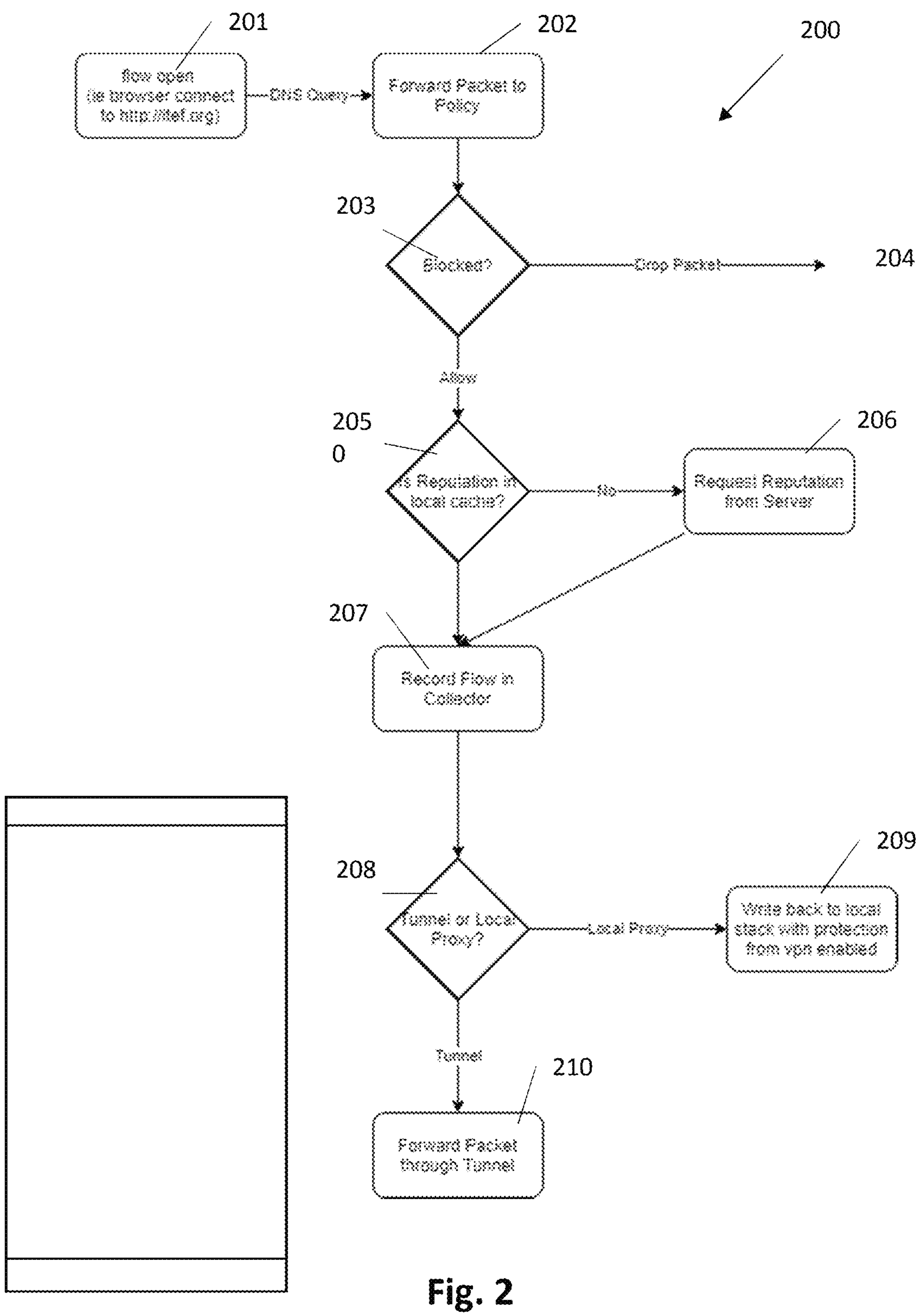
FIG. 2 is a flow diagram of an exemplary operation of the client-server system.
Figure 3:
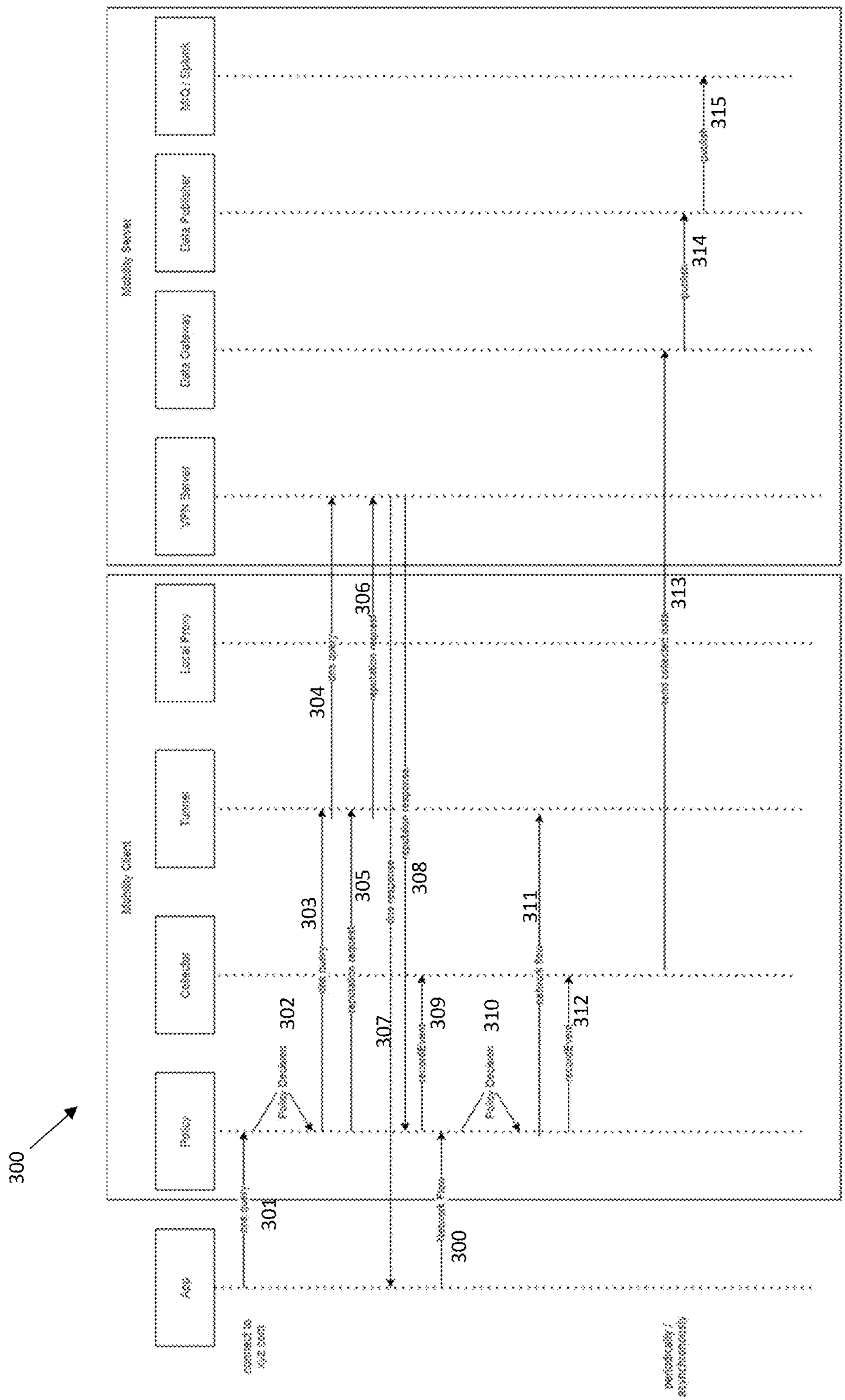
FIG. 3 is a sequence diagram that shows the order of events from opening an application on the client to reporting the network flow.

An exemplary flow diagram of an operation of the client 10 and VPN server pool 100 is depicted in FIG. 2. The process 200 begins when an application, e.g., on a browser, chooses to connect to a host by querying a host name at 201. The TCP/IP stack sends a DNS query packet to the VPN policy engine at 202. The process then determines at 203 whether there is a policy that blocks connection to the host. If policy blocks the host, the packet is dropped at 204. If policy allows the host, a determination is made at 205 whether the host's reputation is in the local cache (reputation data store). When there is no reputation data for the host in the local cache, reputation data for the host is requested from the VPN server pool of the server at 206. The VPN server pool will search its own reputation data base for the information and, if necessary, send a query to, e.g., an off-site reputation service, for reputation data. The VPN server pool will return the retrieved reputation data for the host to VPN policy engine and VPN policy engine will forward network flows to the collector for recording at 207. When reputation data for the host is found in the local cache, VPN policy engine will forward network flow metadata (or information) to the collector for recording at 207.

At 208, a determination is made whether to connect through the tunnel or through a local proxy. When connecting through the local proxy, the local proxy at 209 writes back to the local TCP/IP stack that the network flow is protected with the VPN enabled. When connecting through the tunnel, the packet is forwarded through the VPN tunnel to the server at 210.

An exemplary sequence diagram that shows the order of events when an application is opened on the client in accordance with embodiments. This sequence diagram generally corresponds to the exemplary flow diagram depicted in FIG. 2. In particular, the sequence 300 begins at 301 when a DNS query is sent when an application on the client is opened, which is received in the VPN policy engine. At 302, the VPN policy engine makes a determination whether the DNS query can be resolved, whether there is a policy and whether there is reputation data for the resolved host. If necessary, the VPN policy engine can forward the DNS query to the tunnel at 303 and the DNS query can be sent through the tunnel to the VPN server at 304 or the flow can be blocked. Further, if necessary, the VPN policy engine can send a reputation request to the tunnel at 305 and through the tunnel to the VPN server at 306.

The VPN server can send a DNS response to the application at 307 and can send a reputation response to the VPN policy engine at 308. At 309, the application sends a request for a network flow to the VPN policy engine. The VPN policy engine will then determine at 310 whether the network flow should be through the tunnel or through a local proxy for local connection to the public or private network or whether the network flow should be blocked. Whether the existing policy requires the network flow to be directed through the tunnel or the local proxy or to be blocked, the VPN policy engine will record the event in the collector at 312. Periodically or asynchronously, the data stored in the collector is sent to the data gateway at 313. The data gateway instructs the data publisher to publish the received data at 314 and the data publisher sends the data it receives to the reporting engine and the machine learning unit at 315.

Figure 4:
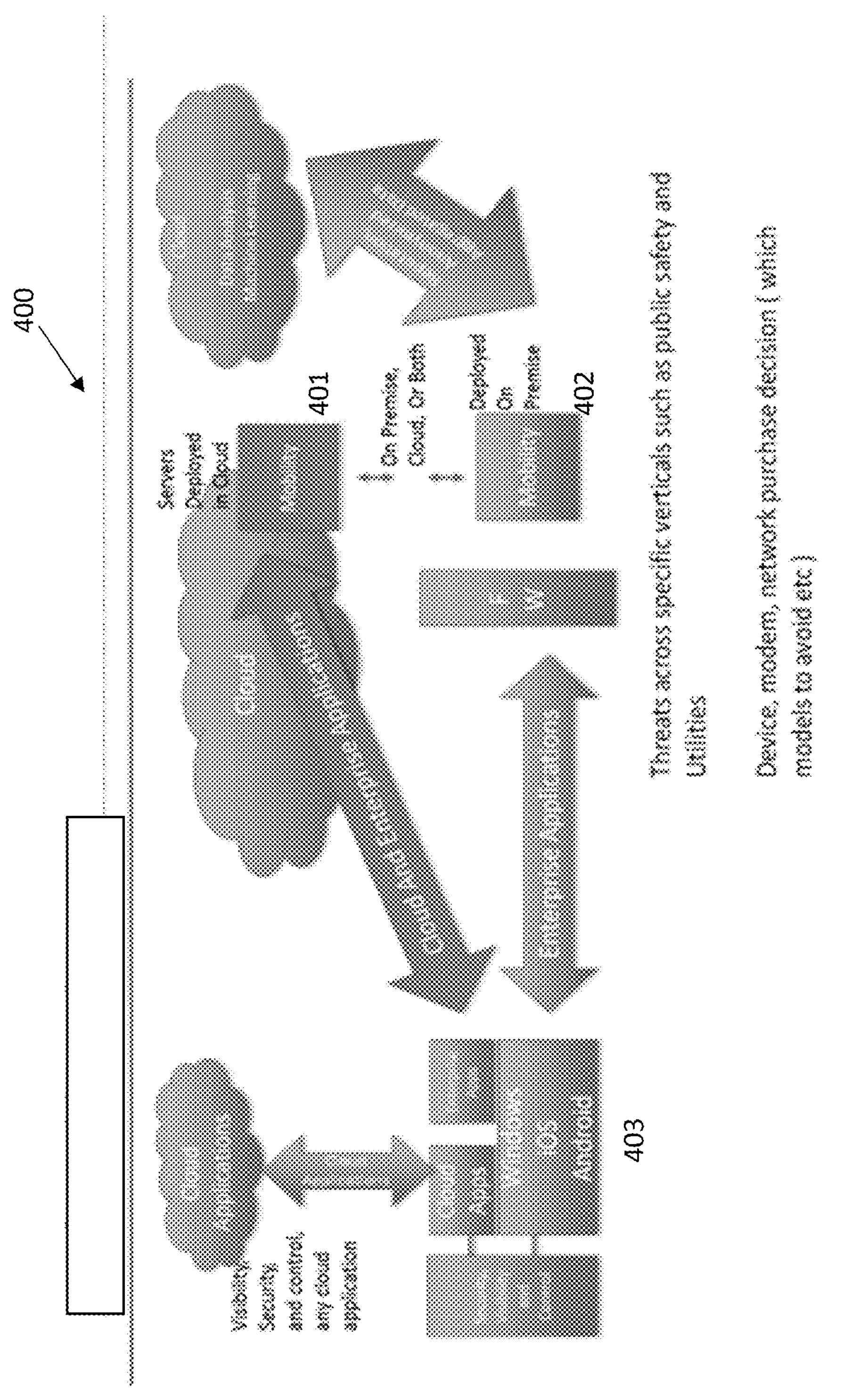
FIG. 4 shows an exemplary embodiment of the server on premises and/or in the cloud.

As shown in FIG. 4, a mobile management system or platform 400 having a cloud based mobility server 401 can be built for the enterprise to make it easier to secure, optimize, and manage a network deployment where employees may or may not be, e.g., outside the firewall beyond the visibility and control of management tools, accessing applications and services in the cloud and on premise, using networks not under administrative control of the enterprise, using devices often not issued by the enterprise, etc. Mobile management system 400 can be utilized in combination with mobility server 402, which is deployed on premises, or can be utilized on its own, thus replacing on premises mobility server 402 to provide automated performance, threat defense and cost control. This provides a seamless mobile cloud management system with control and visibility of all device traffic destined for corporate data center, the cloud and the Internet. In such configurations, when client 403 accesses an app 404 that does not send traffic through the VPN tunnel, i.e., traffic is sent outside of the VPN tunnel to a cloud based application or the Internet, a reputation request is separately transmitted to mobility server 401 or 402 for a reputation query.

Thus, mobile management system 400 is provided with the ability to monitor and control remote and mobile clients outside the firewall. This is particularly advantageous in that, while known systems require all traffic to pass through a server or proxy where network activity is analyzed and policy is enforced, the mobile management system 400 will analyze and control on the mobile client 403 and on servers 401, 402, and policy enforcement is done on the client 403.

In embodiments, where data analysis is done on servers 401, 402, policy triggers can be sent to client 403 for enforcement. Moreover, mobility server 401 can be formed by one or more servers and/or proxy servers residing in the cloud, e.g., AWS, Azure clouds and mobility server 402 which can be formed by one or more servers and/or proxy servers residing on premises. The system will provide diagnostics, visibility and policy control on flows inside the VPN tunnel, which can use, e.g., strong AES encryption, DES or twofish. Further, the system will provide diagnostics, visibility and policy control on flows outside the tunnel going directly to the cloud. This configuration frees up resources at the enterprise and improves performance by removing the need to send all data back to the enterprise or to a server in the cloud.

By way of non-limiting example, cloud based mobility server 401, which is configured to provide a secure tunnel service, that provides first hop security by creating an encrypted tunnel between clients 403 and the tunnel server, includes a data gateway acting as a collection point for client application flow, performance and security data. Moreover, cloud based mobility server 401 can also provide a secure tunnel all the way back to the customer/enterprise internal network by simply setting up another tunnel between the customer's private network and the cloud. Mobility server 401 can also include a policy service that can push mobility policy to attached clients 403 and an alert service that can push mobility alerts to attached clients 403, as well as administrative alerts sent via SMS, email, syslog, SNMP. In embodiments, servers 401, 402 have the ability to identify ad servers, prevent connections to those servers for web browsers and applications, and to push down policy rules to the client to prevent connections. Moreover, a secure tunnel between the cloud server and an on-premises mobility server 402, can be established to provide cloud server configuration and client authentication. Further, the on-premises network can be connected to the cloud based mobility server 401 by using more commodity technologies, e.g., an IPSec tunnel instead of another mobility server running in the customer's on-premises network.

Mobility server 401 can be implemented to enhance security and performance of the enterprise. In embodiments, mobility server policy actions and conditions can be provided for routing specific Application Traffic to specific proxy servers. Moreover, the proxy servers can support TLS back to the server pool on premise for configuration and administration, and mobile clients 403 can include policy to direct traffic to specific proxy servers using TLS. Mobile clients 403 can support at a minimum encryption, compression, and roaming when routing application traffic to proxies. Mobile clients 403 operating with a proxy can support all forms of authentication and can support concurrent routing of traffic using pass-through, proxy, and VPN traffic for various applications. For example, an application 1 traffic can be routed to a proxy, application 2 traffic is routed to the Mobility pool on premise and application 3 traffic is pass-through. In another example, flows for the same application can be routed differently based on remote host name, such that, when the application communicates with Remote Host A, it goes out local proxy and when it communicates with Remote Host B, it goes over the tunnel.

The system provides diagnostic information regarding the state of the network, device, and application, while the system server will be able to reside on premise behind the firewall and in the cloud. The server 401, 402 can include a VPN server, anomaly detection data monitor, a server with dashboards, and proxy servers. The system will provide configuration such that authentication is required before permitting network traffic. The system will support multiple factors of authentication. The system analyzes applications, users, devices, networks, network devices such as access points, routers, carrier networks, location, destinations servers, web sites and domains visited by users and performs a lookup of the reputation and category.

Figure 5:
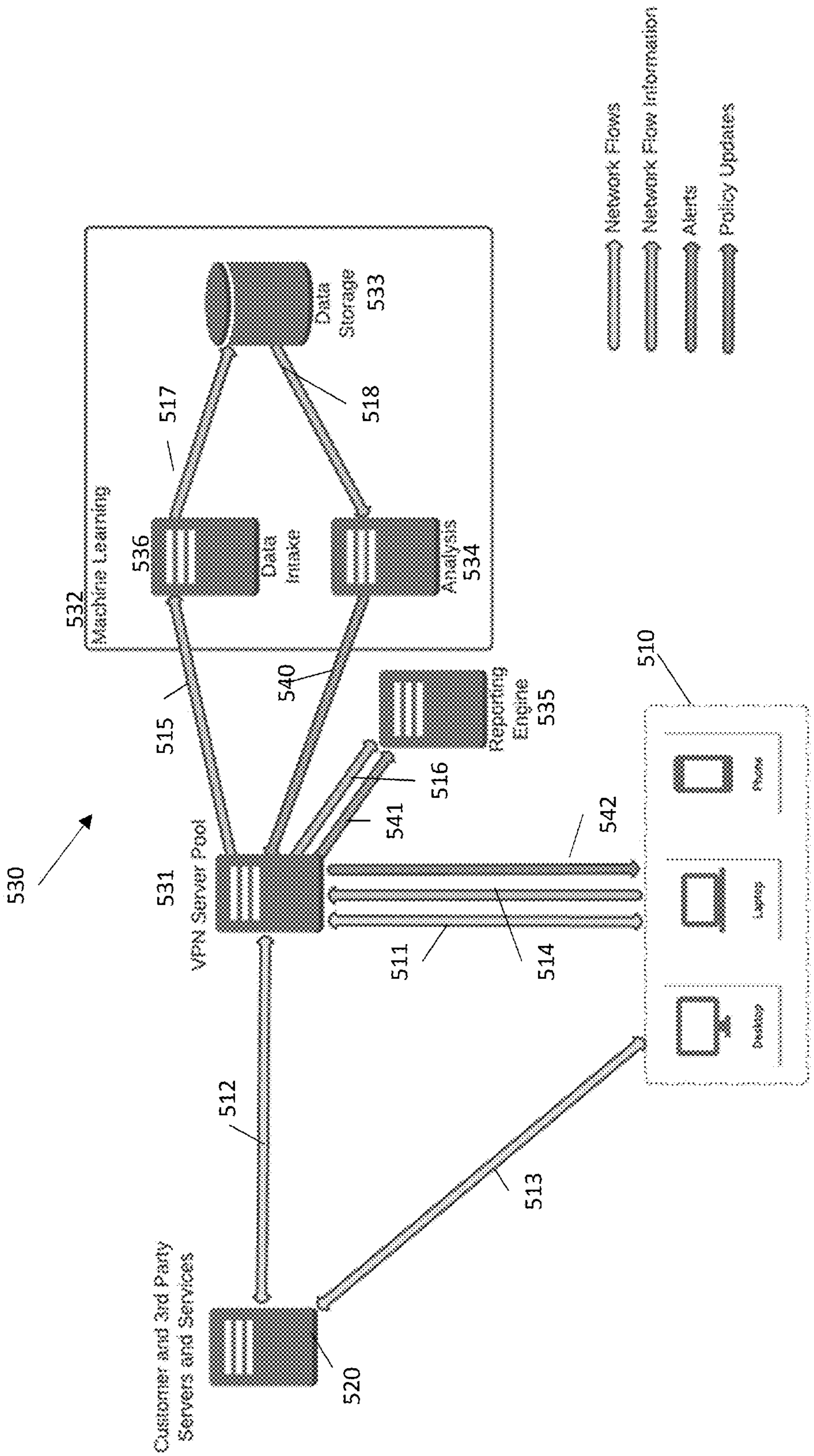
FIG. 5 shows a more detailed operation of the functionality in the server.

FIG. 5 shows an exemplary operational view of the server in accordance with embodiments. The client 510 can be, e.g., a computer, laptop, phone, tablet, etc., capable of establishing and transmitting/receiving data over a network to third party servers and services 520. Further, a server 530, which can be on-premises or in the cloud, includes a VPN server pool 531, a machine learning unit 532 and a reporting engine 535. Further, machine learning unit 532 can include a data intake server 536, data storage 533, and analysis server 534.

As discussed above, the network flow from the client may be established through the tunnel, such that a network flow 511 is established between client 510 and VPN server pool 531 and from VPN server pool 531 to third party server or service 520. Alternatively, based upon policy, a network flow 513 can be established outside of the tunnel to connect client 510 via a local proxy to third party server and services 520.

However, while the network flow may be through the tunnel or outside of the tunnel, network flow information 514 is sent through the tunnel between client 510 and VPN server pool 531. This network flow information can include the collector data from client and metadata about the network flows 511, 512, 513. Further, VPN server pool 531 sends network flow information 515 to data intake server 536 and network flow information of data 516 to reporting engine 535. Data intake server 536 sends network flow information 517 to data storage 533 for recording and analysis server 534 can read network flow information 518 from data storage 533. Analysis server 534 can analyze the metadata, e.g., using artificial intelligence and machine learning algorithms, and send alerts 540 to VPN server pool 531 if it finds something to protect the client or enhance operation of the client. VPN server pool 531 can issue an alert 541 to reporting engine 535. VPN server 531 can also establish a connection for policy updates 542 through the tunnel to client 510.

The network flow information or data can be compiled in reporting engine 535 based upon various categories of interest, e.g., web site reputation, to be presented to administrators and users in dashboards. By way of non-limiting example, reputations can be characterized into five (5) risk levels for dashboards, e.g., severe_risk, high_risk, moderate_risk, low_risk and unknown_reputation. Further, the system can categorize each visited web sited. By way of non-limiting example, there can be over 85 different categories, such as, e.g., Abortion, Abused drugs, Adult and pornography, adware Security, Alcohol and tobacco, Auctions, Bot nets—Security, Business and economy, CDNs, Cheating, Computer and internet info, Computer and internet security, Confirmed SPAM sources—Security, Cult and occult, Dating, Dead sites, Dynamically generated content, Educational institutions, Entertainment and arts, Fashion and beauty, Financial services, Food and dining, Gambling, Games, Government, Gross, Hacking, Hate and racism, Health and medicine, Home and garden, Hunting and fishing, Illegal. Image and video search, Internet communications, Internet portals, Intranet sites, Job search, Keyloggers and monitoring, Kids, Legal, Local information, Malicious URLs and paths—Security, Malware sites Security, Marijuana, Military, Motor vehicles, Music, News and media, Nudity, Online greeting cards, Open HTTP proxies—Security, Parked domains, Pay to surf, Peer to peer, Personal sites and blogs, Personal storage, Philosophy and political advocacy, Phishing and other frauds—Security, Private IP addresses, Proxy avoid and anonymizers—Security, Questionable, Real estate, Recreation and hobbies, Reference and research, Religion, SPAM URLs—Security, Search engines, Sex education, Shareware and freeware, Shopping, Social network, Society, Sports, Stock advice and tools, Streaming media, Swimsuits and intimate apparel, Training and tools, Translation, Travel, Unconfirmed SPAM sources—Security, Violence, Weapons, Web advertisements, Web hosting sites and Web-based email.

Figure 6:
FIG. 6 shows a high risk traffic audit dashboard for the web sites visited that belong to categories configured as malicious.
Figure 7:
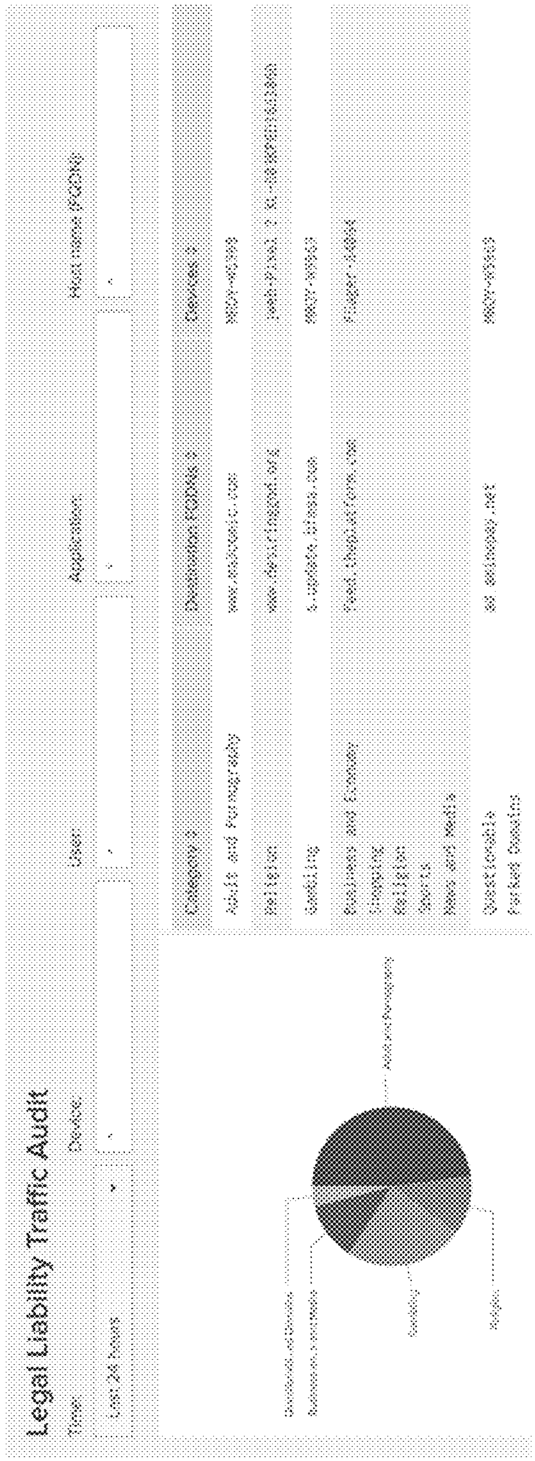
FIG. 7 shows a legal liability dashboard for web sites with reputations that are determined to be legal liabilities.

Users may configure specific dashboards with categories of interest. By way of non-limiting example, FIG. 6 shows a dashboard named "High Risk Traffic Audit" which can display malicious websites that have been accessed are inspected and categorized. Further, the system can include a policy based on reputation to automatically block malicious sites and report instances of attempted deployment. Further, non-limiting examples can include a dashboard named "Legal Liability," as in FIG. 7, which can display all the web sites accessed for the specific categories that have been configured as "Legal Liabilities". Further, the system can include a policy based on reputation to automatically block malicious sites and report instances of attempted deployment. These dashboards can also be configurable to a user's needs, i.e., "Alcohol and tobacco", may be acceptable for a public safety agency but may be a problem for an electric utility.

Metadata collected on clients for visibility and control will be reported by mobile clients for, e.g., users, devices, networks, applications, destination location, destination servers, destination services, countries, location, and web sites for traffic inside and for traffic outside the VPN tunnel. This metadata will be used to perform anomaly detection and security (entity) behavior. The system can create policy triggers based on results of this analysis. Reputation of, e.g., users, devices, networks, applications, destination location, destination servers, destination services, countries, location, and web sites can also be calculated based on behavior. By way of non-limiting example, the system can detect that a user has accessed a website that is not typically used by other users in the deployment and is uploading large amounts of information, such as uploading data to dropbox. This behavior will create an alert and policy trigger sent down to clients that may be paired with one or more policy actions, discussed below. One such method for analyzing the data can be machine learning algorithms such as Regression, Random Forests, and neural networks.

Client policy will allow an administrator to configure policy triggers based on individual web, categories, and risk level. The policy can be configured on the server and pushed down to clients and can be enforced by clients because the clients are context aware, i.e., clients know the network, location, speed, applications, users etc. The server does not. Enforcement of policy on the client is required for highly mobile networks because the context and environment are always changing.

By way of non-limiting example, policy triggers can include Destination Web site, Destination server address and port, Application being launched, Protocol, Network SSID/BSSID, Network name (AT&T, etc.), Network speed, IP Address change, Inside geographical fence and Outside geographical fence. Further examples of policy triggers can be performed from anomaly detection data monitor, Reputation of users, devices, networks, applications, destinations, destination services, countries, location, and web sites. When a client detects that a policy has been triggered, it will perform an associated action, e.g. to block access to the website or to bypass the web site by sending the web site traffic outside the VPN tunnel directly to the cloud service. A non-limiting example of actions can include, e.g., Sending an SMS, email or text to an administrator, Presenting a pop-up or toast message to the end user, Enabling advanced logging, Blocking the access point, Tunneling the application over the VPN, Sending the application traffic outside the VPN, Blocking the web site, Blocking the application, Hiding the network interface, Forcing the user to re-authenticate, Forcing the user to re-authenticate with additional authentication factors, Compressing, Accelerating, Enabling forward error correction, Launching application, Launching network diagnostics and Performing network speed test. In response to the policy trigger, it is understood that one or more actions may be taken to resolve the policy trigger.

Policy Example 1

Policy triggers and actions may be compounded. For example, if user is on a cellular network outside the firewall and accesses a social media video website, accessing the website will create a policy trigger that is resolved by blocking the website and by presenting a message to the user. However, if the user is inside the firewall and accesses the social media video website, the policy trigger is resolved by allowing the user access to the website.

Policy Example 2

The anomaly detection data monitor has determined that there are enough changes in user behavior to require the end user to perform a multifactor authentication. The policy trigger is sent down to the client and the multifactor authentication process is started. Network traffic may be blocked until completed. A non-limiting exemplary listing of changes to user behavior may include location, network, device, applications, and destinations.

Policy Example 3

Policy triggers for risk level can also be supported. One such example may be to create a policy action to block any of the sites with a reputation of "High Risk" or worse.

Policy Example 4

Blocking web sites by category. One such example is to create a policy action to block all Sports (Sports is one of the categories) web sites.

Policy Example 5

The client system will have the ability to route traffic for web sites, applications, destinations, protocols, addresses etc. When inside the VPN tunnel, the VPN can provide encryption. When outside the tunnel and transmitting directly to the destination, the applications may typically provide the encryption such as when TLS/SSL is used when accessing an ecommerce site. When sending to a proxy service that may be on premise or inside the cloud, the client and the proxy can negotiate a TLS tunnel to provide encryption.

Policy Example 6

In an extreme case, policy may be configured to route all traffic outside the firewall, e.g., all application and web site traffic is configured to go directly to the cloud or destination. In this case the application is responsible for encrypting the traffic, while the VPN tunnel is used for administration purposes to collect metadata and provide policy control and configuration.

Policy Example 7

In another extreme case, policy may be configured such that all traffic is routed through the VPN tunnel.

Policy Example 8

Policy may be configured to only route traffic through the VPN tunnel when the client determines that the underlying network is not secure. One such example is when the client roams to a Wi-Fi access point that does not have encryption configured.

Policy Example 9

Policy may be configured to only route traffic through the VPN tunnel when the client determines that the underlying network is slow and compression and other optimizations are required. One such example is when the client roams onto a network that has a historical speed below some preconfigured threshold.

The dashboards can be created from the reports. By way non-limiting example, the system can look up destination by location and report location (e.g., country, town . . . ) and/or can report on the usage of a VPN, network speed, network link quality such as SINR, RSRP, RSRQ, RSSI, and/or active network by carrier or SSID/BSSID. Further, the system can report the network being used to access specific websites or server destinations, the network being used by specific applications, and/or application usage byte counts by application, device, and/or user.

Figure 8:
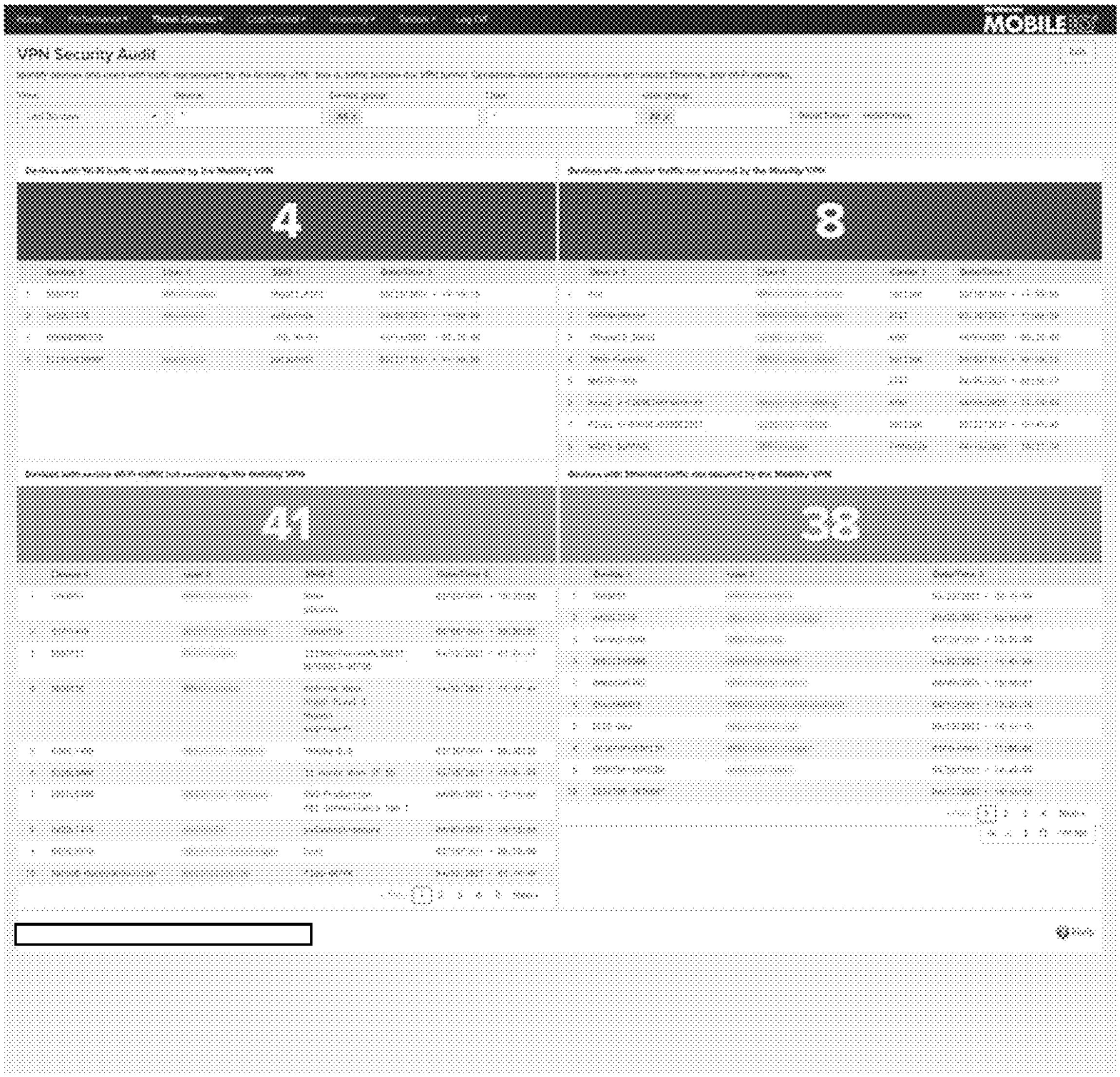
FIGS. 8-38 show other exemplary dashboards prepared by the reporting engine based on policy, host name and/or reputation data.
Figure 9:
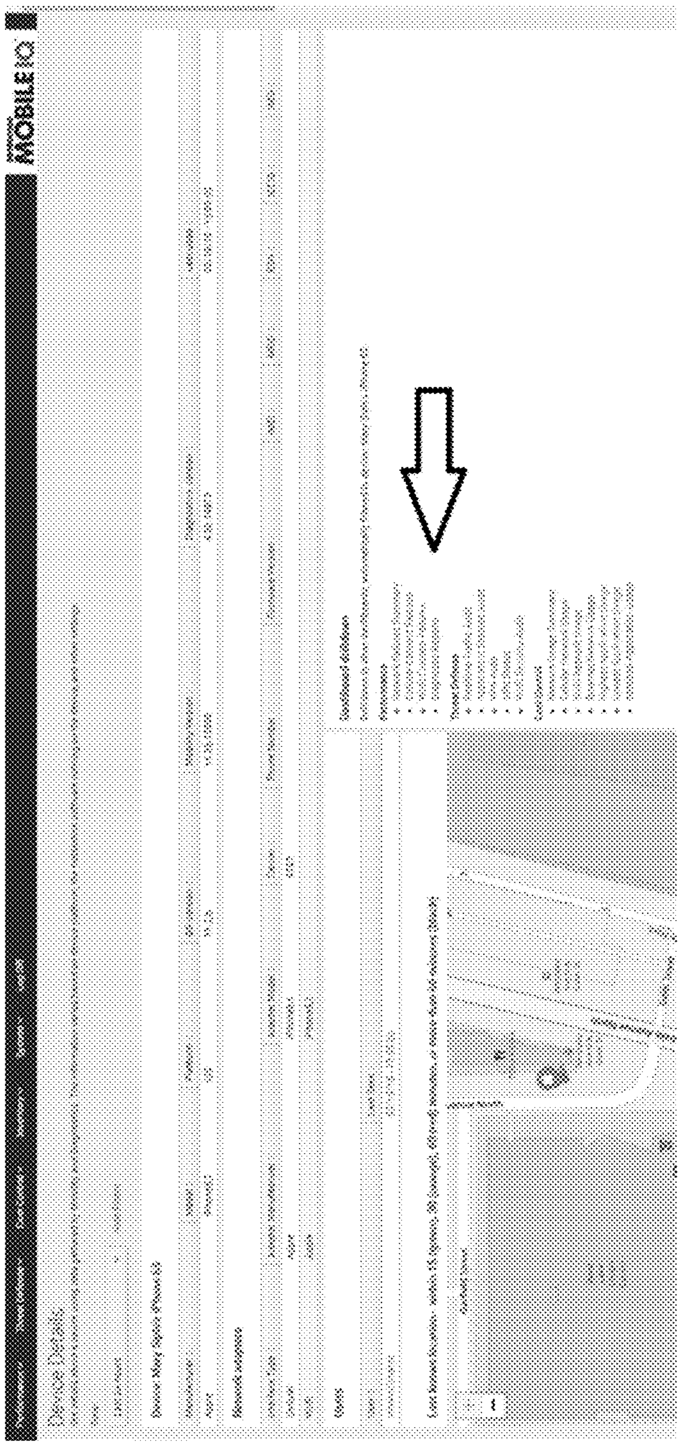
Figure 10:
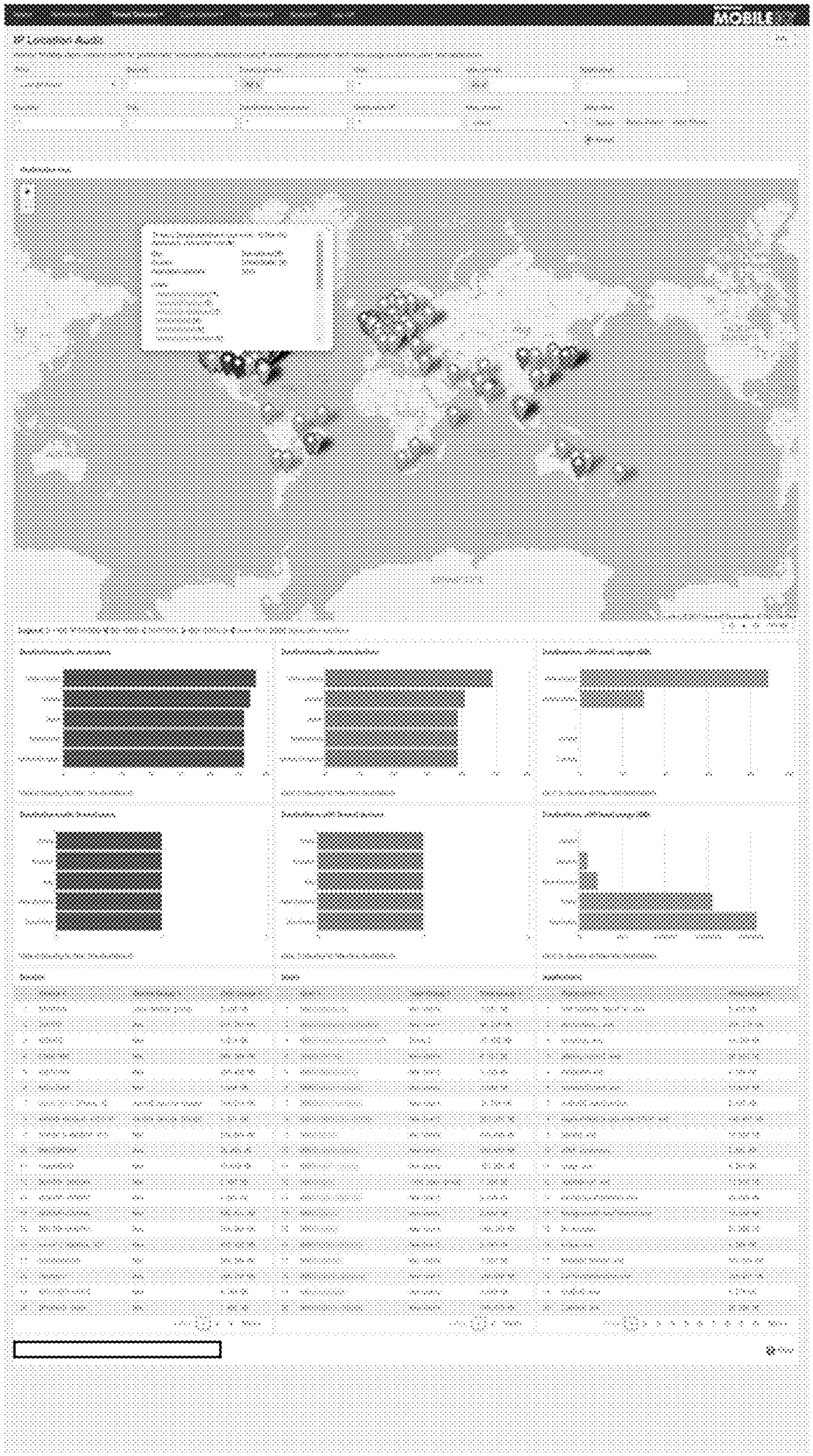

Reporting engine can provide significantly improved filtering capabilities over the known art by allowing the user to drill-down to "User Details" and "Device Details". The drill-down dashboards for users and device also link to the other dashboards, making it much easier to explore specific device- or user-specific data by keeping the device and data/time context. For the non-limiting example shown in FIG. 8, by clicking on "Mary Jones' iPhone 6S" device in the VPN Audit dashboard shown below, the user is taken to the "Device Details" dashboard in FIG. 9. The Device Details show device-specific information in the Activity logs table and Activity map panel. From this dashboard, the user can fan out to other dashboards while maintaining the "Mary Jones' iPhone 6S" context by clicking on the links to other dashboards. Clicking any link to another dashboard keeps the "Mary Jones' iPhone 6S" context and selected time (24 hours). In this example, the IP Location Audit link can be clicked on in the Dashboard drilldown panel to ascertain whether Mary's device might be compromised. By clicking the link, the IP Location Audit dashboard opens with the time and device information filters automatically configured (see FIG. 10) to maintain context. Looking at Mary's application session activity, it can be seen that she had suspicious activity in Singapore that should be further investigated.

Figure 11:
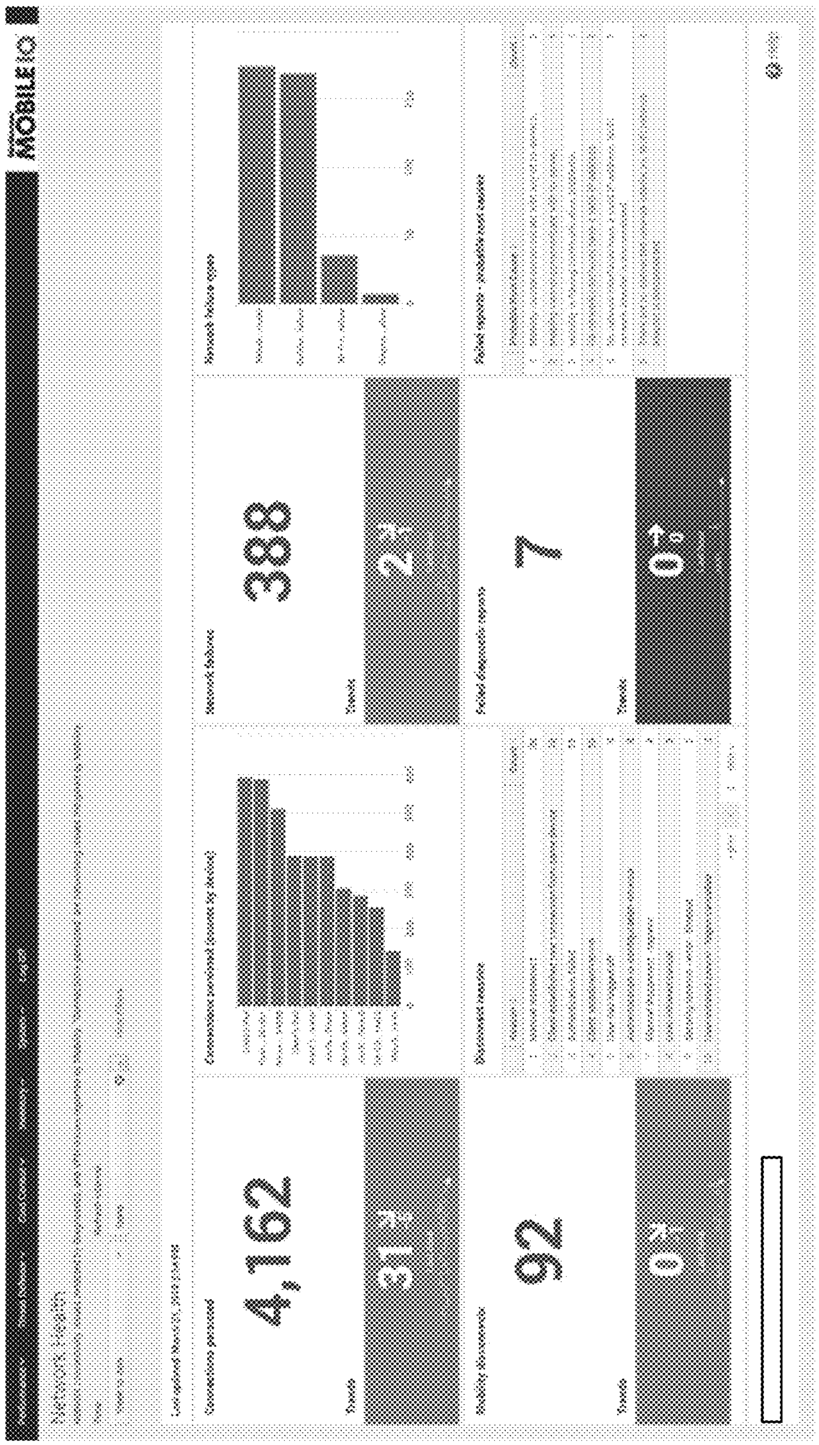

For analyzing performance and network health, the dashboard in FIG. 11 can be provided for administrators and managers to understand the overall mobile connectivity health and most common problems experienced by mobile workers using cellular and Wi-Fi networks. This dashboard can show connection problems detected by Diagnostics and VPN issues reported by or resolved by Mobility. Further, this dashboard can provide complete information when customers are running the Mobility client and the Diagnostics client on their mobile devices. From the dashboard, administrators and managers can see how healthy the networks are that are being used by the mobile workers, whether a network's health getting better or worse, which users and devices are having connection problems, what the most common reasons for network connection failures are, what the most common reasons Diagnostics connection reports report failures are, how often Mobility is shielding mobile workers from the adverse impacts of connections problems, which devices are benefiting the most by running Mobility and what the most common reasons are for workers disconnecting from the Mobility VPN.

Figure 12:

The Network Bandwidth dashboards provide a statistical analysis of network throughput—send, receive and latency—measured by the mobile devices running Diagnostics bandwidth while connected to cellular, WiFi and Ethernet networks. These dashboards can be configured to default to displaying the statistical average, but also support median, maximum, minimum, 90th percentile and 10th percentile. These dashboards can be populated by manual or automated bandwidth tests run on the mobile devices with the Diagnostics client. The Cellular Bandwidth Summary by Carrier dashboard in FIG. 12 can shows what the actual throughput that is provided to the organization's devices by mobile carrier(s), whether the carrier's network is delivering sufficient throughput to run an application that requires a certain level of throughput or latency (e.g. VoIP or real-time video conferencing), how widely the carrier network throughput varies by time of day or day of the week, which carriers are providing the best/worst throughput and latency, and whether bandwidth on a carrier's network varies materially between device manufacturers or models. With this information, the administrators and managers can understand when poor network performance is isolated or pervasive, so as to know whether to involve a carrier or device manufacturer, provide details of any performance problems observed with respect to the carrier or device manufacturer, so they have enough information to diagnose, explain and rectify the problem, understand when poor performance may be due to devices or configuration problems (e.g. device driver or antennae location), implement and deploy VPNs and applications designed to perform well with the measured performance of our network(s), and make better informed decisions when contracting with carriers for service.

Figure 13:

The Cellular Bandwidth Summary by Cell Tower ID dashboard in FIG. 13 can show which cellular towers are providing the best/worst throughput and latency, whether there are any cellular towers in carrier's network consistently underperforming, whether a cellular tower's performance varies by time, which cellular towers are used most frequently by mobile workers, and does the throughput provided vary based on the time of day or day of the week. With this information, the administrators and managers can provide specific information on tower performance to the carrier so that they have enough information to diagnose, explain and rectify the problem, advise mobile workers to switch to an alternate carrier or to Wi-Fi when they enter an area serviced by a poorly performing tower, deploy VPNs and applications designed to perform well even when a tower's performance falters, and make better informed decisions when contracting with carriers for service.

Figure 14:
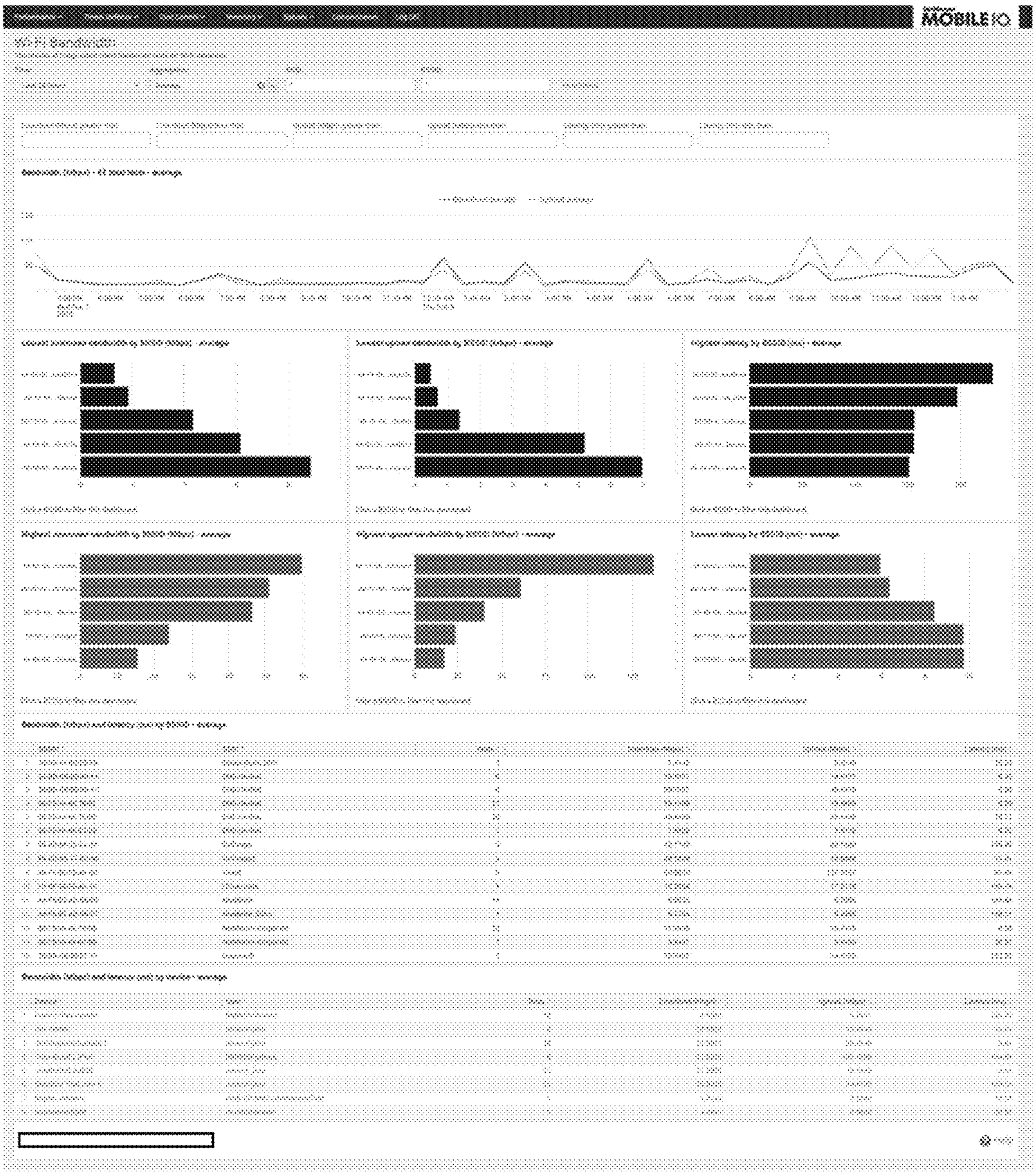

The Wi-Fi bandwidth in FIG. 14 can show what the actual throughput provided by the Wi-Fi networks in use by mobile workers is, whether the throughput provided by Wi-Fi networks varies based on the time of day or day of the week, whether there are Wi-Fi networks delivering sufficient throughput to run a mission-critical application, which Wi-Fi networks (SSIDs) are providing the best/worst throughput and latency, whether there are any access points (BSSIDs)

performing poorly, and which are the most- and least-used access points in a Wi-Fi network. With this information, the administrators and managers can add or upgrade access points (BSSIDs) to improve coverage or performance, and deploy the Mobility VPN and applications designed to perform well even when a Wi-Fi network's performance falters.

Figure 15:
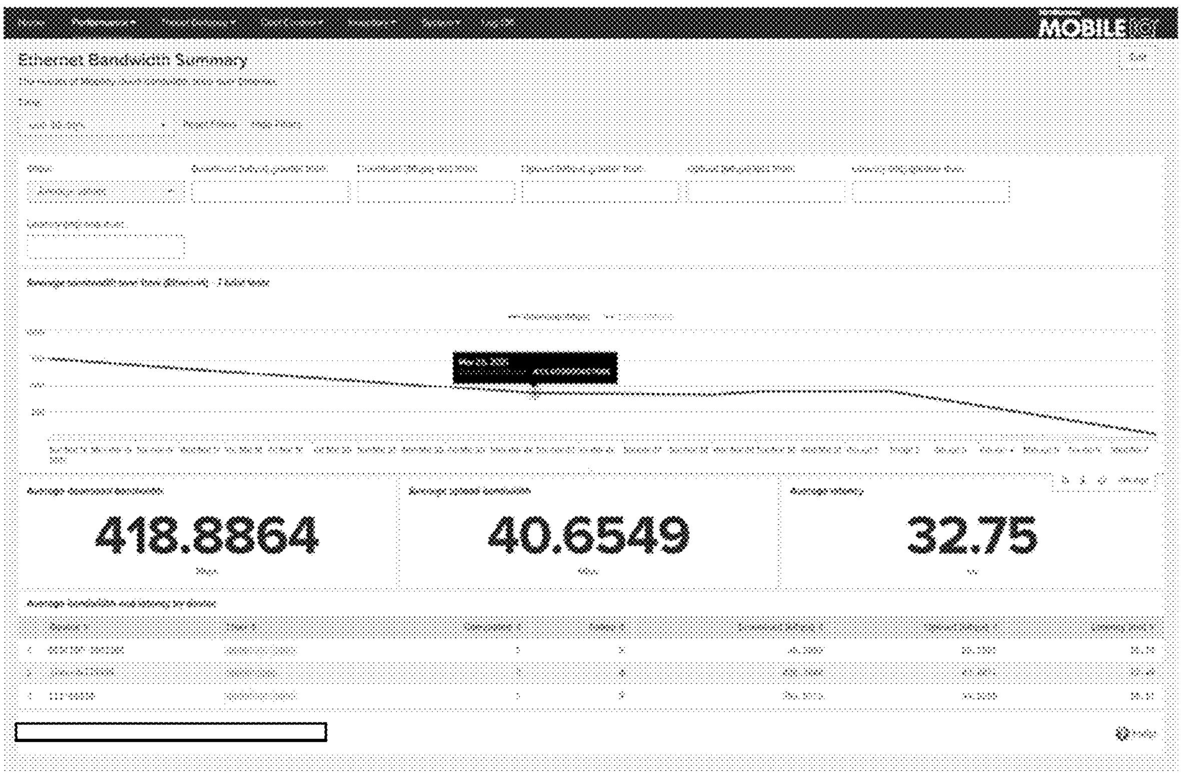

The Ethernet Bandwidth Summary dashboard in FIG. 15 can show how often mobile workers are using Ethernet instead of wireless network, what the actual throughput provided by the Ethernet networks in use by mobile workers is, whether there are Ethernet networks delivering sufficient throughput to run mission-critical applications that require a certain level of throughput or latency, and whether there are appreciable variances in mobile worker bandwidth test results on the Ethernet networks. With this information, administrators and managers can identify performance problems with worker's who connect using their wired, home networks, and identify workers who spend most of their time working in the office and redeploy their equipment to more mobile employees.

Figure 16:
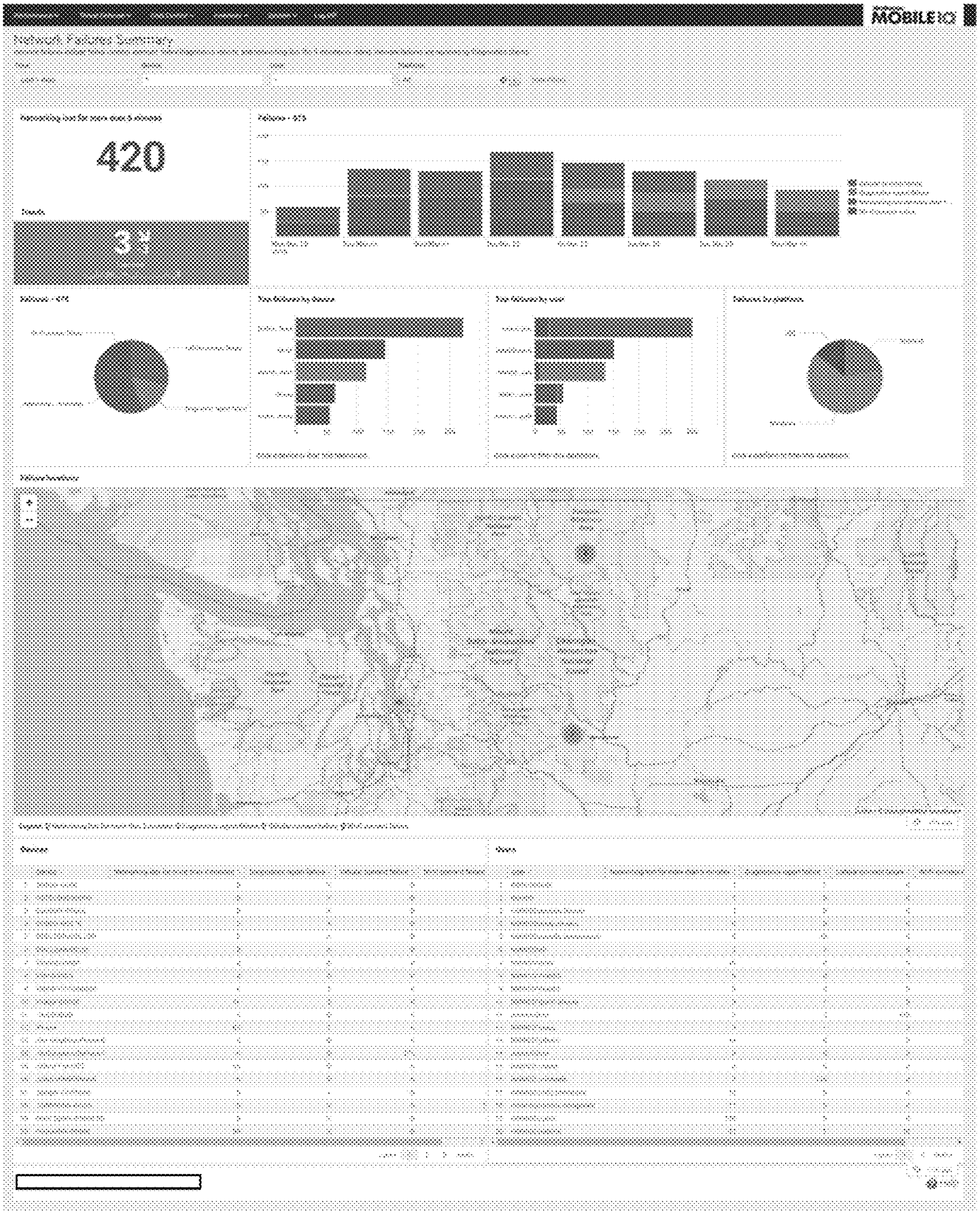

The Network Failures Summary dashboard in FIG. 16 can help managers and administrators understand why, when and for which employees' mobile network connections are failing. For this dashboard, Reporting engine the reporting engine can use data from failed network connection attempts, failed Diagnostics reports, and networking losses extending for 5 minutes or more. Events reported in this dashboard can come from mobile devices with the Diagnostics client and from manual or automated diagnostic reports. With the Network Failures Summary can show how frequently mobile workers are experiencing extended connection losses (more than 5 minutes), which networks had the most failed connections, whether there are any concerning trends with connection failures and whether they are increasing or decreasing, which users, devices and platforms are experiencing the most connection failures, whether connections fail more frequently at certain days/times, and where connection failures occur. From this information, administrators and managers can reduce help desk call resolution times by quickly determining (a) that a certain type of device experiences more failures, (b) that applications are not the cause of connectivity failures, or (c) which networks experience the failures by time and location, implement and deploy the Mobility VPN and applications that work in less reliable networks, purchase platforms that consistently have fewer network failures, and make better informed carrier choice decisions.

Figure 17:
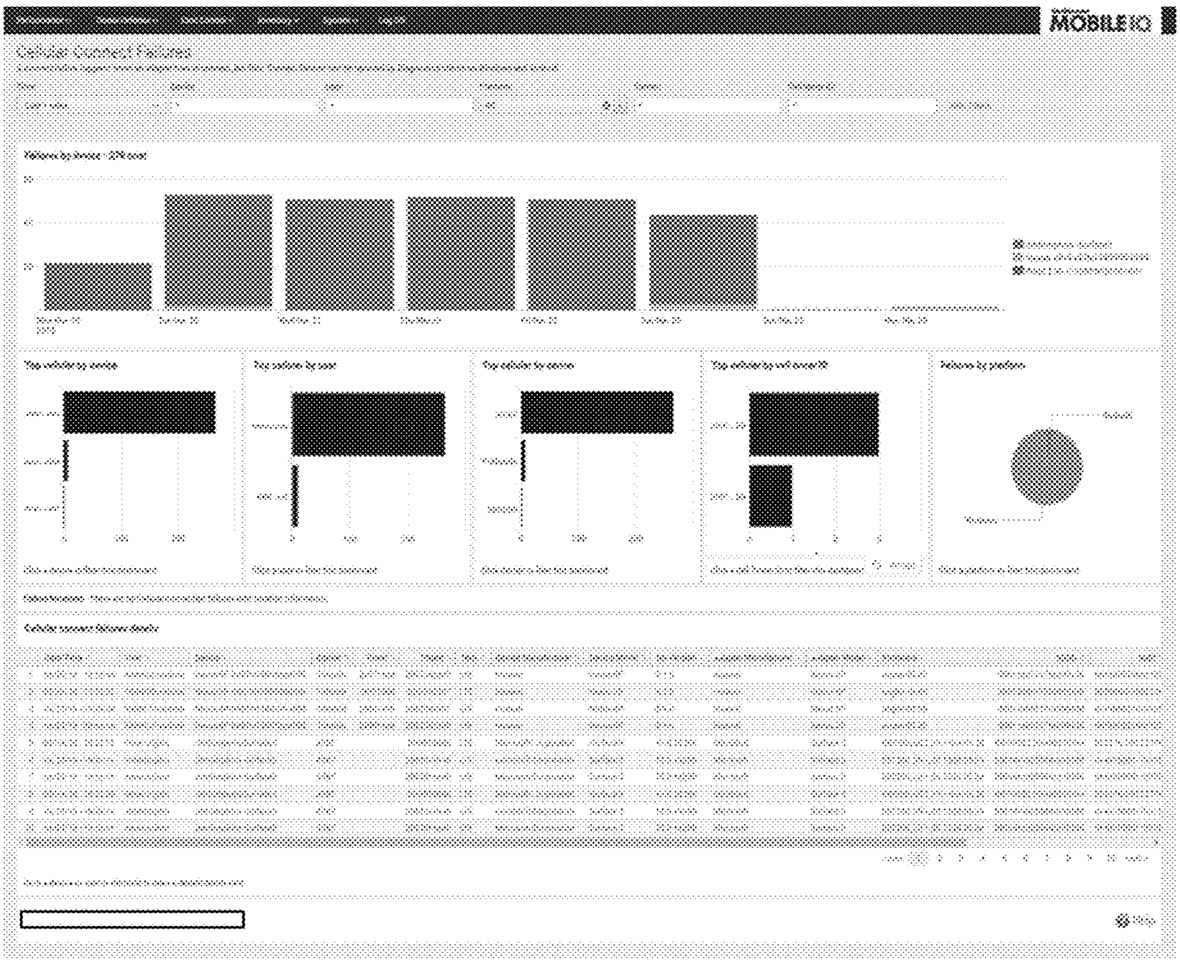
Figure 18:
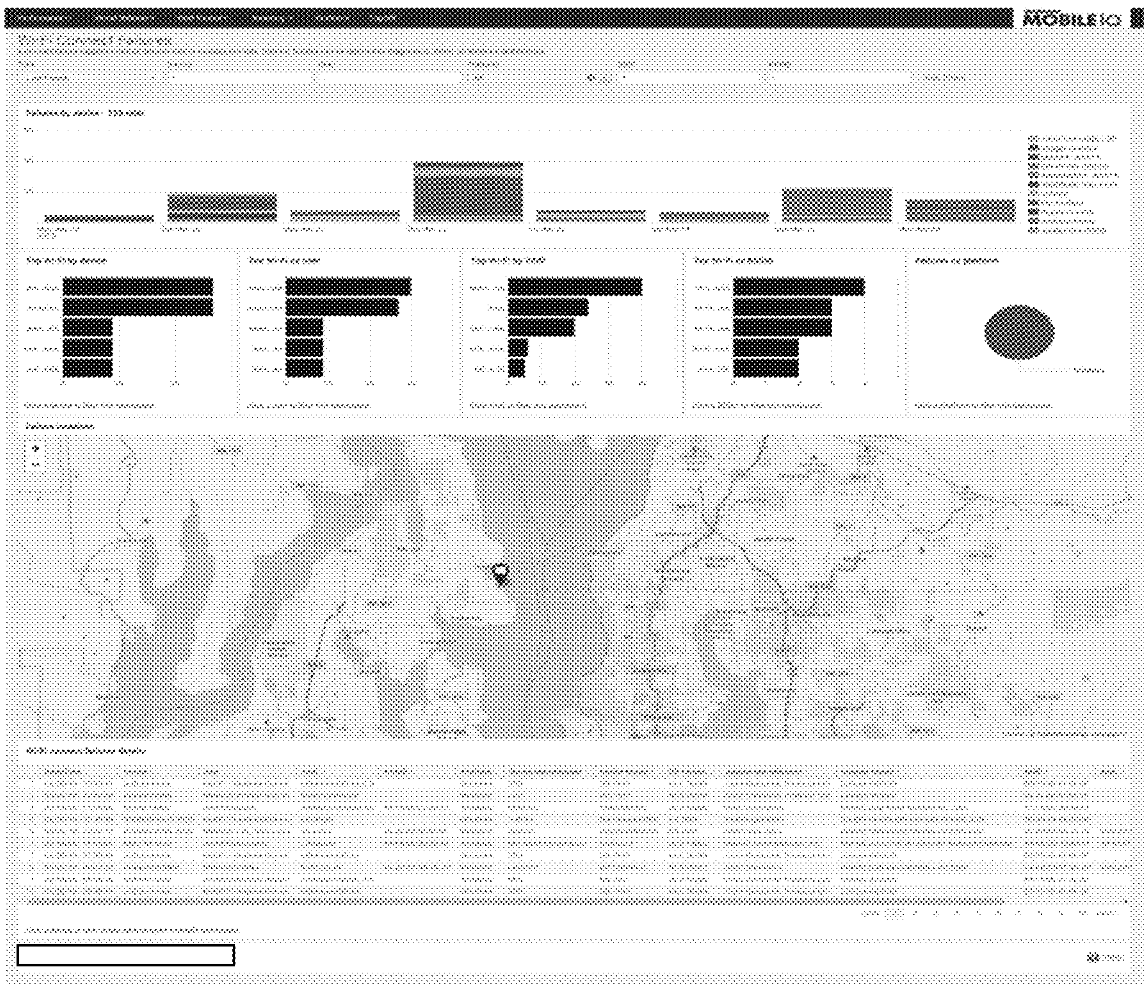

The Connect Failure dashboards can help managers and administrators understand where and when mobile devices are unable to connect to a wireless network, Wi-Fi or cellular. For this dashboard, reported events can come from mobile devices running the Diagnostics client. The connect failures can be presented for cellular (FIG. 17) or WiFi (FIG. 18) connections. The Connect Failure dashboards can show when and on which devices cellular or Wi-Fi connection failures occurring, whether there are any devices experiencing more network connection failures than other devices, which users are experiencing the most network connection failures, on which cellular or Wi-Fi networks the most network connection failures occur, on which carrier, cellular tower, Wi-Fi network (SSID) or Wi-Fi access point (BSSID) users experiencing frequent failures, and what can be done about this information. With this information administrators and managers can identify problematic coverage locations or equipment in your Wi-Fi network and deploy patches or new equipment to resolve the problem, identify problematic coverage areas or towers in a carrier's network and provide detailed information to help the carrier troubleshoot and resolve the issue, quickly determine that applications are not the cause of connectivity issues, implement and deploy VPNs and applications that work under these performance characteristics, improve your deployment by purchasing platforms that consistently have less connection failures, reduce helpdesk call resolution time by identifying network related failures by time and location, and make better informed carrier choice decisions.

Figure 19:
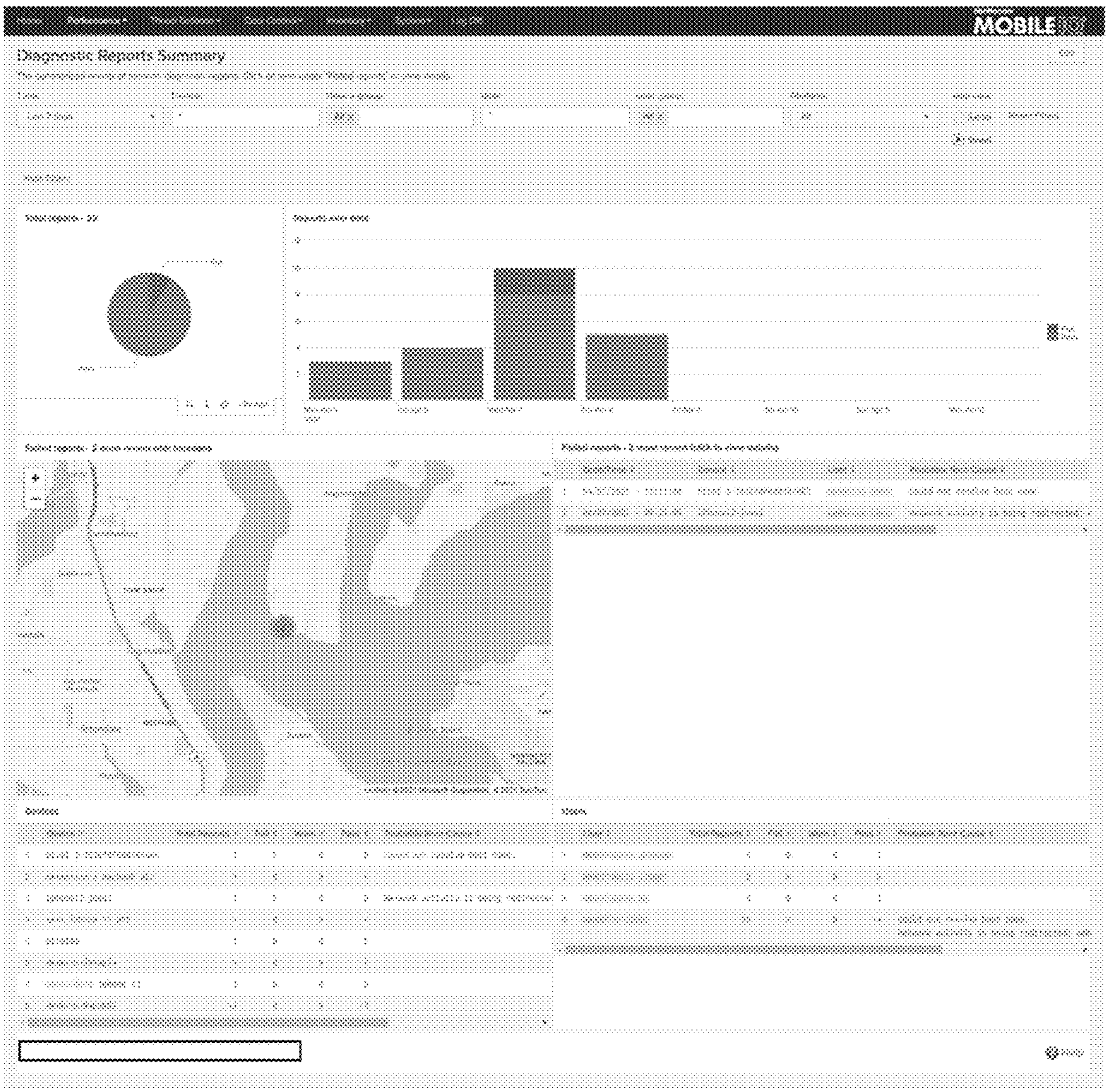

The Diagnostics Reports Summary dashboard in FIG. 19 can be provided for administrators and managers who want to see a summary analysis of diagnostic reports from mobile devices and understand and act on the leading causes of failure. Event reported in this dashboard come from manual and/or automatic diagnostic reports generated by the Diagnostics client. This dashboard shows how many Diagnostics connection reports are failing/warning/passing, whether there are failures and warnings from Diagnostics connection reports increasing or decreasing, what the results of the most recent Diagnostics reports are, what the most common causes of warnings and failures for a specific user or device, or for the entire mobile deployment are, which users/devices are experiencing failures and warnings most frequently and where are failures occurring. With this information, administrators and managers can reduce helpdesk call resolution time by identifying failures by time and location and drilling down on the cause for a specific user or device, quickly determine the most common cause of connectivity issues for your mobile deployment, identify problematic devices, and purchase platform that are more reliable with fewer failures, and implement and deploy VPNs and applications that work under these performance characteristics.

Figure 20:
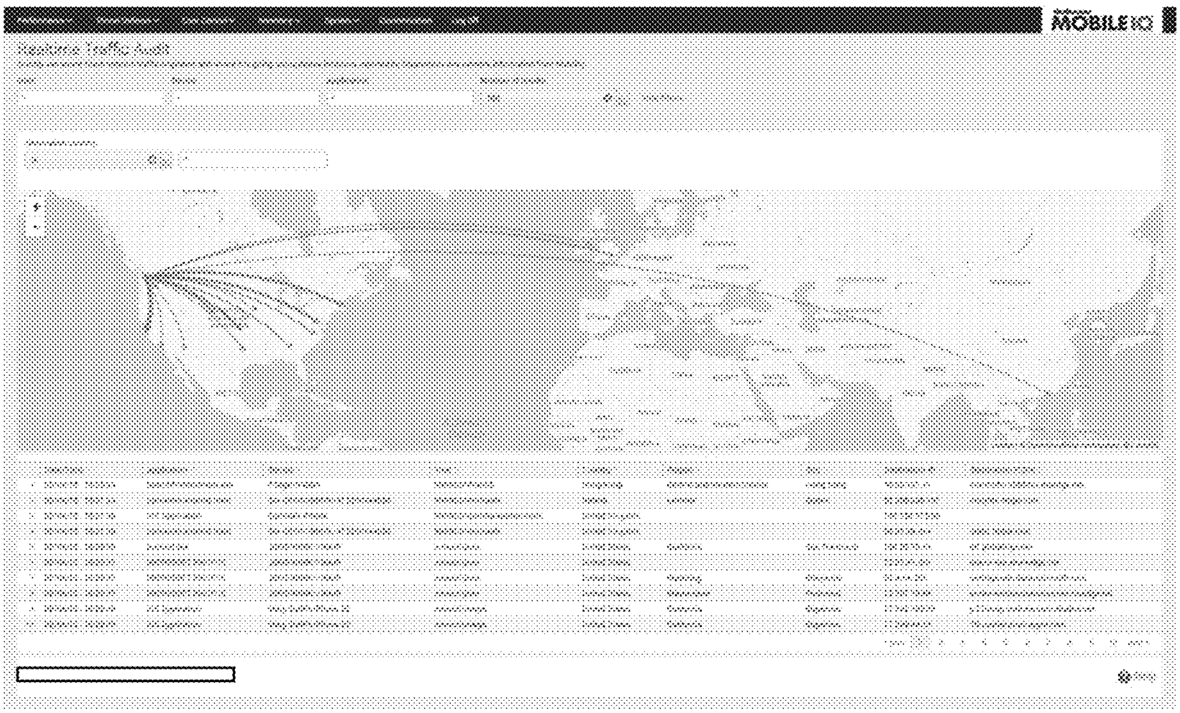

The Realtime Traffic Audit dashboard in FIG. 20 is part of the threat defense. This dashboard provides a real-time snapshot for IT operations and security managers to see where client network traffic is currently originating and where it is going—what countries, states, cities, IP address and domains mobile devices are communicating with, and which users and devices are communicating. Events reported in this dashboard use the device location reported by Diagnostics and traffic flow destinations from application that are generated by Mobility. This dashboard can show whether there are any compromised devices that are compromising company data or threatening corporate security, what applications, websites, and servers a user currently accessing, where mobile network traffic going (countries, states, and cities) right now, which devices are communicating with servers or resources outside the city or country, and what IP addresses and domains mobile workers are communicating with. With this information, administrators and managers can discover viruses and malicious applications on devices or risky behavior by mobile workers, and then quarantine or remediate the device/user.

Figure 21:
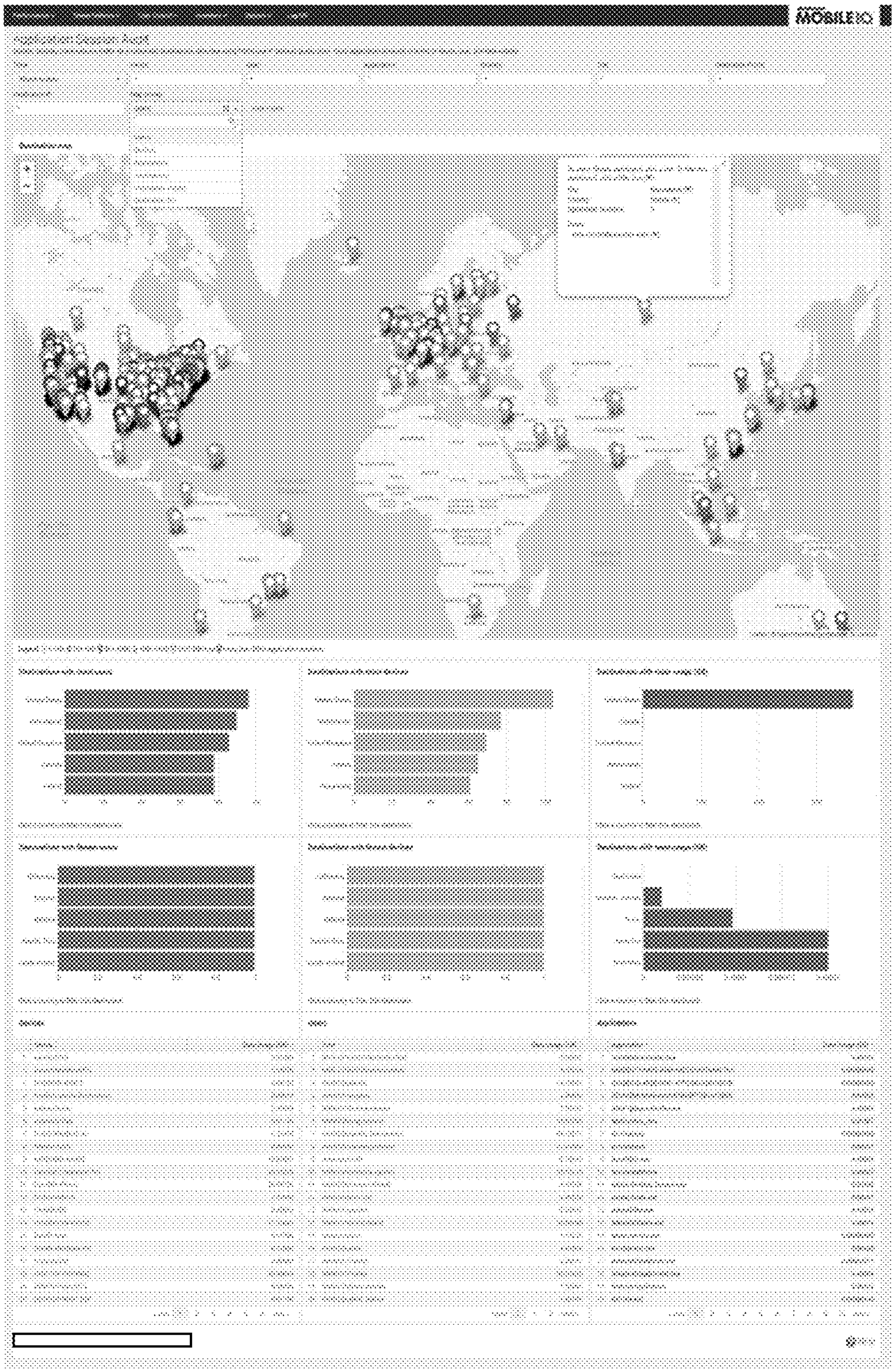

Traffic Destination Audit in FIG. 21 is another threat defense dashboard. This dashboard provides IT operations and security managers to monitor Mobility client network traffic for problematic destinations, detected using FQDN and IP address geolocation. Track application sessions in terms of device, user, application, destination, FQDNs, Destination IPs and data volume. This report defaults to the last 24 hours but may be configured for specific date ranges. For example, view behavior for the last week or month. Pushpins default to displaying users, but can be changed to display device, applications, destinations, fully-qualified domain names (FQDNs), or destination IP addresses. Combined with powerful filtering capabilities on the filter bar and in the pushpin pop-ups, this dashboard provides a rich environment for investigations into security and data threats. Events reported in this dashboard use the device location reported by Diagnostics and traffic flow destinations from application that are generated by Mobility. This dashboard can be used to determine whether users or applications are sending or receiving data with unexpected locations, whether there are any compromised devices that are exfiltrating company data, where mobile network traffic is going (countries, states, and cities) right now, which devices, users, or applications are communicating with servers or resources outside the city or country, what IP addresses and domains are mobile workers regularly accessing, and what destinations have the most users, devices, and data. With this data, administrators and managers can discover, e.g., an employee running the free personal version of Skype was communicating with servers in Russia, and/or a developer with an Apple Mac at home running an application compromised with malware that was sending data to Asia. After the malware is removed, the same report can be used to verify that the machine is no longer sending and receiving from unauthorized locations.

Figure 22:
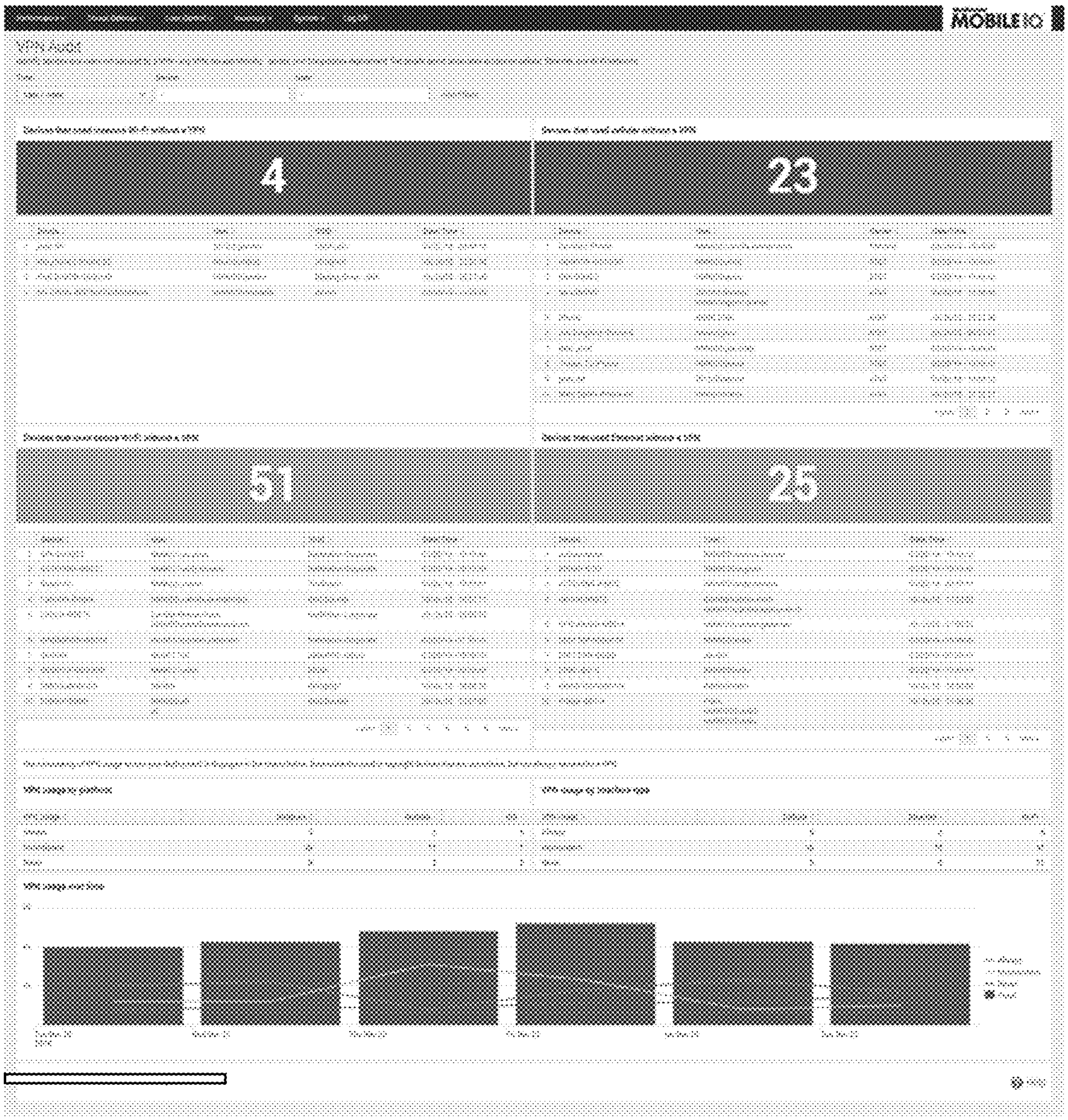

The VPN Security Audit in FIG. 22 is a part of the threat defense that allows an IT manager to audit to see which devices and users are not using a VPN—any VPN, not just Mobility—in the mobile deployment, providing details about unsecured network access on cellular, Ethernet, and Wi-Fi networks. The report can be color coded according to the risk level of the network that is being used without a VPN. Insecure Wi-Fi networks and carrier networks that have the potential to traverse the Internet are the least secure and when used without a VPN (shown in Red.) Networks with layer 2 security accessed without a VPN are color coded yellow. This report can default to, e.g., the last 24 hours but may be configured for specific date ranges. In this way, it can be seen when and where this occurred by clicking on the users and devices identified in the tables and going to user and device detail dashboards. Events reported in this dashboard can use data gathered from the Diagnostics client. This dashboard can be used to determine whether there are users, devices, or data at risk because a worker is connecting to insecure networks without a VPN, what Wi-Fi access points were used without a VPN, and what Carrier networks were used without a VPN. With this information, administrators and managers can identify policy changes to reduce corporate risk to man-in-the-middle attacks, TLS stripping attacks, and other malicious network threats, change the configuration of devices to enforce safer mobile connectivity practices among workers, use MDM/EMM to configure Wi-Fi policies to Lock down the system so VPNs cannot be disabled, and perform forensic analysis for specific time periods to identify where the lack of VPN usage may have given bad actors an opportunity to initiate attacks.

Figure 23:
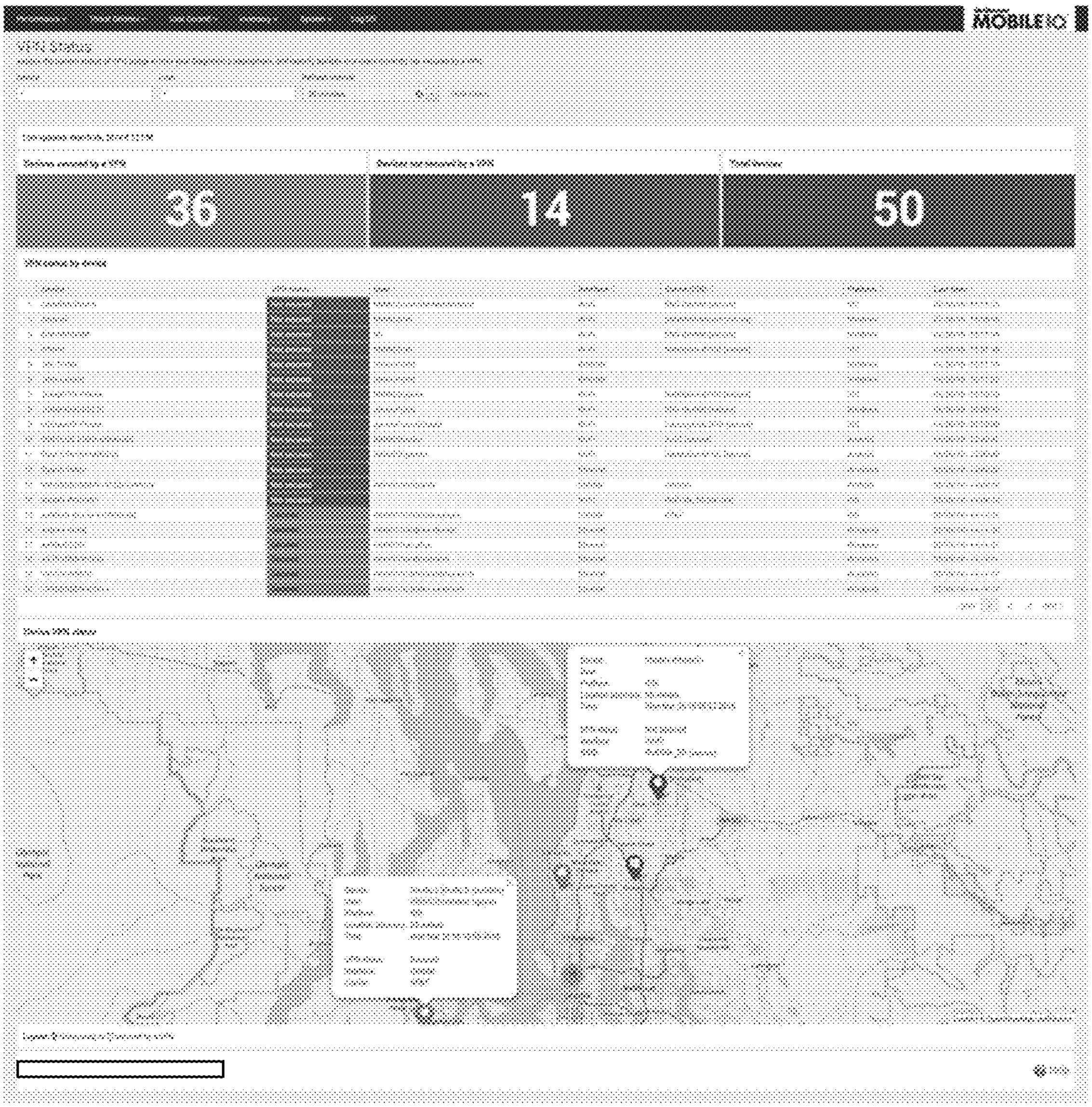

VPN Status in FIG. 23 is also part of the threat defense for administrators who need to know if users are currently connecting to insecure and risky networks without the protection of a VPN—any VPN, not just Mobility. The dashboard shows a real time status of VPN usage across you're the mobile deployment and identifies connections by device and user that not secured by a VPN. The status refresh interval is configurable from 5, 10, and 30 minutes. A map displays active users running the Diagnostics client, and is color coded for easy identification. Green indicates the VPN is enabled. Red indicates the VPN is disabled. Events reported in this dashboard can use data gathered from the Diagnostics client. This dashboard can be used to show many deployed users are and are not currently using a VPN, where on a map users currently not running a VPN are located, what Wi-Fi access points were used without a VPN, and what Carrier networks were used without a VPN. With this information, administrators can identify policy changes to reduce corporate risk to man-in-the-middle attacks, TLS stripping attacks, and other malicious network threats, change the configuration of devices to enforce safer mobile connectivity practices among workers, use MDM/EMM to configure Wi-Fi policies to Lock down the system so VPNs cannot be disabled, and perform forensic analysis for specific time periods to identify where the lack of VPN usage may have given bad actors an opportunity to initiate attacks.

Figure 24:
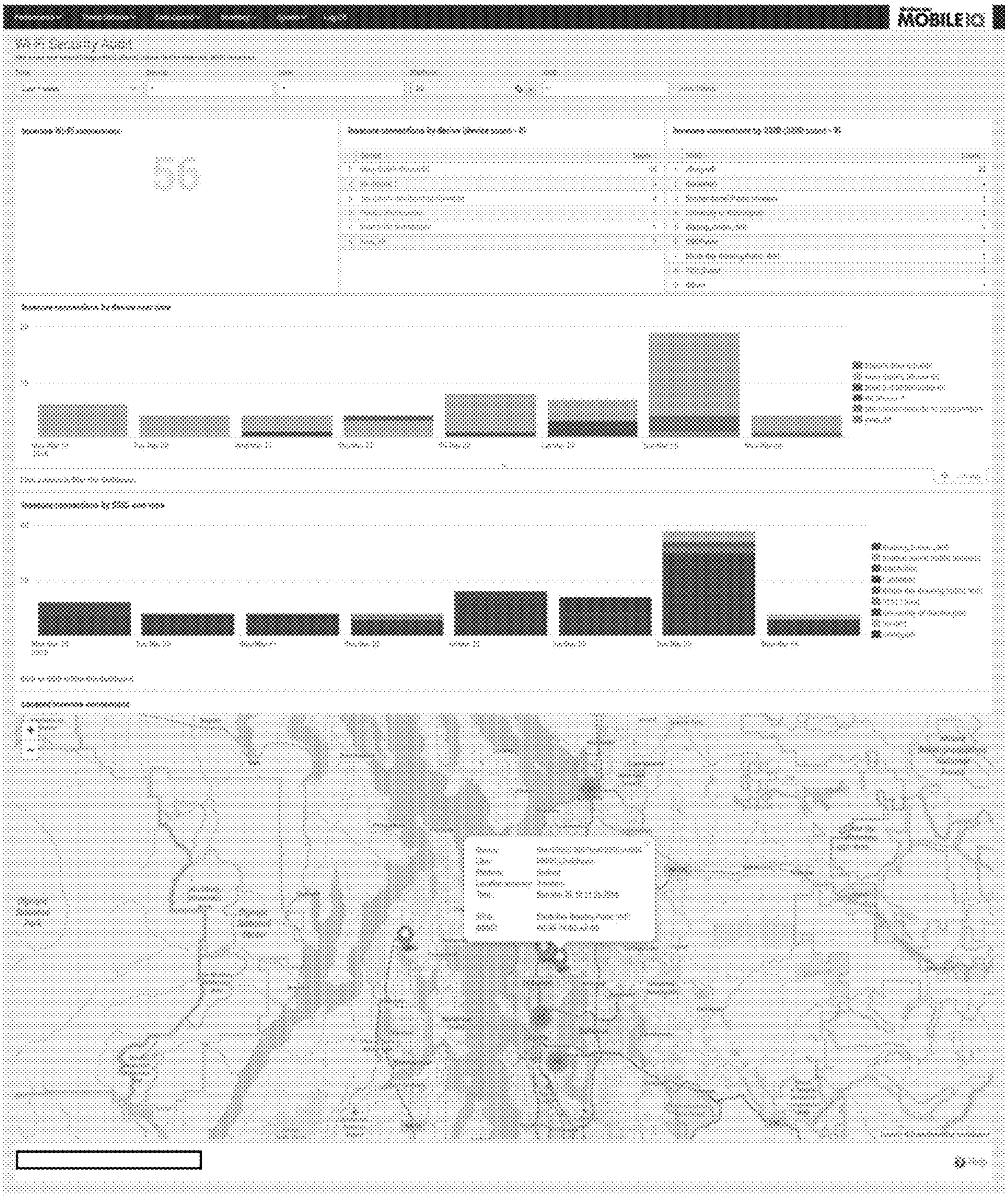

The Wi-Fi Security Audit dashboard in FIG. 24 is for operations and security staff who needs to know where and when users are using connecting to unsecured Wi-Fi access points. It can identify users, devices, and access point by SSID and BSSID. Use the map to see locations of insecure access points. Events in this dashboard can use data gathered from the Diagnostics client. This dashboard can show which users and devices are accessing the Internet using insecure Wi-Fi access points, what insecure Wi-Fi access points were used, where insecure access points were used, and how access point security changes over time. With this information, operations and security staff can enforce VPN usage when users connect to Wi-Fi networks, configure strong encryption on corporate-managed access points, use policies to lock down the system so insecure access points cannot be used to protect against man-in-the-middle attacks, TLS stripping attacks, and other malicious network threats, use MDM/EMM to configure Wi-Fi policies and change device configuration, and report for specific time periods while performing forensic analysis to identify where insecure Wi-Fi usage may have given bad actors an opportunity to initiate attacks.

Figure 25:
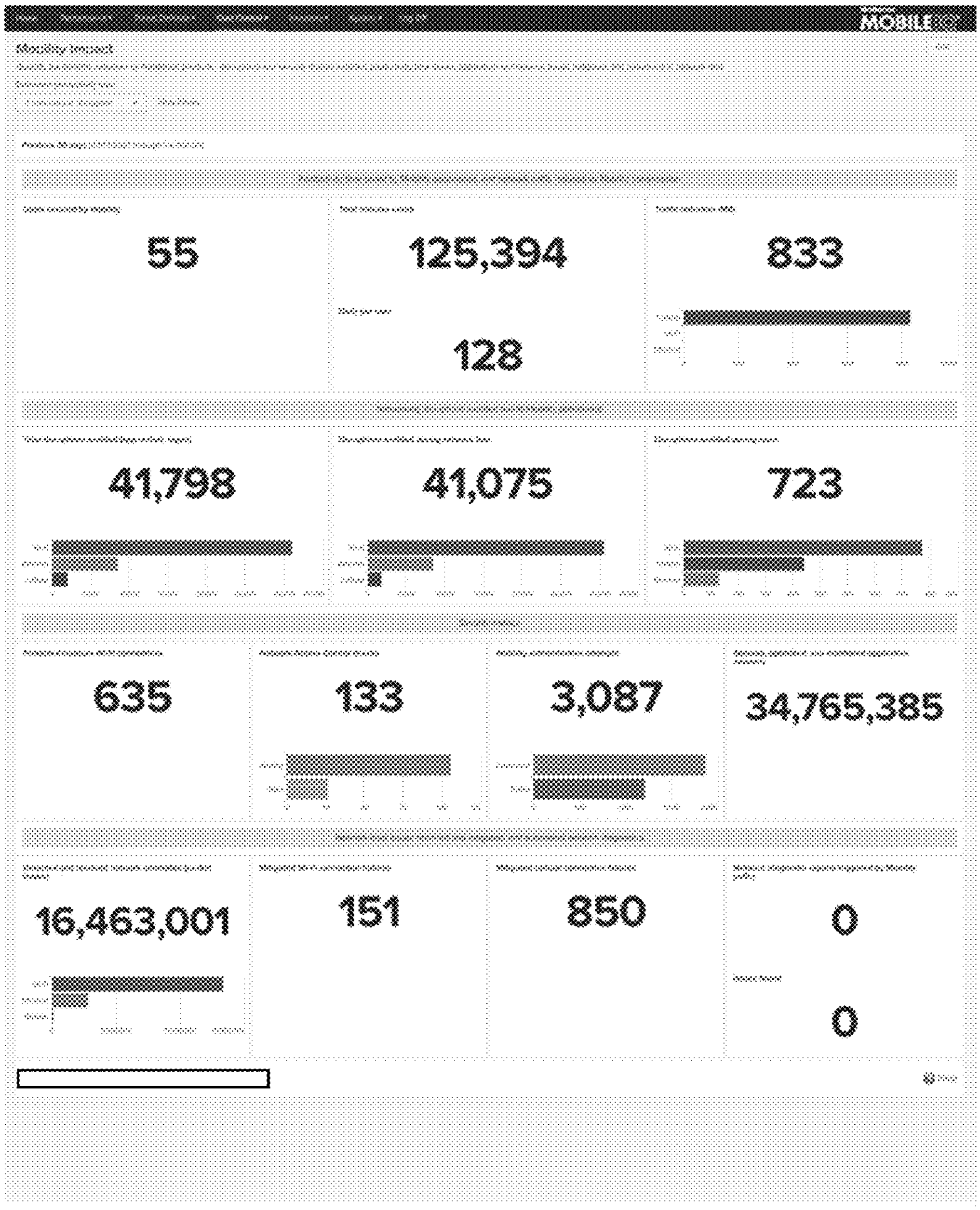

The Mobility Impact dashboard in FIG. 25 can used for cost controls, e.g., for managers who need to understand and quantify and communicate return-on-investment for the wireless products to executives and accounting staff. This dashboard, which can be collect data for a predefined period of time, e.g., 30 days, quantifies disruptions, security threats avoided, productivity time saved, application and network issues mitigated, and reductions in network data. Moreover, the number of minutes lost, on average, for each network disruption can be selected (e.g., from 1-5). Data for this dashboard can come from both the Mobility and Diagnostics clients. This dashboard can show how many users are secured by Mobility, how many productivity minutes were avoided for each user per day over the last number of days, due to compliance with the system's persistence and roaming algorithms, for each network, how much traffic reduction from data compression occurred, how many disruptions were prevented by persistence and roaming, how many times did the Mobility VPN protect users while they were on insecure Wi-Fi access points, how many application sessions were secured, optimized, and monitored for performance and threats, and how many network anomalies and threats were mitigated. With this information managers can educate managers and peers on the value of the product, help justify purchasing similar products and renewing annual maintenance, and make better return on investment decisions.

Figure 26:
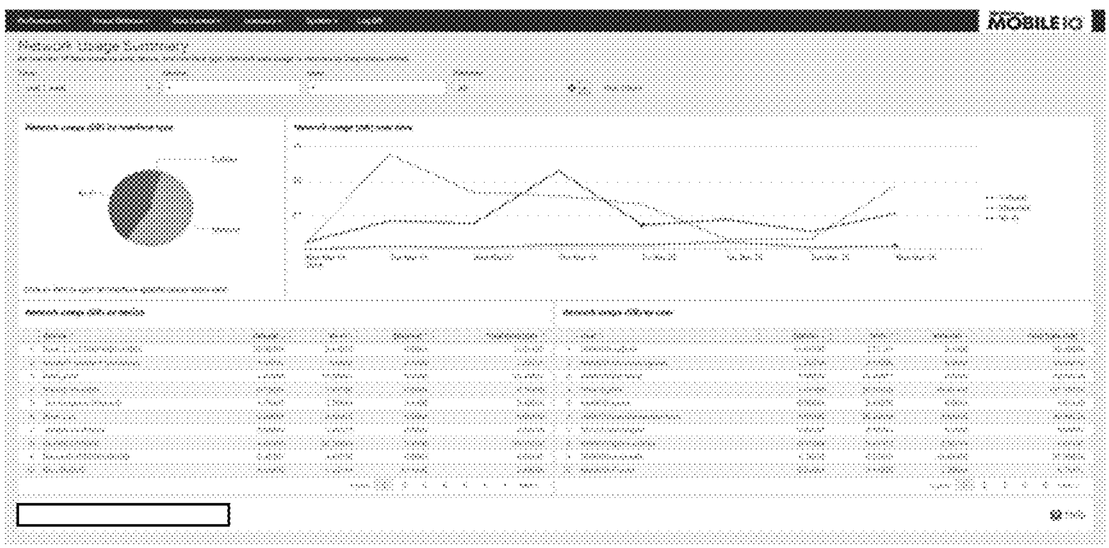
Figure 27:
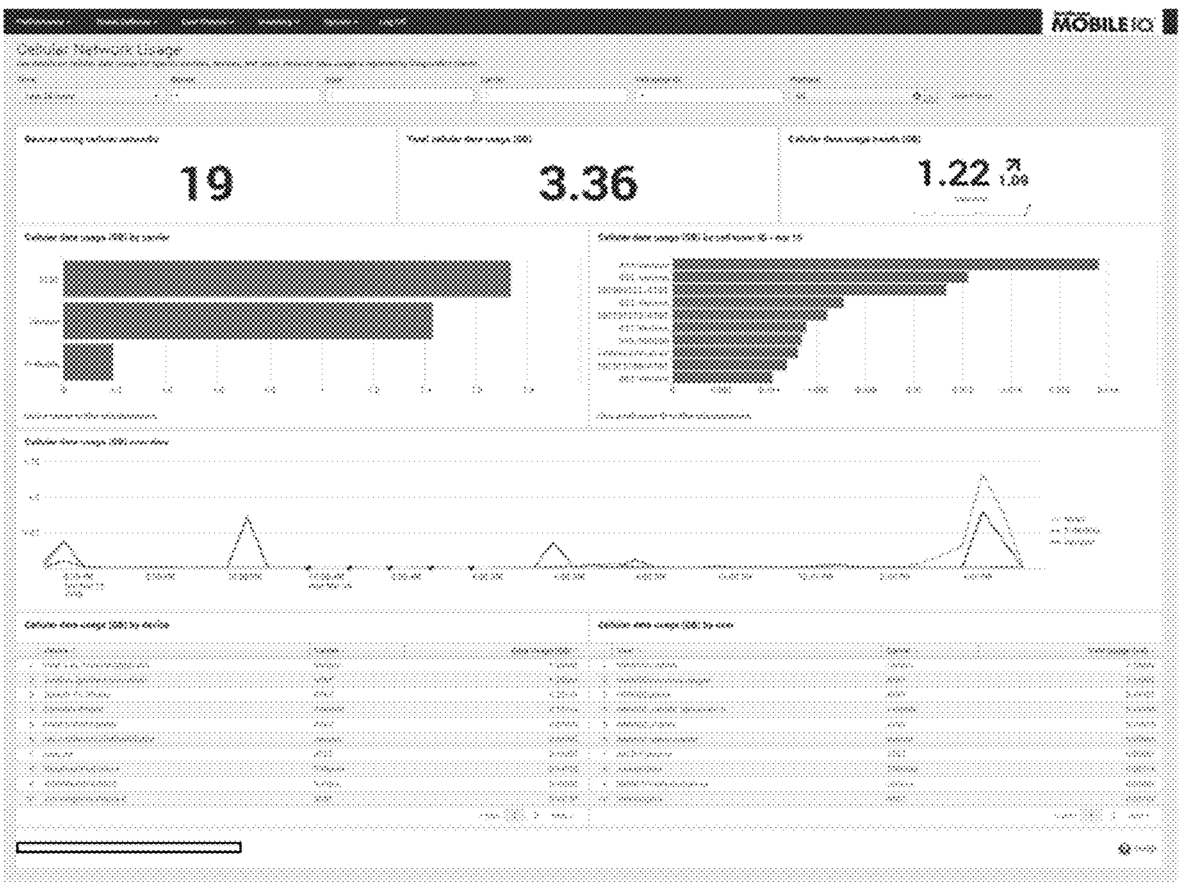
Figure 28:
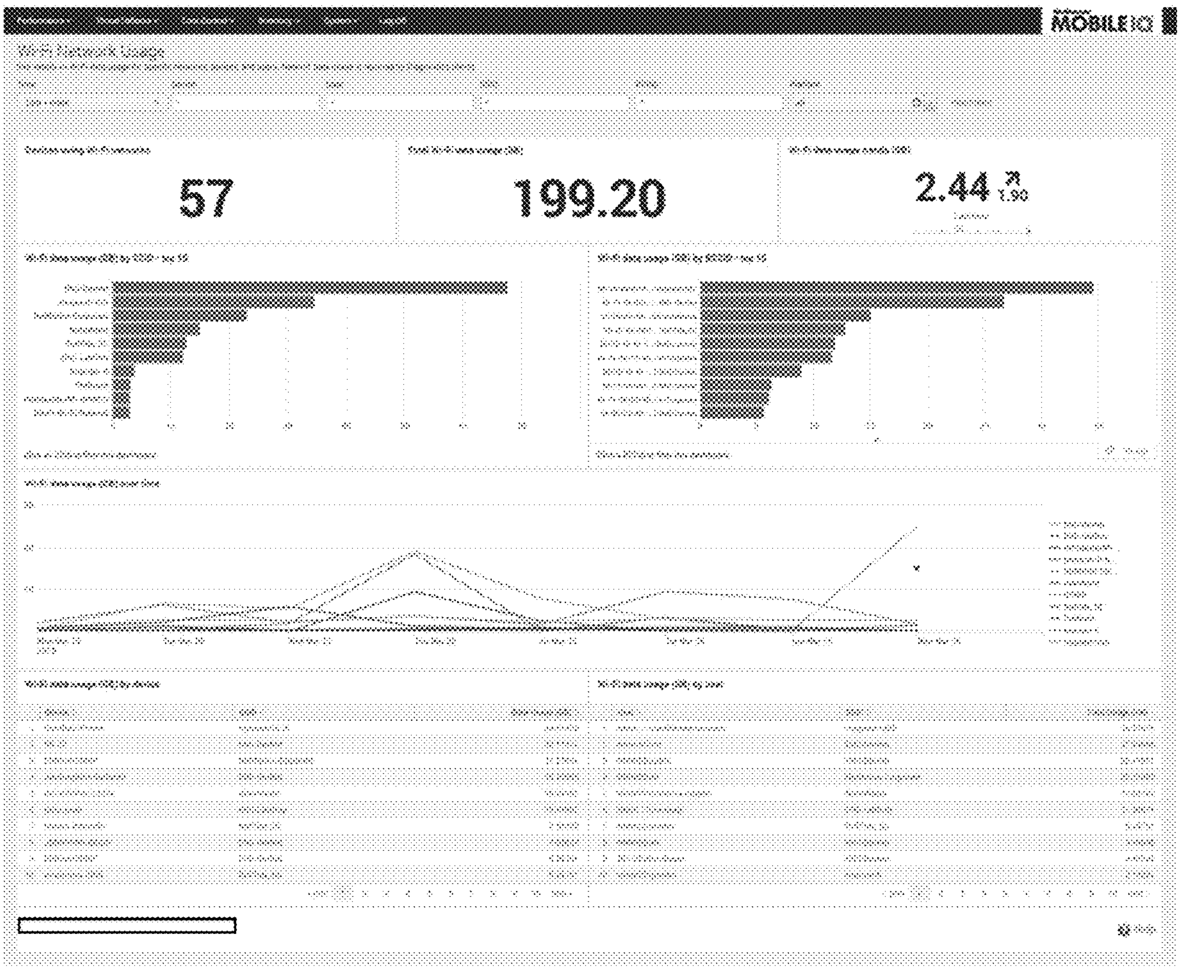

Network Usage reports are for IT and network managers who need to understand details of the mobile network usage on Carrier, Wi-Fi and Ethernet networks. Events reported in this dashboard can use data gathered from Diagnostics clients. These reports can be presented as a Network Usage Summary, Cellular Network Usage, WiFi Network Usage. The Network Usage Summary in FIG. 26 provides an overview of data usage in the mobile deployment by user, device, and interface type. This dashboard can show what is the breakdown of usage for all network types, is usage on each type of network increasing or decreasing, on which mobile platforms do users consume the most/least data, how much data are users consuming on the networks available to them, and who are the top cellular data users in the deployment. The Cellular Network Usage dashboard in FIG. 27 is for managers who need to control cellular plan costs and understand the details of cellular data plan usage for specific carriers, devices, and users. This dashboard can show on which carrier networks the company is consuming the most data, which cell towers are devices connected to when they are transmitting the most data, does usage of carriers vary by time of day or day of the week, is cellular data usage increasing or decreasing, and which devices and users are consuming the most/least cellular data. The Wi-Fi Network Usage dashboard in FIG. 28 is for managers who need to understand data usage on private and public Wi-Fi hotspots for specific devices, users, and Wi-Fi infrastructure. This dashboard can show on which Wi-Fi networks (SSID) the company is consuming the most data, which access points (BSSID) are devices connected to when they are transmitting the most data, does usage of Wi-Fi vary by time of day or day of the week, is Wi-Fi data usage increasing or decreasing, which users are using an access point, which devices and users are consuming the most/least Wi-Fi data, and when are Wi-Fi usage peeks and/or what are the trends?

Cost Control dashboards for Application Usage provide IT, business, and security managers tools to understand application usage behavior over time by device, user, application, domain, and destination (FQDN or IP). These reports offer the ability to understand and analyze traffic patterns on devices that historically do not provide information about applications, including iOS iPhones and iPads. Events reported in the Application Usage dashboard can gather data from devices running the Mobility client. Filtering to a specific device will show network data if the device is also running the Diagnostics client.

Figure 29:
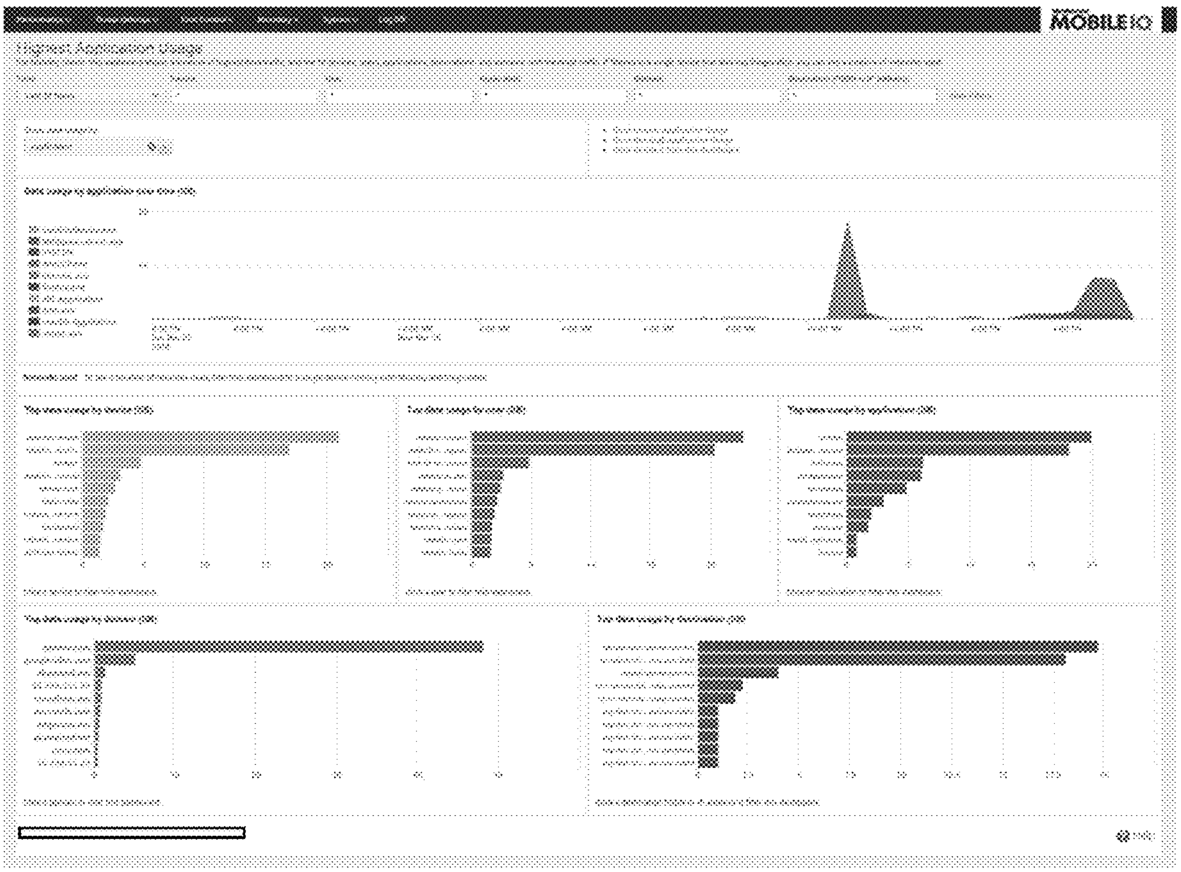

The Highest Application Usage dashboard in FIG. 29 shows a timeline of highest data traffic, and the 10 devices, users, applications, destinations, and domains with the most traffic over time. Filtering can be done down to a single device and can also display a timeline of networks used. A single device can be selected to identify specifically which applications and networks are being used. It can also identify heaviest usage by device, user, application, domain, and destination. This dashboard can show what was data usage over time, what are the top ten devices, users, applications, domains, and destinations, when did data usage occur for devices, users, applications, domains, and destinations, what networks and applications were used by specific devices, for a specific device, what applications were used on specific networks, are there any usage anomalies for devices, users, applications, domains, and destinations in the time chart, what web sites or domains are users going to, are users going to unauthorized web sites or domains when they should be working. With this information the system can use policy to block applications on specific networks to prevent overages, identify domains and destinations that should be blocked using policy on specific networks to prevent overages, identify users and devices that could benefit from data usage polices, and deploy a VPN that reduces data consumption.

Figure 30:

The Lowest Application Usage dashboard in FIG. 30 shows a timeline of lowest data traffic, and the 10 devices, users, applications, destinations, and domains with the highest occurrences of least traffic over time. Filtering can be done to a single device and can also display a timeline of networks used. A single device can be selected to identify specifically which applications and networks are being used. It can also identify lowest usage by device, user, application, domain, and destination. This dashboard can show whether the user has underutilized data plans, whether people using up-to-date applications, which users are using the network the least, which applications are least used, and which destinations are least used. With this information the user can consolidate data plans by assigning different users to underutilized equipment.

Figure 31:
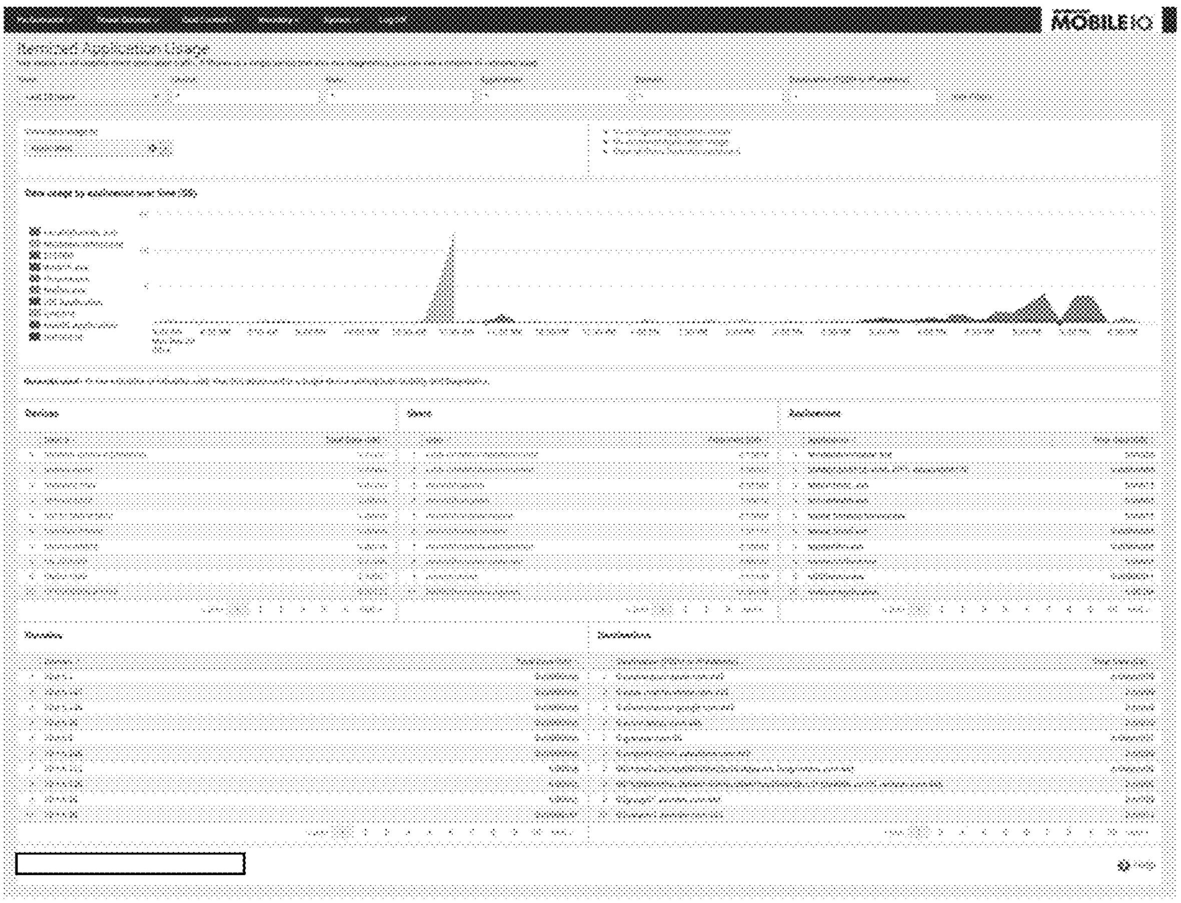

The Itemized Application Usage dashboard in FIG. 31 shows details on all client application traffic secured by the Mobility VPN. If filtered to a single device that also has Diagnostics, users can see a timeline of networks used. This dashboard can show what data usage was over time, for data usage, what are the top devices, users, applications, domains, and destinations, when did data usage occur for devices, users, applications, domains, and destinations, what networks and applications were used by specific devices, for a specific device, what applications were used on specific networks, what are the usage anomalies for devices, users, applications, domains, and destinations in the time chart, are there underutilized data plans, are people using up-to-date applications, which users are using the network the least, which applications are least used, and which destinations are least used. With this information, users can optimize data plans for usage patterns using policy, identify applications that should be blocked using policy on specific networks to prevent overages, identify domains and destinations that should be blocked using policy on specific networks to prevent overages, identify users and devices that could benefit from data usage polices, deploy a VPN that reduces data consumption, and consolidate data plans by assigning different users to underutilized equipment.

Figure 32:
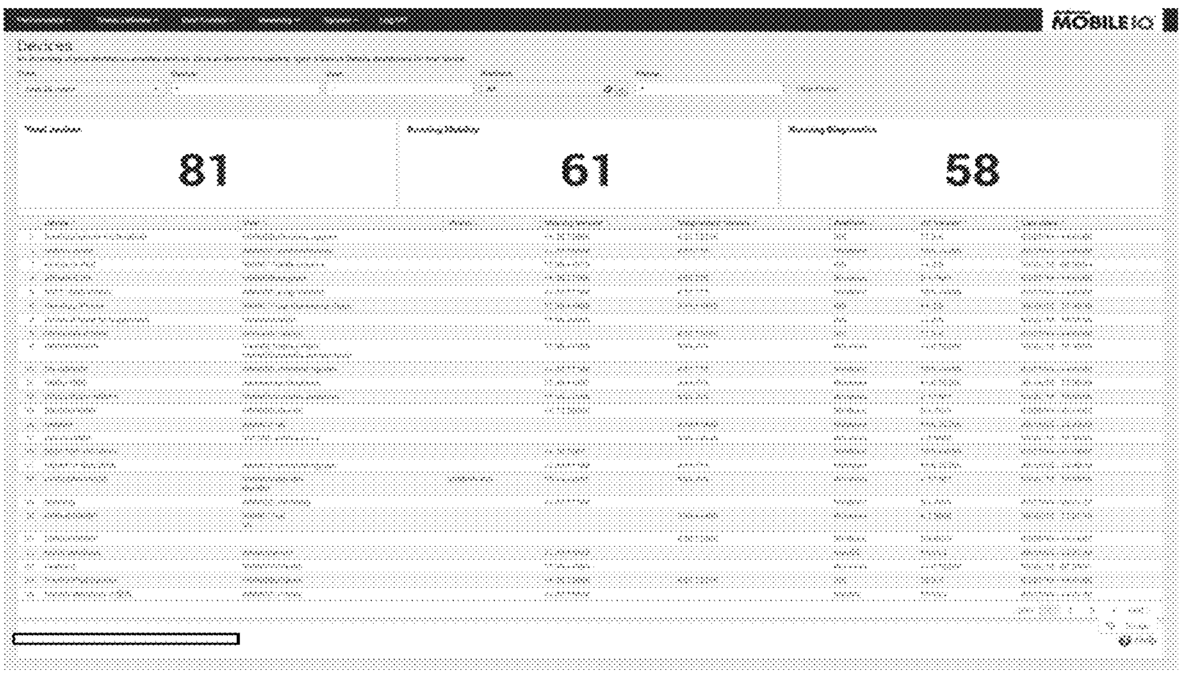

For managers or support personnel, the Devices dashboard in FIG. 32 shows the inventory list of enterprise-enabled devices. The dashboard supports filtering and sorting to quickly find a set of devices that match specific criteria or a single device. Clicking on a row in the table, opens the Device Details dashboard for the selected device. To appear on this dashboard, a device should be running at least one mobility software client connected to a server feeding data to reporting engine. The Devices dashboard displays every device that is running a Mobility client or Diagnostics client. This dashboard can shows how far has the company's rollout of mobility software progressed, does the user need to upgrade the operating system or the mobility software running on any devices, are there any devices that are not running both Mobility and Diagnostics, how many devices are running Mobility, and which versions of Mobility are they running, how many devices are running Diagnostics, and which version of Diagnostics are they running, what user is using a specific device, how many different devices is a user using, what operating systems and versions are deployed in the system, what platform and operating system version are running on a device, when was a device last used, and which devices have a phone number. With this information, managers can click on a device and go to the "Device Details" dashboard, find out which devices are not running both authorized mobility products and install clients as necessary, use an EMM/MDM system to upgrade a device's mobility software.

Figure 33:
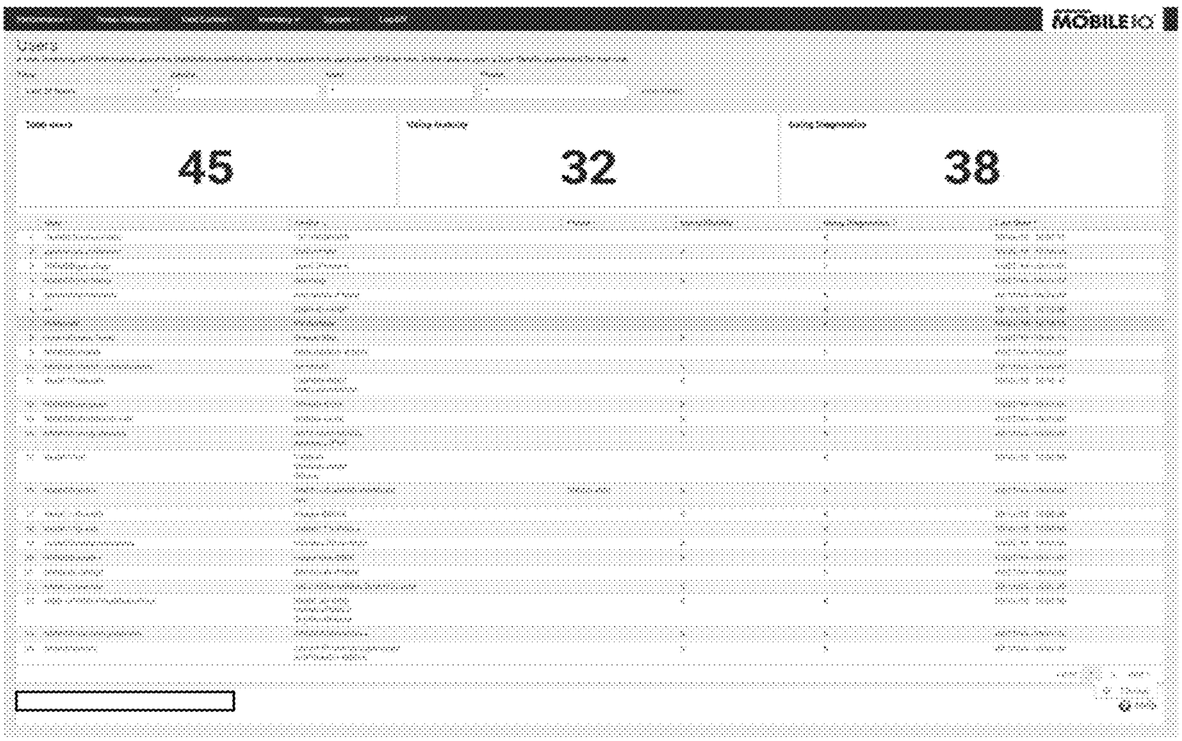

For managers or support personnel, the Users dashboard in FIG. 33 shows the inventory list of users with one or more mobility-enabled devices. The dashboard supports filtering and sorting to quickly find a set of users that match specific criteria or a single user. Clicking on a row in the table, opens the User Details dashboard for the selected user. Users with a device running at least one mobility software client connected to a server feeding data to reporting engine appear. The Devices dashboard displays every device that is running a Mobility client or Diagnostics client. The dashboard can show how far has the company's rollout of mobility software progressed, how many mobile workers are running the Mobility software, and which version are they running, how many mobile workers are running the Diagnostics software, and which version are they running, are there any devices that are not running both Mobility and Diagnostics? Is my user using Mobility, Diagnostics, or both, how many different devices is a user using, when was a device last used, and what phone number is associated with a user's device. With this information managers can locate which device is in use by a user, then click on that row to go to the User Details dashboard where you can analyze or troubleshoot performance, threats or costs, and redeploy devices that have not been used recently.

Figure 34:
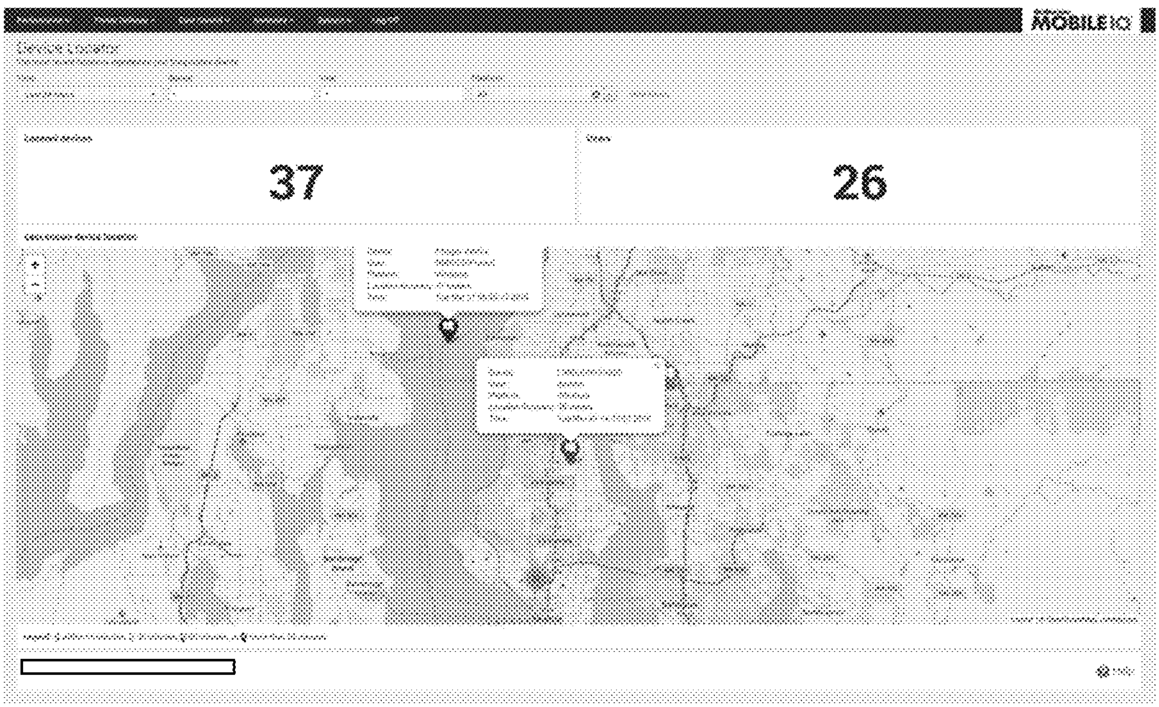

For managers and support personnel who need to know where a device is, the Device Locator dashboard in FIG. 34 shows the most recent location reported by each device running the Diagnostics client during the period. Pushpins are group can be color-code based on how recent the location was updated. Clicking on a pushpin provides a popup with links to drill-down on the device or user. Devices running the Diagnostics client appear in this dashboard. The Devices dashboard displays every device that is running a Mobility client or Diagnostics client. This dashboard can show where the devices and users are, whether there are devices continuing to report in at regular intervals. With this information managers can pinpoint the most likely location to begin looking for a device that is reported lost or stolen, and identify devices that are being used far from their user's assigned territory.

Figure 35:
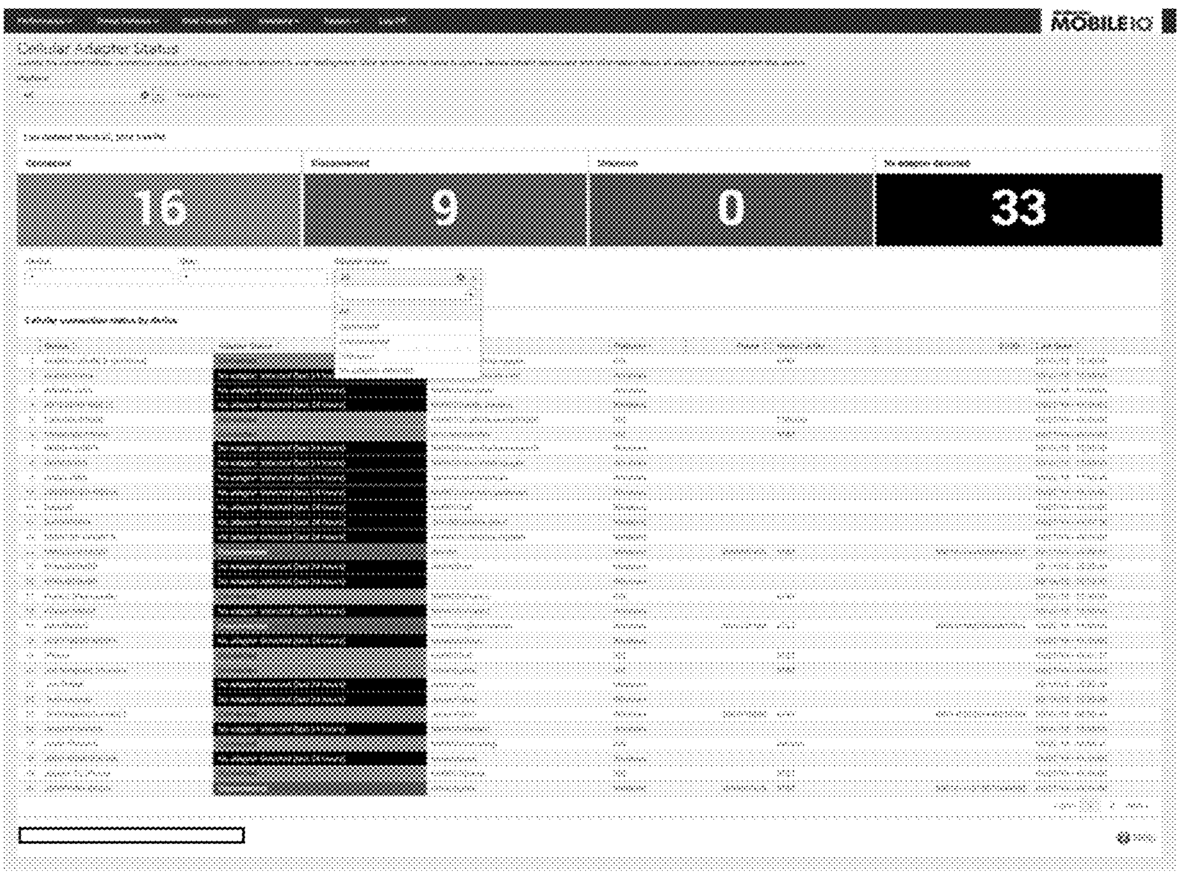

The Cellular Adapter Status dashboard in FIG. 35 is for managers and administrators who need to ensure mobile devices have correctly configured cellular adapters and that they are being actively used. Clicking a row in the table to opens the Device Details dashboard with information about all adapters associated with that device. Devices running the Diagnostics client appear in this dashboard. This dashboard can show which devices do not have an active cellular adapter, or an adapter that is not configured correctly. With this information, managers can make sure devices are configured correctly before deploying them in the field where it may be costly resolve the configuration issues.

Figure 36:
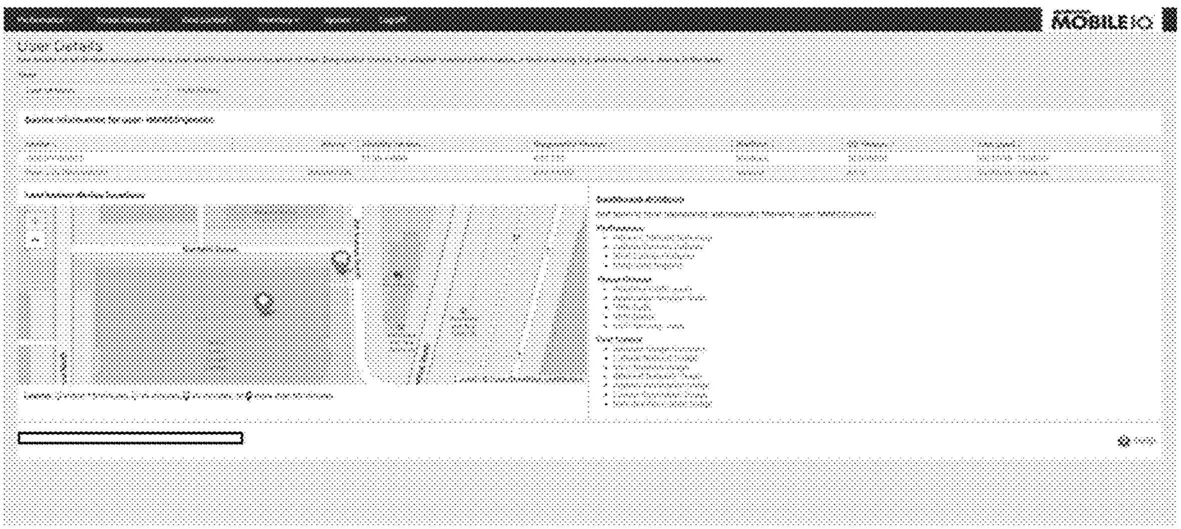

The User Details dashboard in FIG. 36 provides details of devices associated with a user and the last known location of those devices. Managers and staff can use this dashboard to analyze details specific to the selected user in any of the reporting engine dashboards related to Performance, Threat Defense or Cost Control. It provides a "fan-out" launch point for rich analysis related to the selected user. Data can be collected for all mobility or diagnostics clients. This dashboard can show what devices, mobile platforms, and operating systems is a user using, what a user's device phone number is, what version of Mobility is a user running, what version of Diagnostics is a user running, when was a user's device last used, and what was the last known location for this user's device. With this information a manager can drill down to any device used by the user to get even more detailed information on that device's usage and performance, and drill down to any Mobile dashboard, automatically filtered to the selected user.

Figure 37:
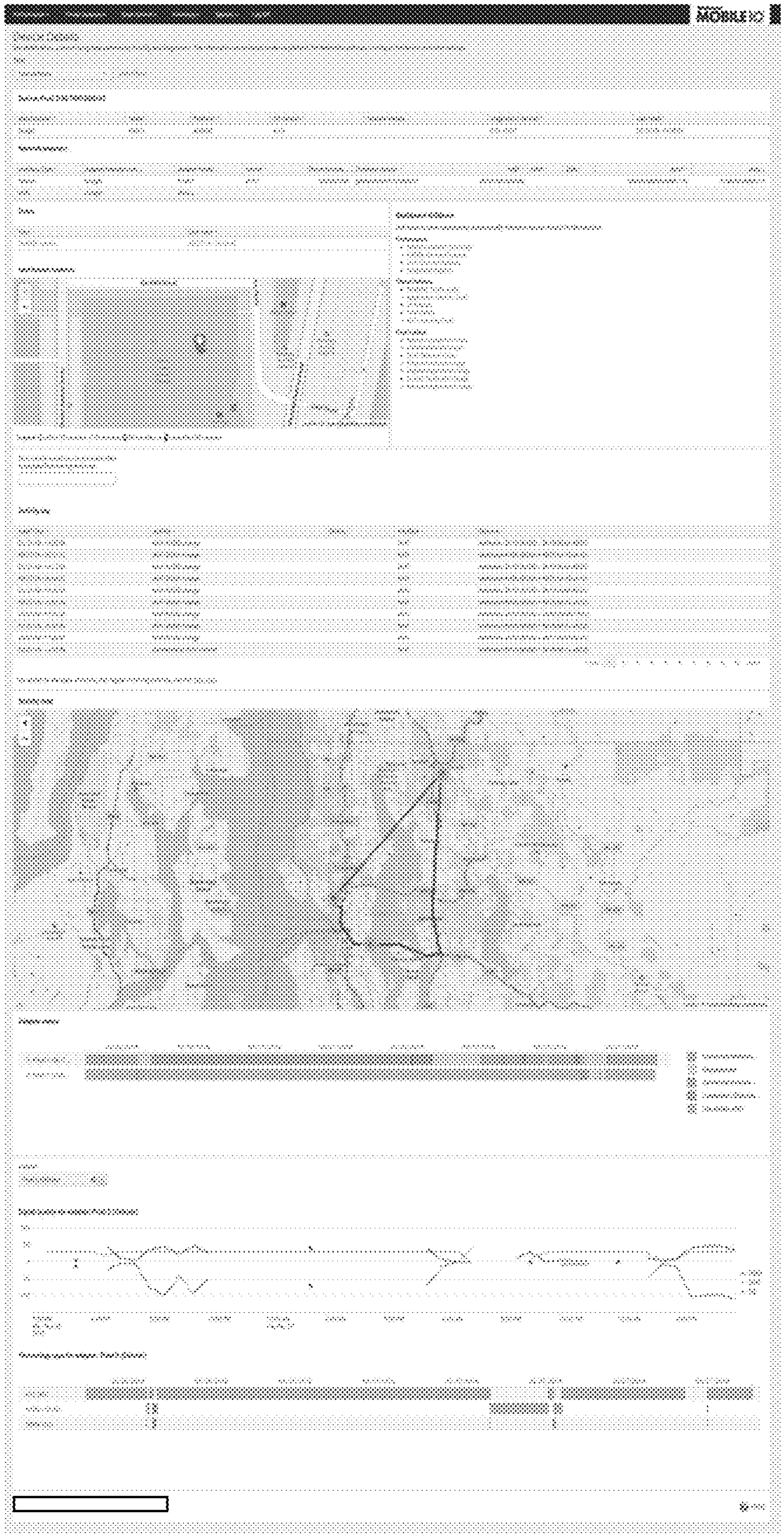

The Device Details dashboard in FIG. 37 can be used by managers and staff to get rich usage and performance information about a device. The dashboard is also a launch pad for analyzing performance, threat defense and cost control for the device in any of the other reporting engine dashboards. The Device Details dashboard provides details of a single device, including: the device's identification and configuration; Network adapters on the device; User who have used the device; The last known location of the device from the Diagnostics client software; A filterable activity log of recent events; An activity map of device movement and locations during the selected period; A graphical timeline showing wireless network usage for every network adapter on the device; A signal quality timeline of each wireless adapter; and (For cellular networks only) a graphical timeline of cellular network technologies used. Data can be collected for all mobility or diagnostics clients. This dashboard shows who is the device's manufacturer, what OS and version the device running, what Mobility version is the device running, what Diagnostics version is the device running, who is the user logged onto the device, what is the last known location of the device, what network activity was logged by the device, when and where (on a map) did it connect, roam, change networks, disconnect, for devices that provide radio statistics (Android and Windows)—what was the signal quality, SINR, and RSPR (Reference Signal Received Power) over time, and whether the device been getting consistent LTE access on the carrier's network and whether it has been downshifted. With this information, managers can determine how and where a device is being used, get detailed information on that device's usage and performance, and drill down to any Mobile dashboard, automatically filtered to the selected device.

Figure 38:

The Deployment Status dashboard in FIG. 38 is for managers and administrators who need to see the status of the mobility pools and servers publishing data to reporting engine. Clicking a row in a table opens to the management console of the selected mobility server. A refresh interval is available on this dashboard so that it automatically refreshes its information. This dashboard can show which Mobility pools and servers, and which Diagnostics servers are contributing data to reporting engine, whether there are any servers offline, how recently a server transmitted information to reporting engine, and how many devices are licensed and active on each mobility server. With this information, managers can make sure the reporting engine system and associated servers is operating correctly and receiving data from all possible sources.

Figure 47:
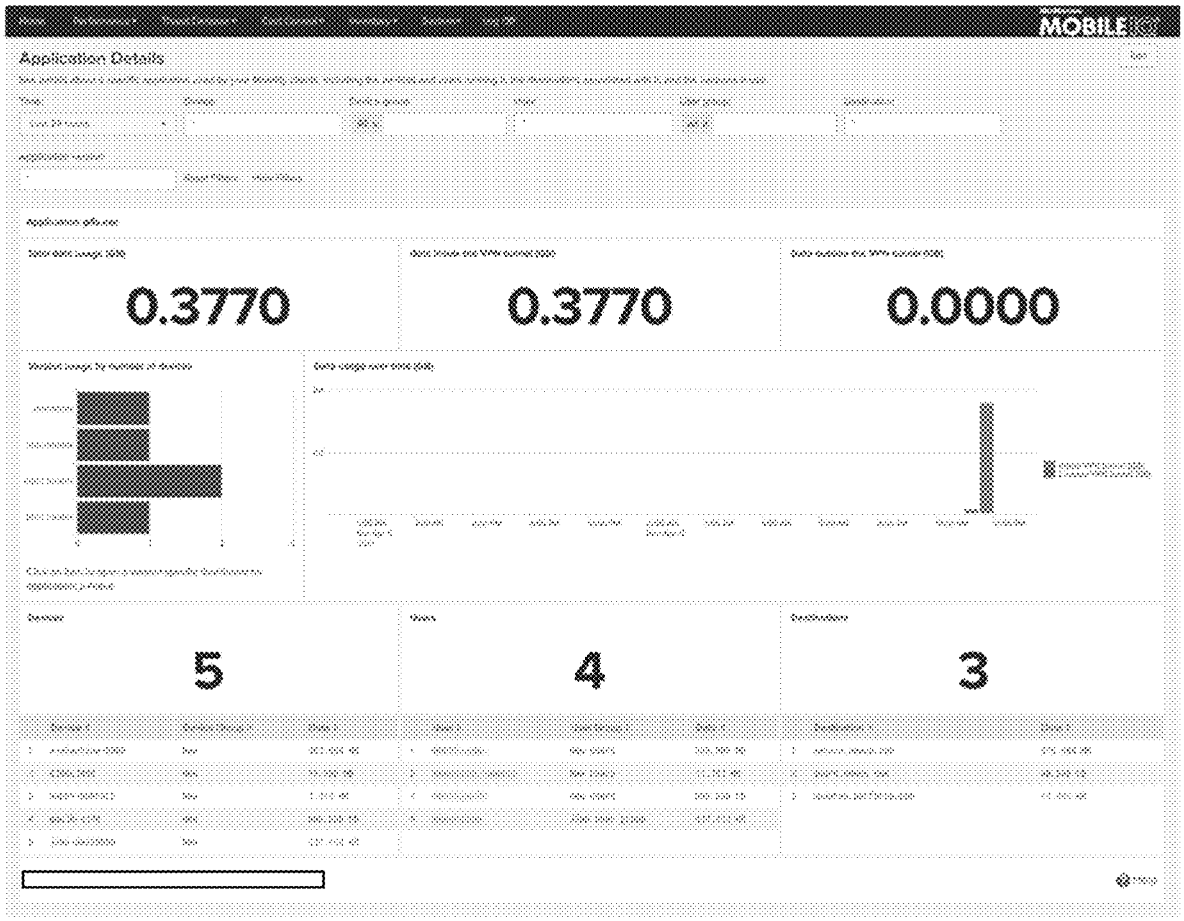
FIGS. 47-80 show further exemplary dashboards prepared by the reporting engine based on policy, host name and/or reputation data.

The Application Details dashboard in FIG. 47 provides usage details about a single application, identified by the application name. To identify the most relevant application data, use the destination filter to focus the dashboard on application data sent to a specific destination. Dashboard panels include information about total data usage (GB), data inside the VPN tunnel (GB), data outside the VPN tunnel (GB), data usage over time (GB), count of different application versions reported by your devices, how many devices are using each version, devices and users that have used the selected application, and the network destinations (host names and IP addresses) it has contacted.

Figure 48:
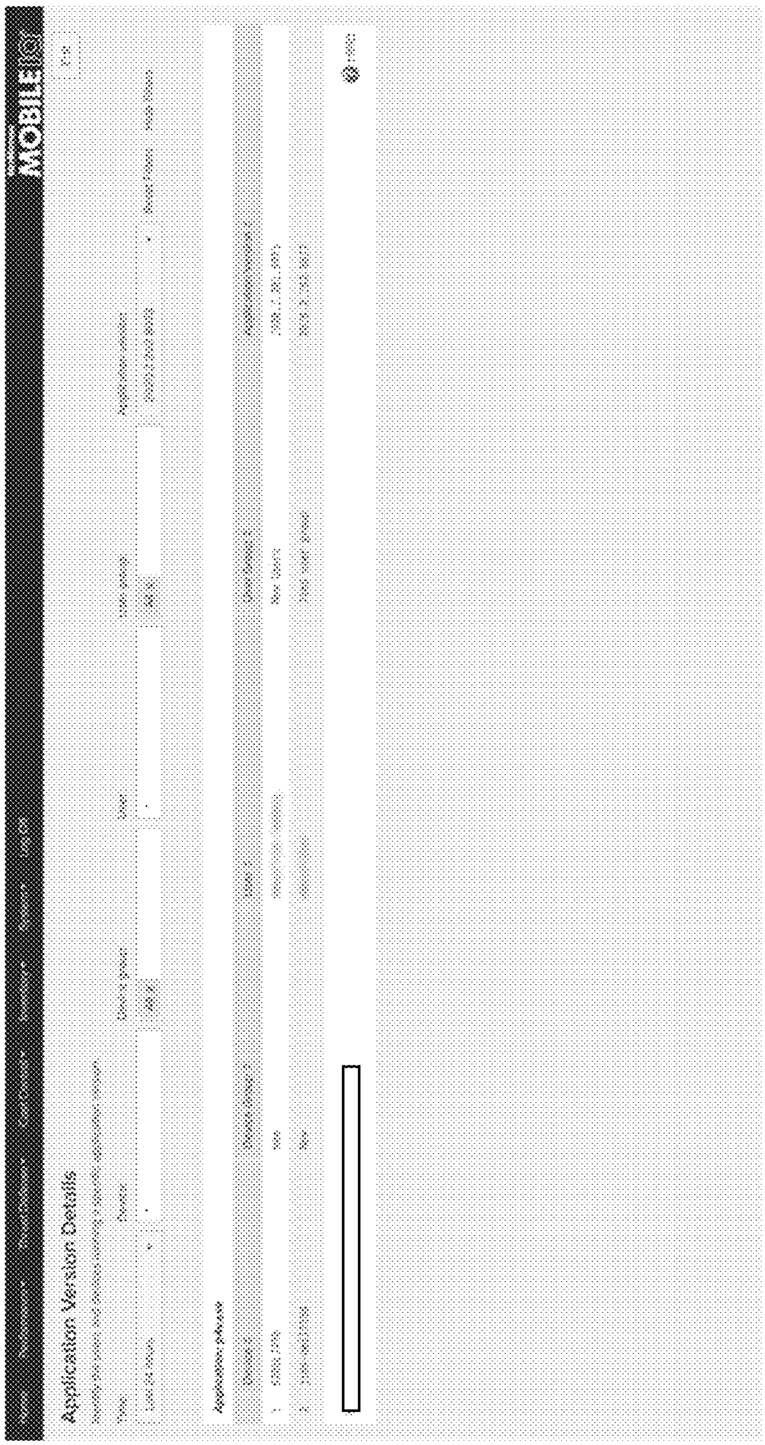

The Application Version Details dashboard in FIG. 48 is a drill-down from the Application Details dashboard. It identifies the users and devices running a specific application version.

Figure 49:
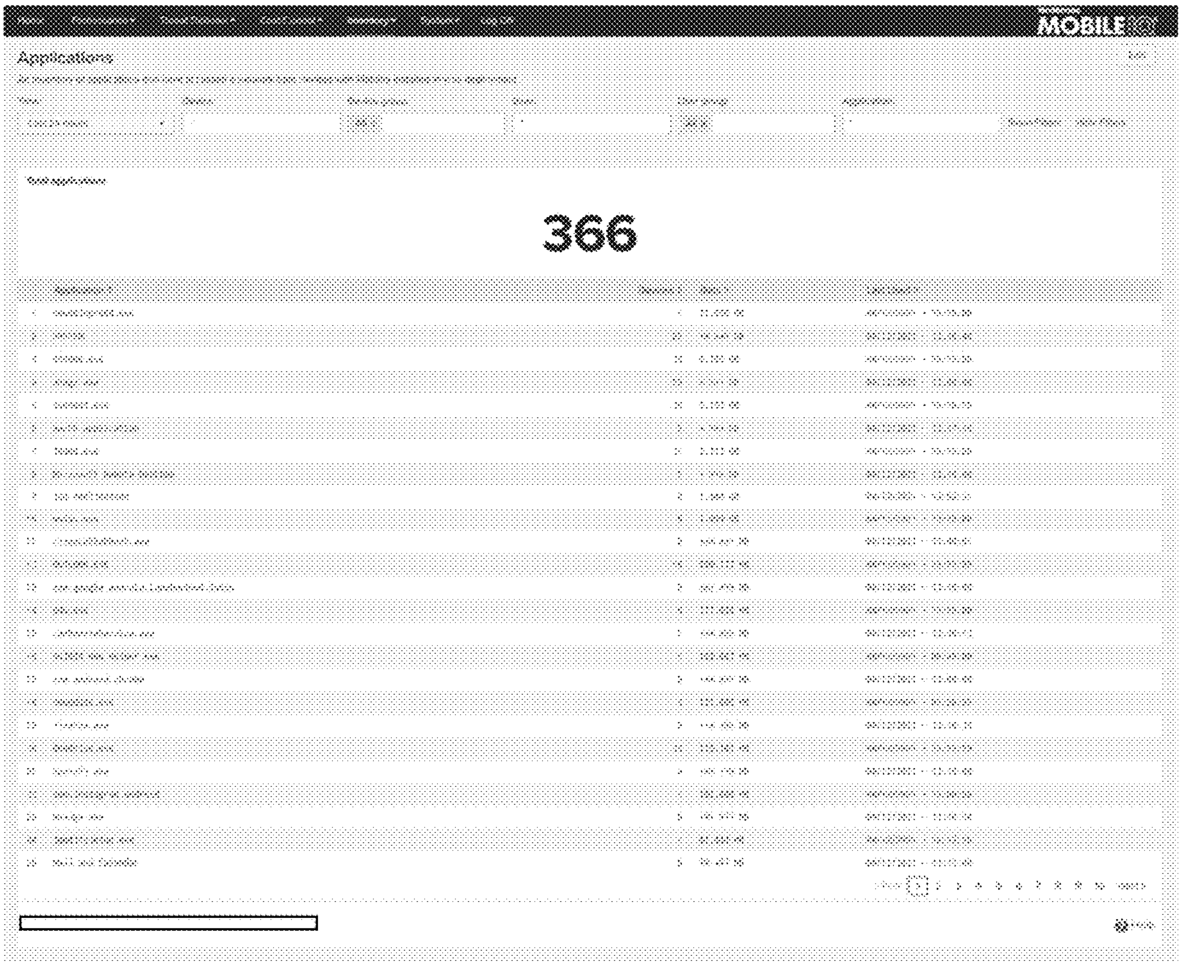

The Applications dashboard in FIG. 49 shows high-level information about the applications used by Mobility clients in a deployment. Administrators can filter by device, user, and application. Click a row in the table to see complete details, including the versions of the application in use, and data usage over time, described in the Application Details dashboard. At the top of the dashboard is the total number of applications that have been used by Mobility clients in the selected time frame. A table displays the names of individual applications, the number of devices that have used each application, the total data that has been sent and received by each, and the time that the application was last used by a Mobility client.

Figure 50:
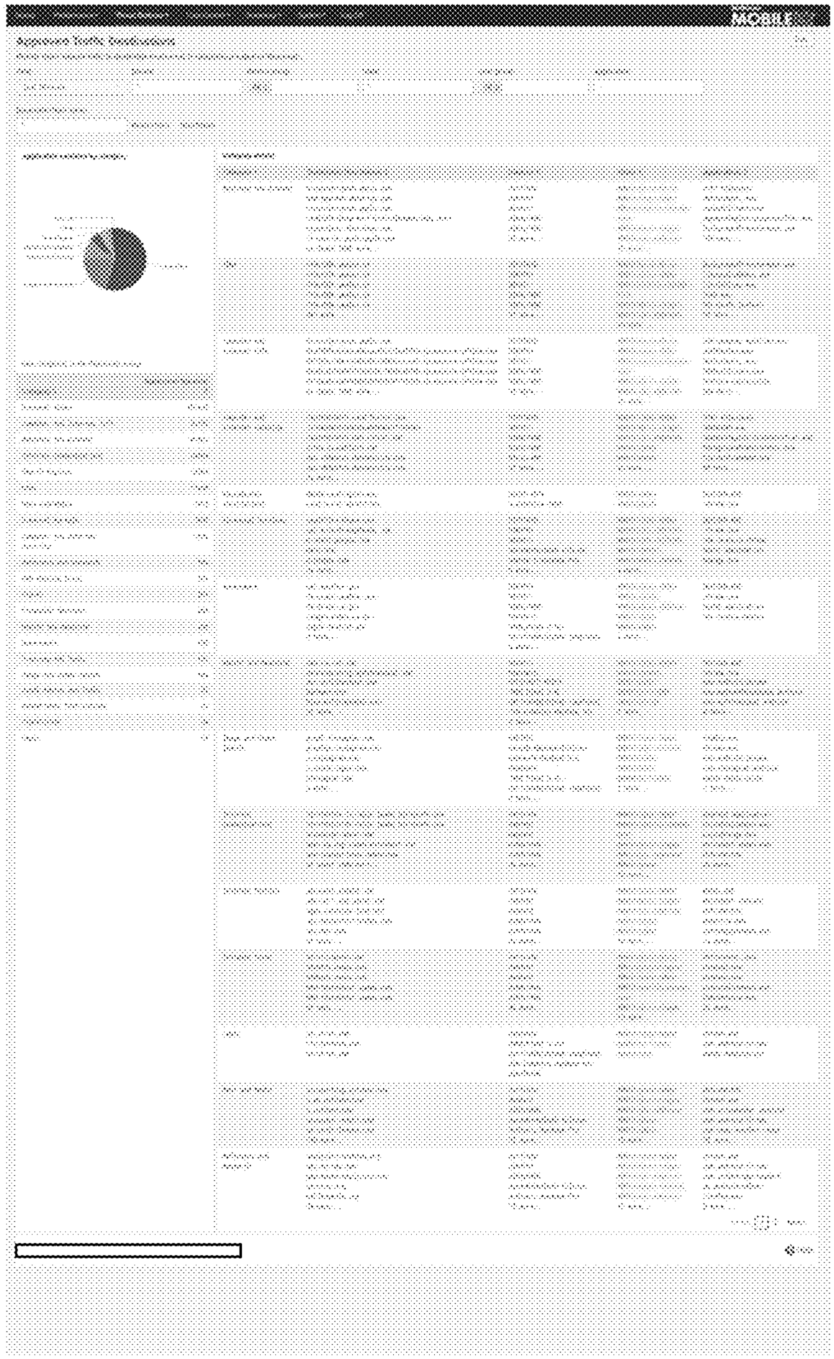

Traffic categorization is a feature of the Mobility Reputation service. When this service is enabled, destination host names are categorized according to site content, and assigned a risk level based on an analysis of various factors including known malicious content, and the popularity and longevity of the site. Each traffic category is assigned to a category group, configured on the Mobility server. The Approved Traffic Destinations dashboard in FIG. 50 has a pie chart and table that shows the number of application sessions (flows) by destination categories that are in the Approved Traffic category group. To the right, a table displays the destination host names and the devices, users, and applications contacting them. If a destination is in multiple categories in the dashboard category group, its flow count is added to each category.

Figure 51:
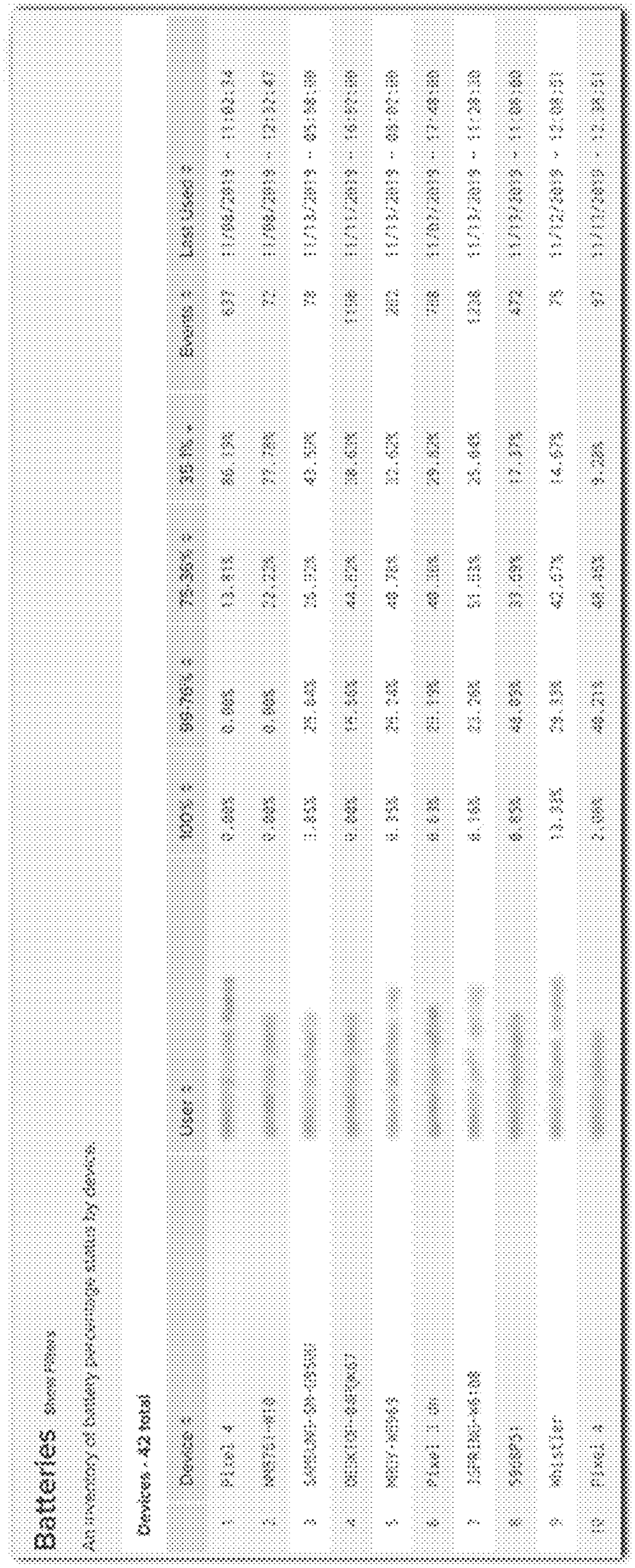

The Batteries dashboard in FIG. 51 provides insight into battery charging and discharging behavior and can be used to identify devices that are experiencing battery charging issues. This data can be useful for troubleshooting, as well as anticipating hardware replacement needs. For example, using this dashboard administrators can quickly determine if a specific device or group of devices is exhibiting expected power usage behavior, and take appropriate actions to replace or repair a battery. Dashboard filters enable users to focus the table on the device batteries they wish to observe.

Figure 52:
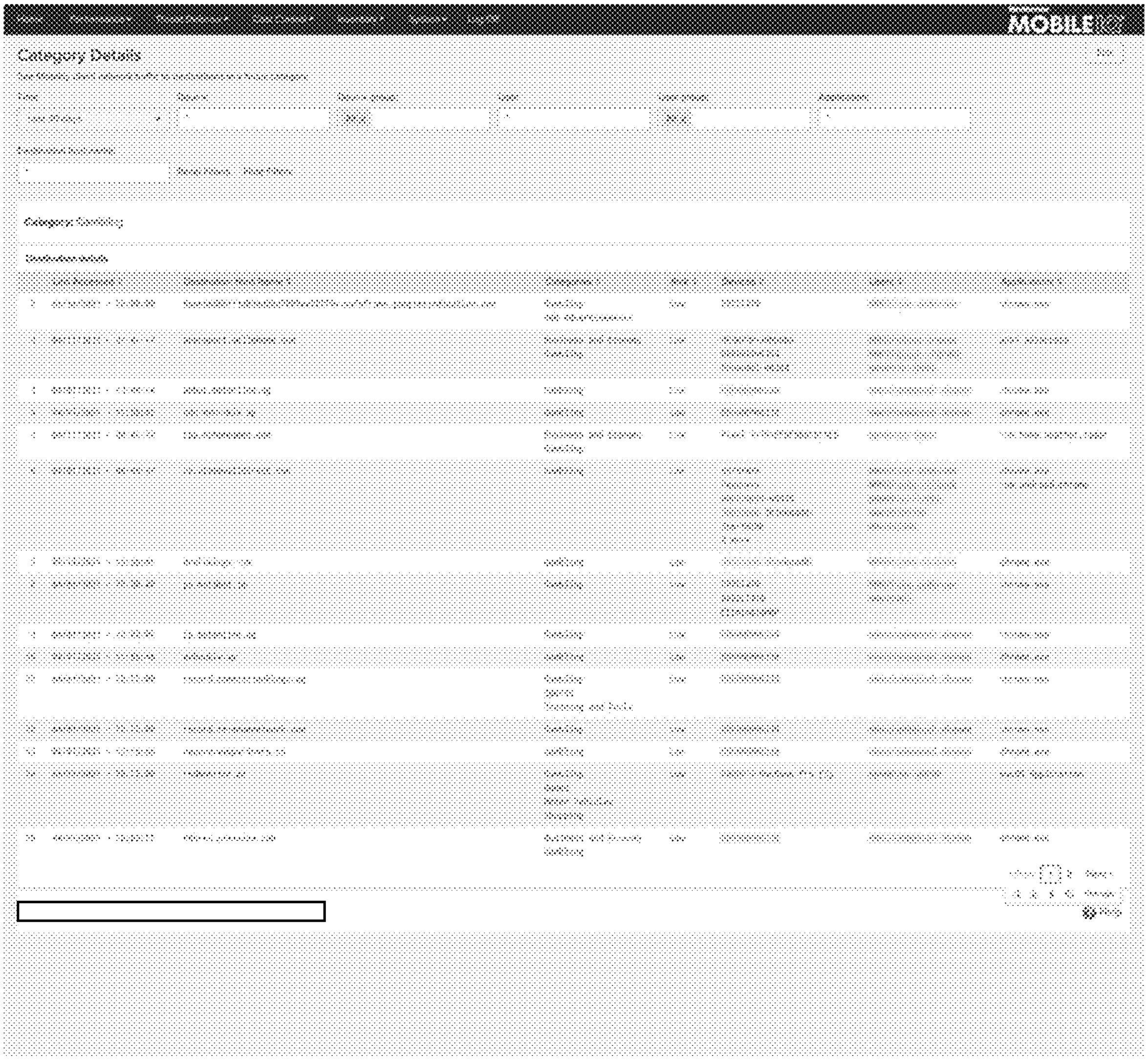

The Category Details dashboard in FIG. 52 is a drill down dashboard from several category group dashboards—High Risk Traffic Audit, Legal Liability Traffic Audit, Approved Traffic Destinations, and Other Traffic Destinations. These dashboards require the Mobility Reputation service, and are based on the category groups configured on Mobility. This dashboard provides information about the traffic destinations that belong to a specific category.

Figure 53:
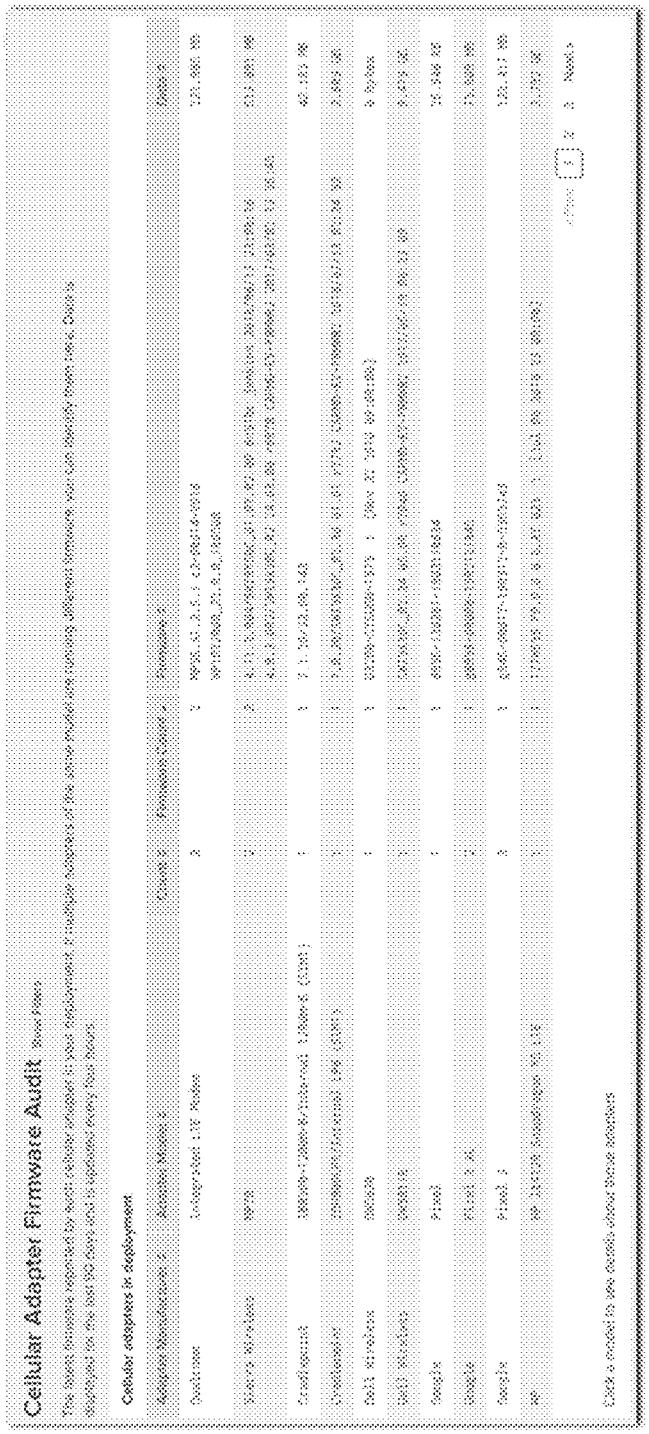

The Cellular Adapter Firmware Audit dashboard in FIG. 53 reports the last known firmware installed on cellular adapters in a deployment. Use this dashboard to monitor the current firmware versions for cellular adapters, and to identify potential conflicts where multiple firmware versions are being used by a specific cellular adapter model. For each cellular adapter model, the table shows the total Count of how many adapters of this model are present in a deployment, and the Firmware Count of how many different firmware versions those adapters are running. Use this table to identify the specific devices with conflicting firmware installations, and the users that are associated with these devices.

Figure 54:
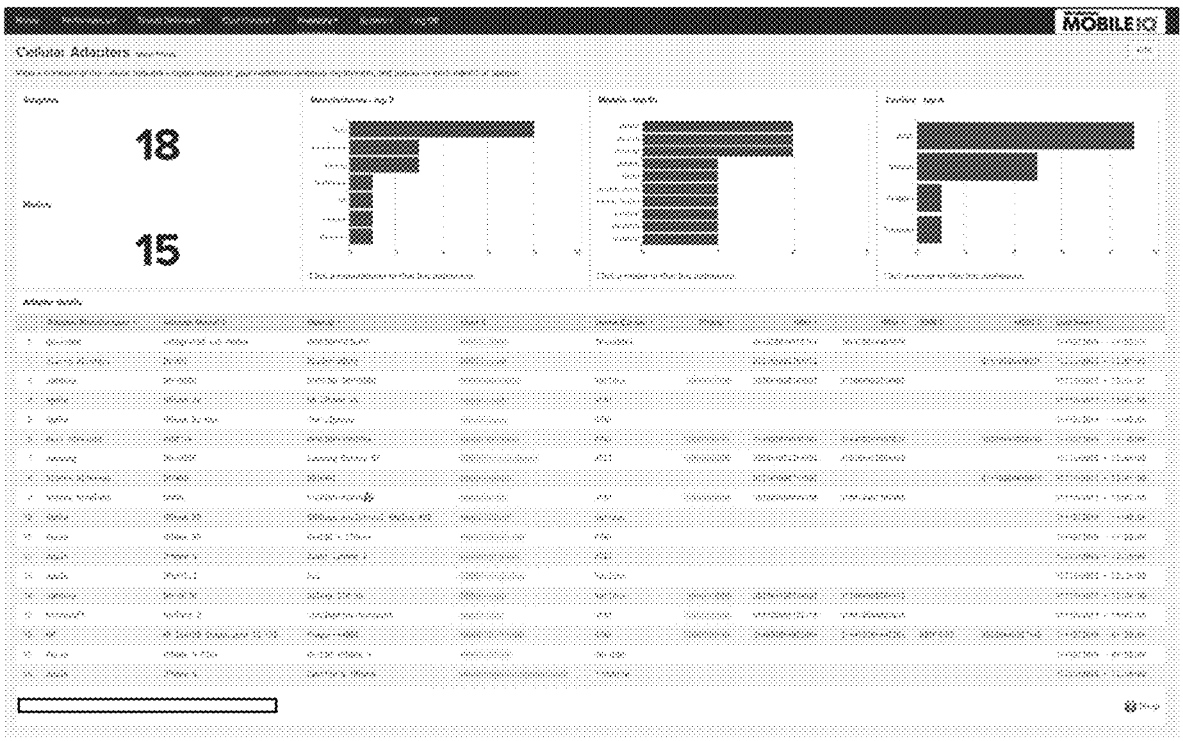

The Cellular Adapters dashboard in FIG. 54 displays cellular network adapters present in a Mobility deployment. This dashboard is focused primarily on inventory and asset management—not cellular adapter performance/status. Use this dashboard to keep track of how many adapters of a specific make/model are present in a deployment, tracked over the selected time frame. This can reveal technology trends within an organization, helping with internal troubleshooting, inventory management, and purchasing decisions.

Figure 55:
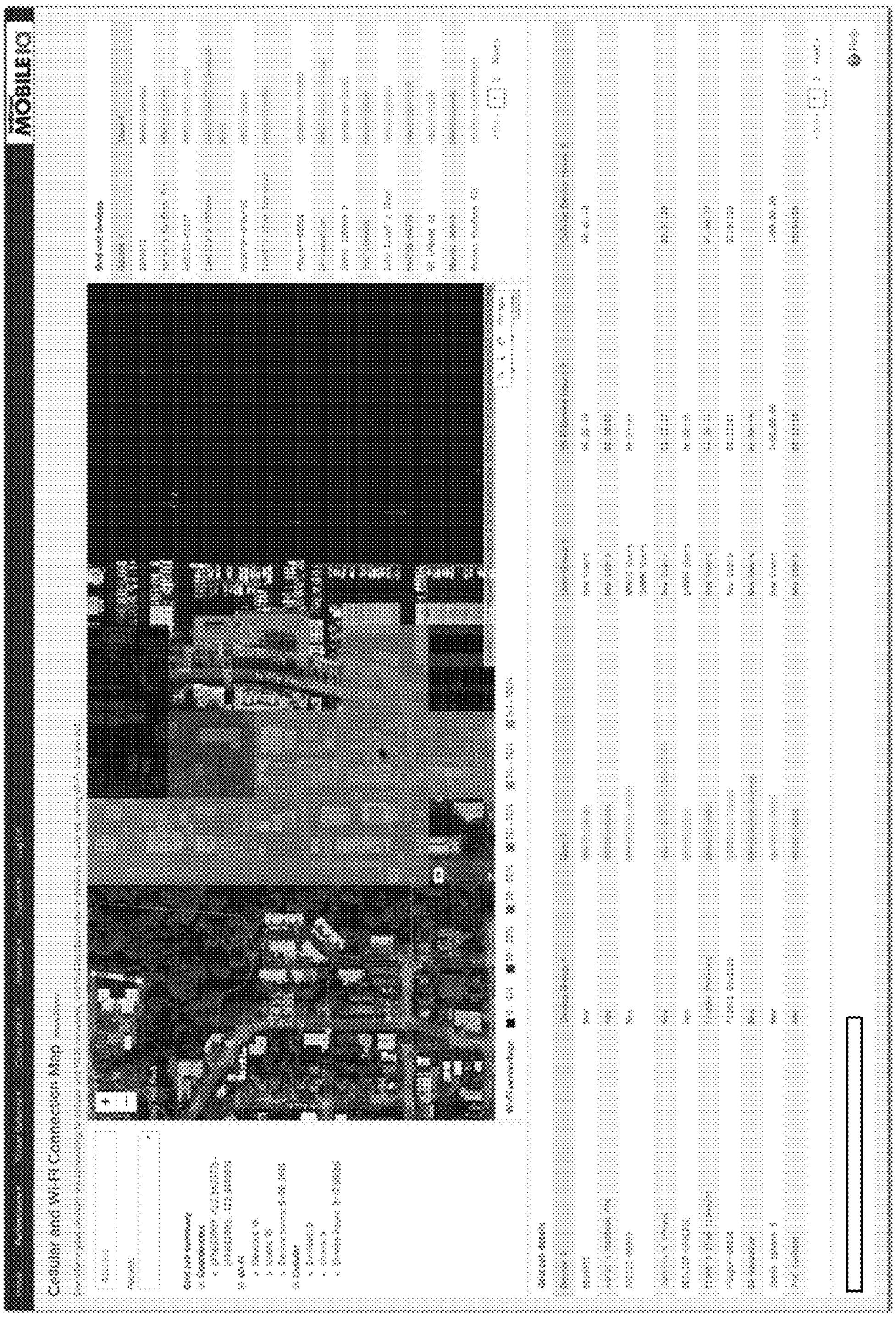

The Cellular and Wi-Fi Connection Map dashboard in FIG. 55 compares cellular and wi-fi network usage from all Mobility clients that collected data during the selected time frame. Each grid cell that reported one or more connected devices is assigned a color based on the percentage of wi-fi network usage in that cell. Use the color-coded map legend to identify a cell for analysis. Areas with a low percentage of wi-fi usage (less than 10%) may not have available wi-fi coverage. Areas with mixed wi-fi and cellular usage are worth exploring for opportunities to refine device usage policies and to better understand the wi-fi networks that are being used by some devices. Areas with a high percentage of wi-fi network usage, including company locations, are also worth investigating. In these situations, when it is known that significant wi-fi coverage is available, devices that persistently using cellular networking in those areas may need to be reconfigured. The dashboard includes panels that display summary information about the wi-fi and cellular network usage in a selected cell.

Figure 56:
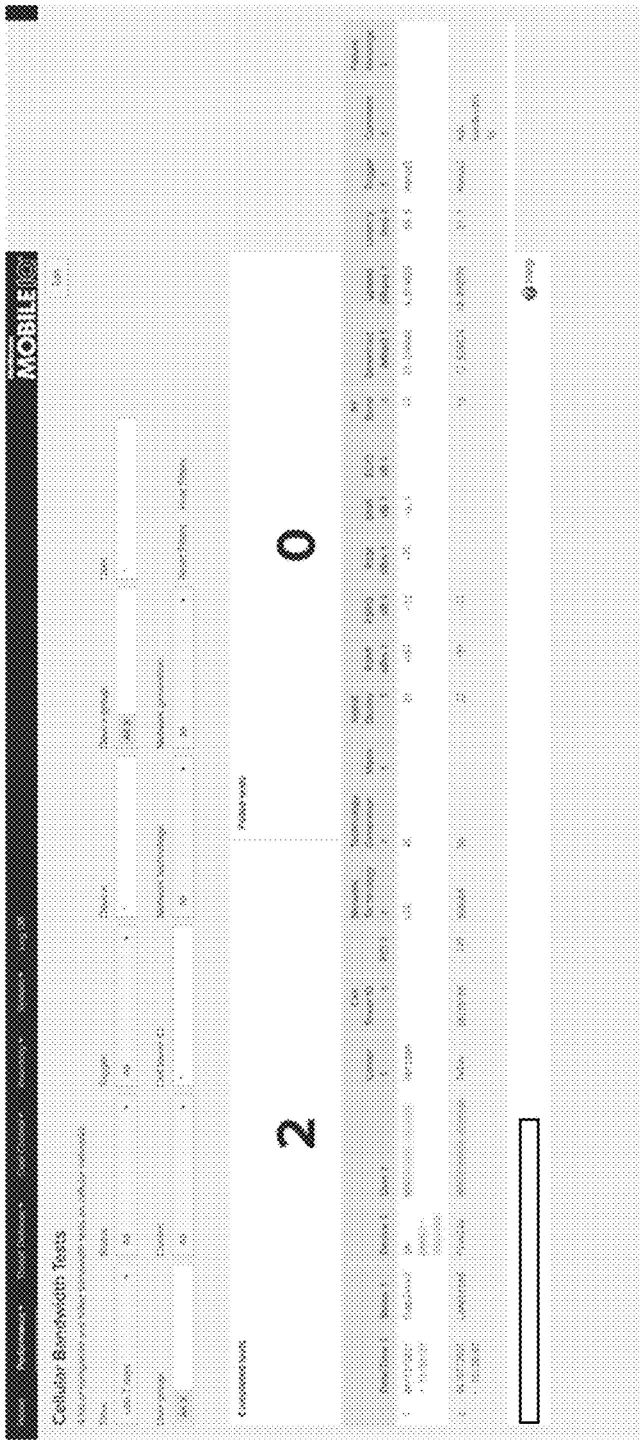

The Cellular Bandwidth Tests dashboard in FIG. 56 displays information about each bandwidth test that occurred during a selected time frame. Data panels display the total count of completed and failed tests. The table of bandwidth tests provides additional information for each test that was run, including device and user information, carrier information (Carrier, Cell Tower ID, Network Technology, Signal Quality statistics, and RF Band), and test results and statistics about each throughput measurement (Download, Upload, Latency, Trigger, Comment, and Failure Message).

Figure 57:
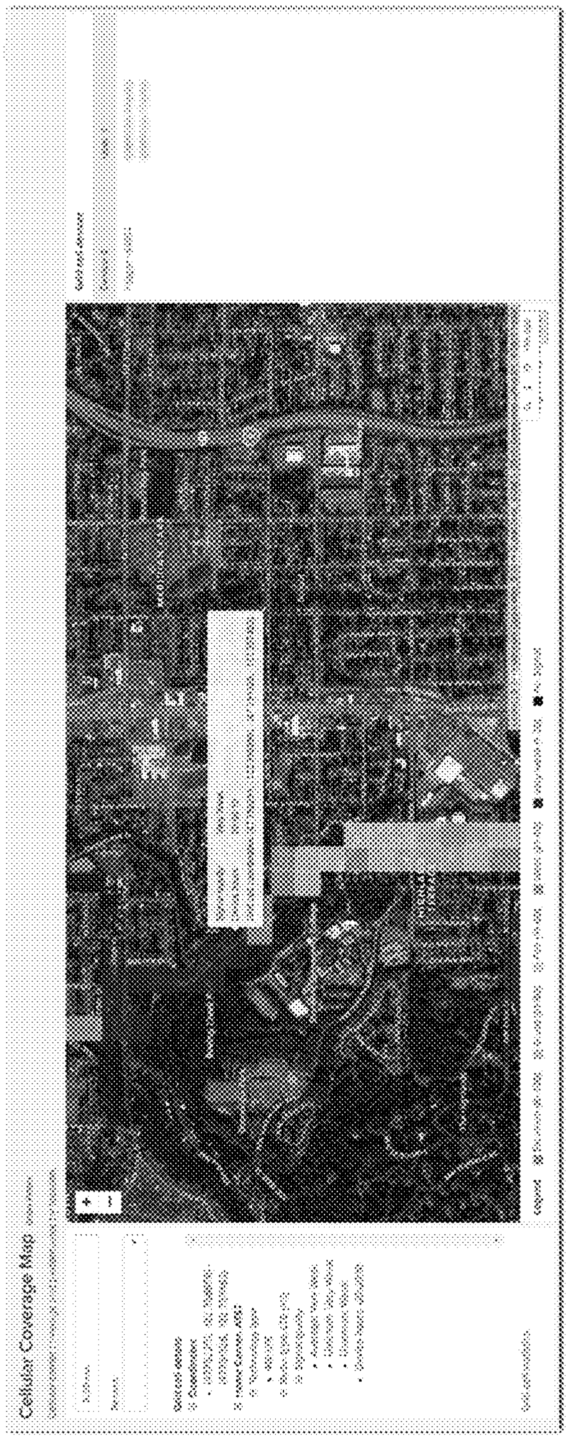

The Cellular Coverage Map dashboard in FIG. 57 describes the infrastructure of a cellular network—what carriers are used, what the signal quality is like, and the technology that is available (4G versus 5G, for example). The coverage map displays aggregated information from all Mobility clients that collected data during the selected time frame. To better understand network performance in a specific area of the coverage map, look at a single, colored cell.

Figure 58:
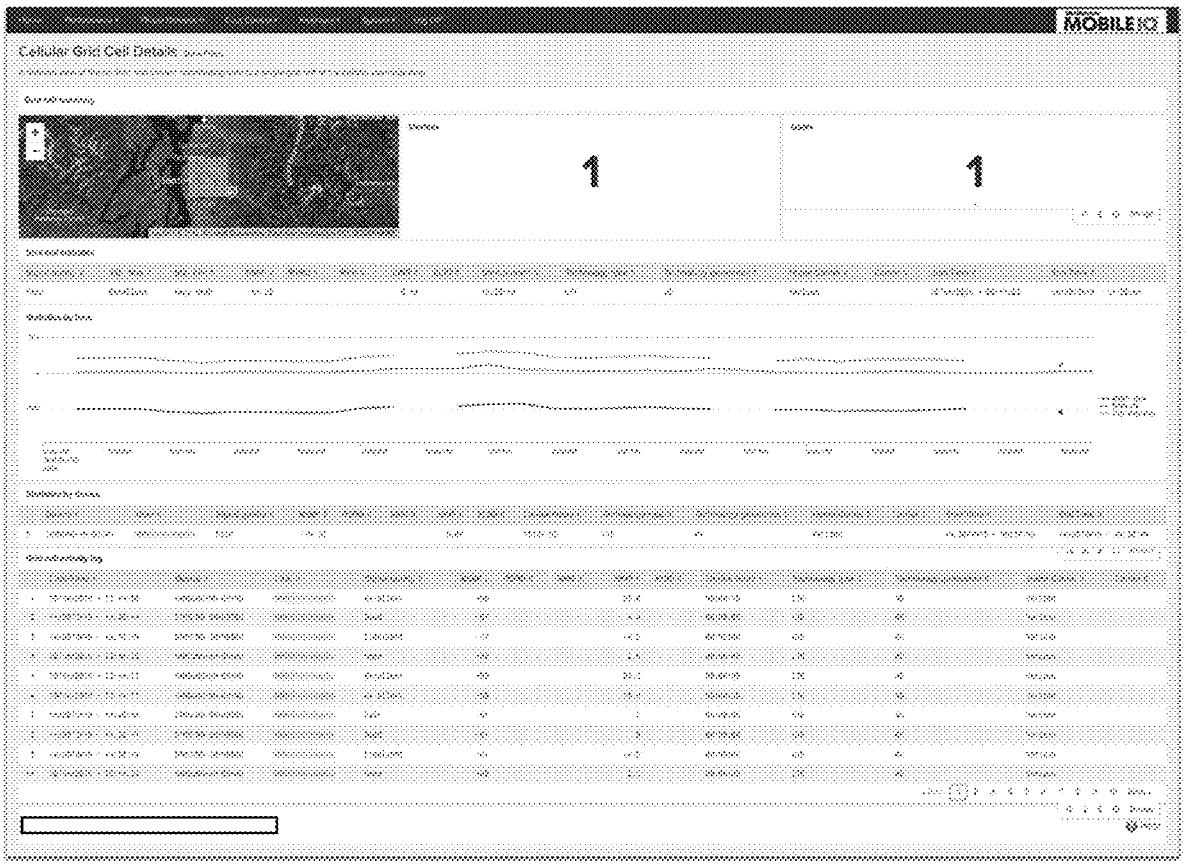

The Cellular Grid Cell Details dashboard in FIG. 58 displays information about a specific grid cell that was selected from the Cellular Coverage Map dashboard. Dashboard filters such as Home carrier, Radio type, Network technology, and Technology generation are pre-populated based on the filters that were selected on the Cellular Coverage Map. The dashboard panels include the grid cell and the map coordinates of the cell being viewed, a raw count of the number of devices and users that connected to a network in the specified grid cell, aggregated statistics reported by clients in the selected grid cell, signal quality statistics for the grid cell, and individual activity statistics for each device.

Figure 59:
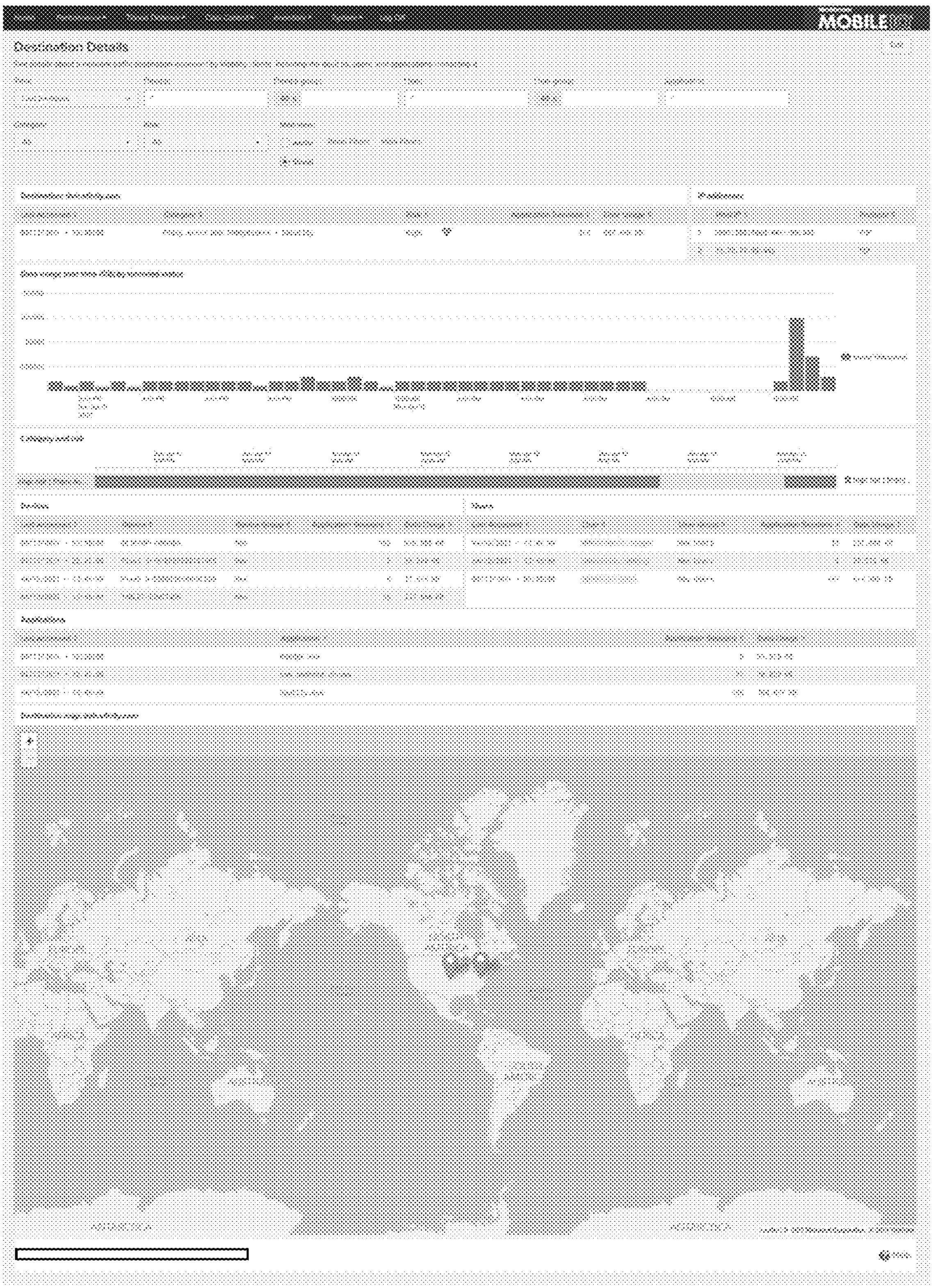

The Destination Details dashboard in FIG. 59 displays information about a network traffic destination, identified by host name or IP address. The table at the top of the dashboard shows when the destination was last accessed, how much data has been used communicating with it, and the total count of application sessions (flows) contacting this destination. The dashboard can filtered by device, user, and application, and—if the Mobility Reputation service is enabled—category and risk levels.

Figure 60:
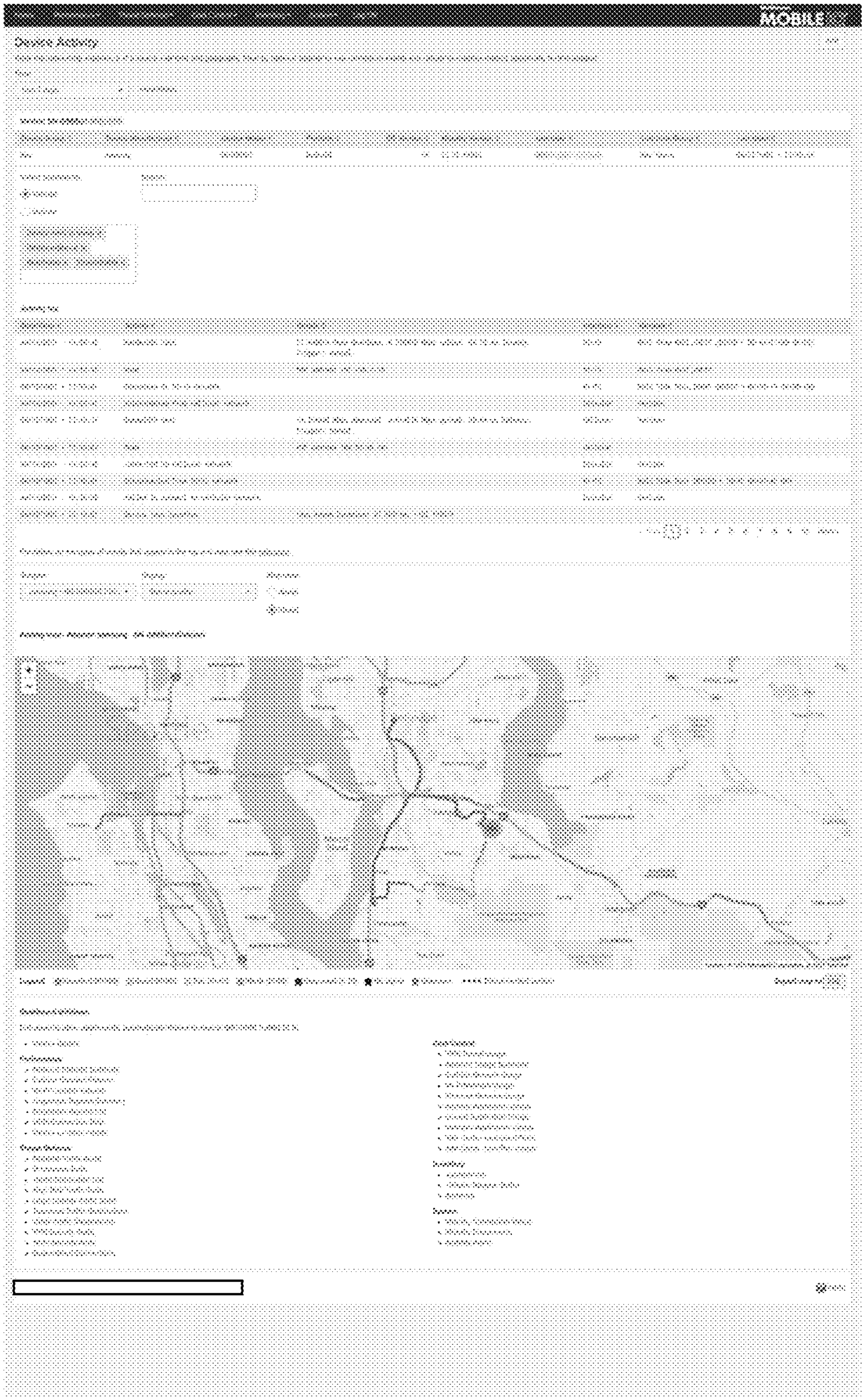

Use the Device Activity dashboard in FIG. 60 to monitor where and when specific device activities occur (for example, changing networks, roaming, disconnecting, or accessing prohibited/malicious content as described in your device policy). The activity log and map follow the path of the device through the selected time frame and report on its networking activity. To monitor the activity of a specific network adapter used by the device, use the Adapter filter to focus the activity log and map on the adapter you want to observe.

Figure 61:
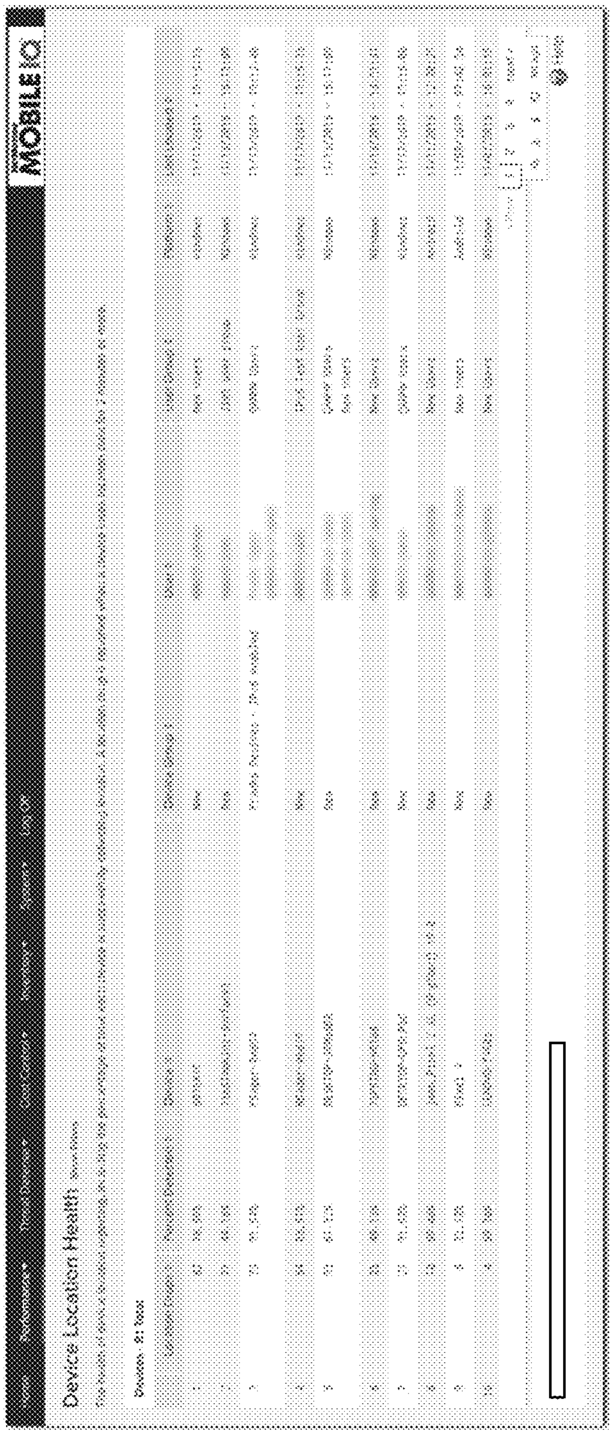

The Device Location Health dashboard in FIG. 61 is used to monitor the status of location reporting for devices in a NetMotion deployment. Identify devices that frequently drop location data, including the number of location drops as well as the percentage of time location data was successfully collected for each device. This information can be used to determine if devices are reporting location data when expected. Devices that frequently drop location data may need to be reconfigured, repaired or replaced.

Figure 62:
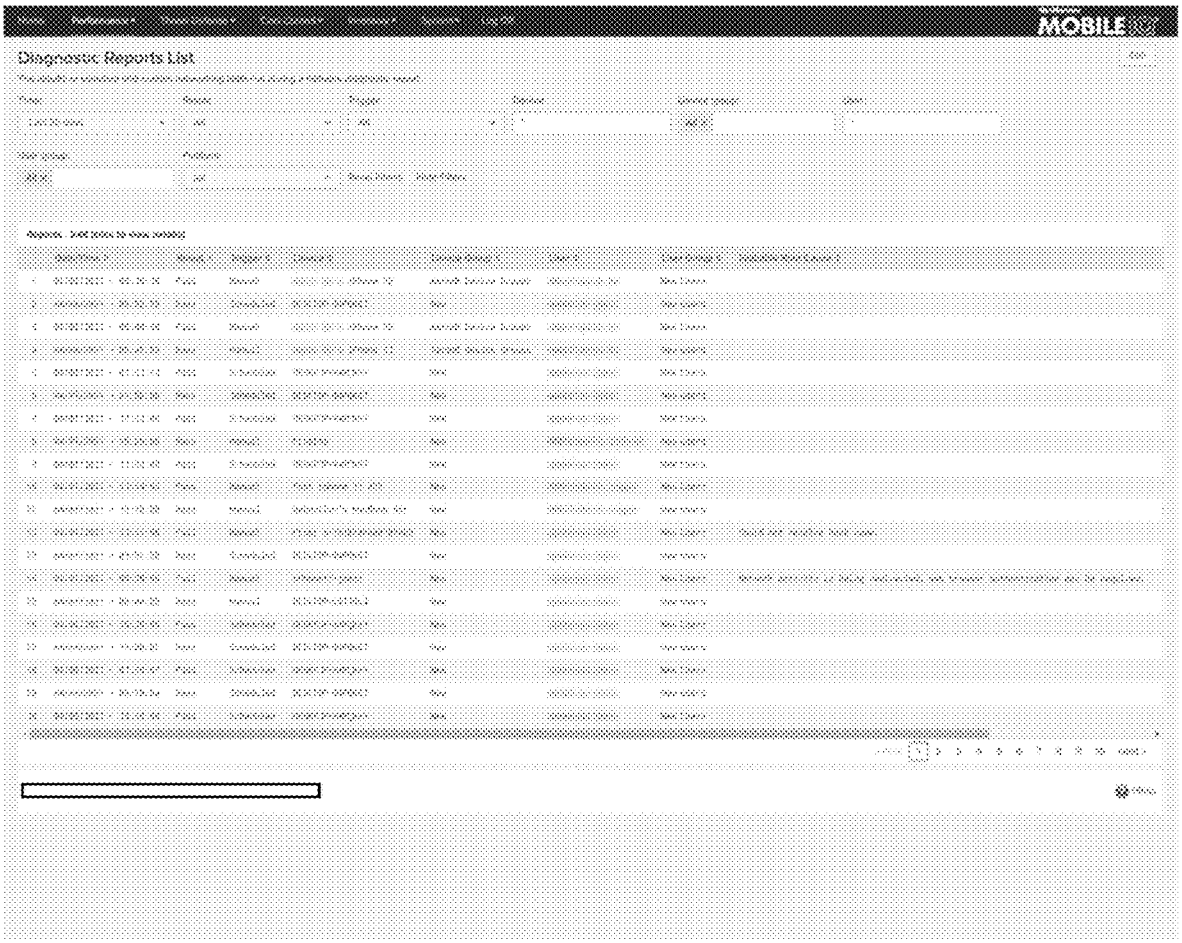

The Diagnostic Reports List dashboard in FIG. 62 displays a list of diagnostic tests that have been generated in a deployment. Reports can be triggered manually by a user, automatically by a Mobility policy, or on a schedule. When users experience a networking problem—for example, an application is not working as expected, or there is no network access—they can generate a diagnostic report to help identify the problem and provide possible troubleshooting solutions. Click a report in the table to drill down to the Diagnostic Report Details dashboard to view additional information.

Figure 63:
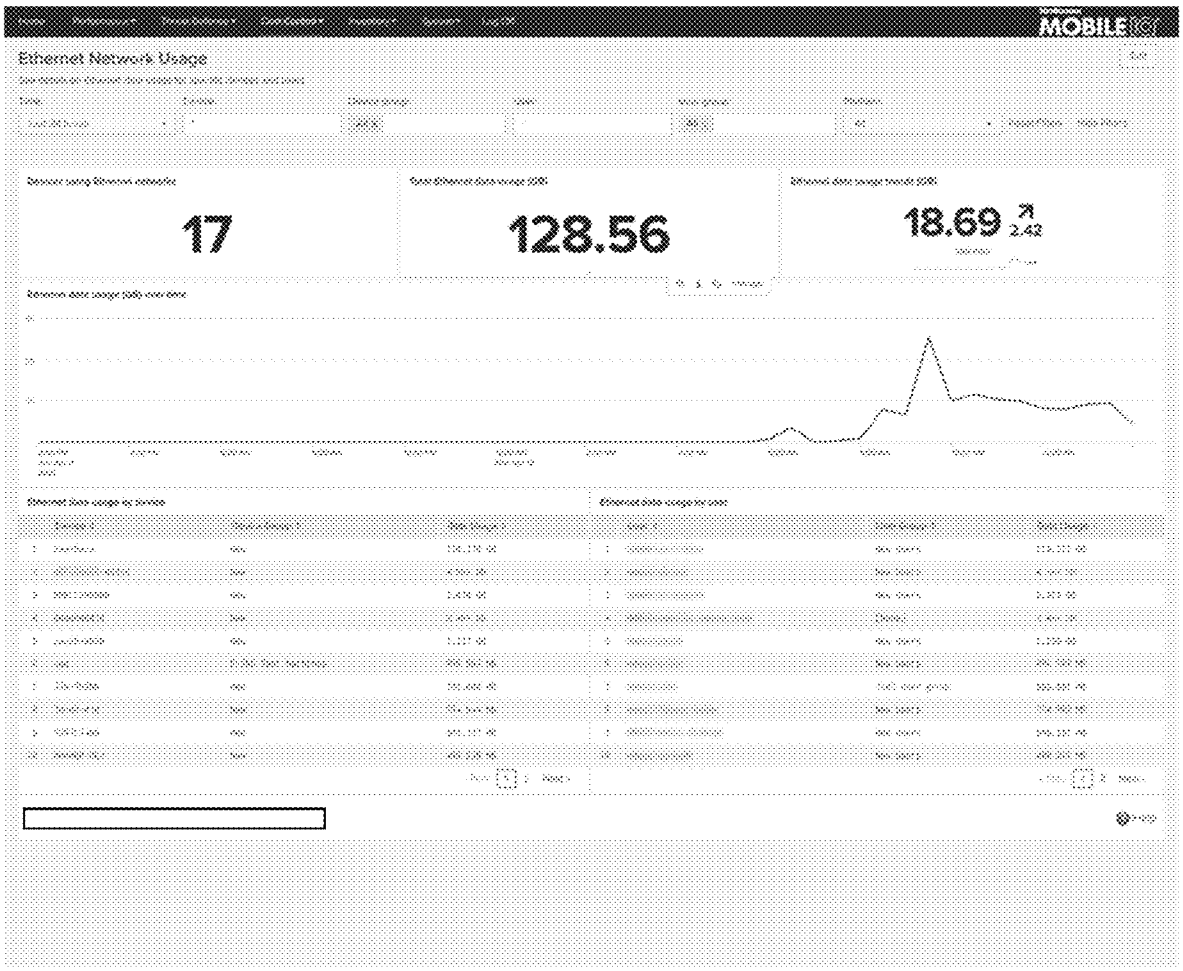

The Ethernet Network Usage dashboard in FIG. 63 provides interface-specific insight into Ethernet network data usage by Mobility clients. The statistics at the top show how many devices have used data over the interface type, the total data usage, and usage during the last hour (which includes hourly trends). The data usage over time chart allows you to assess when the most data is used. Tables of data usage by device and by user help you assess who is using data, and on which devices.

Figure 64:
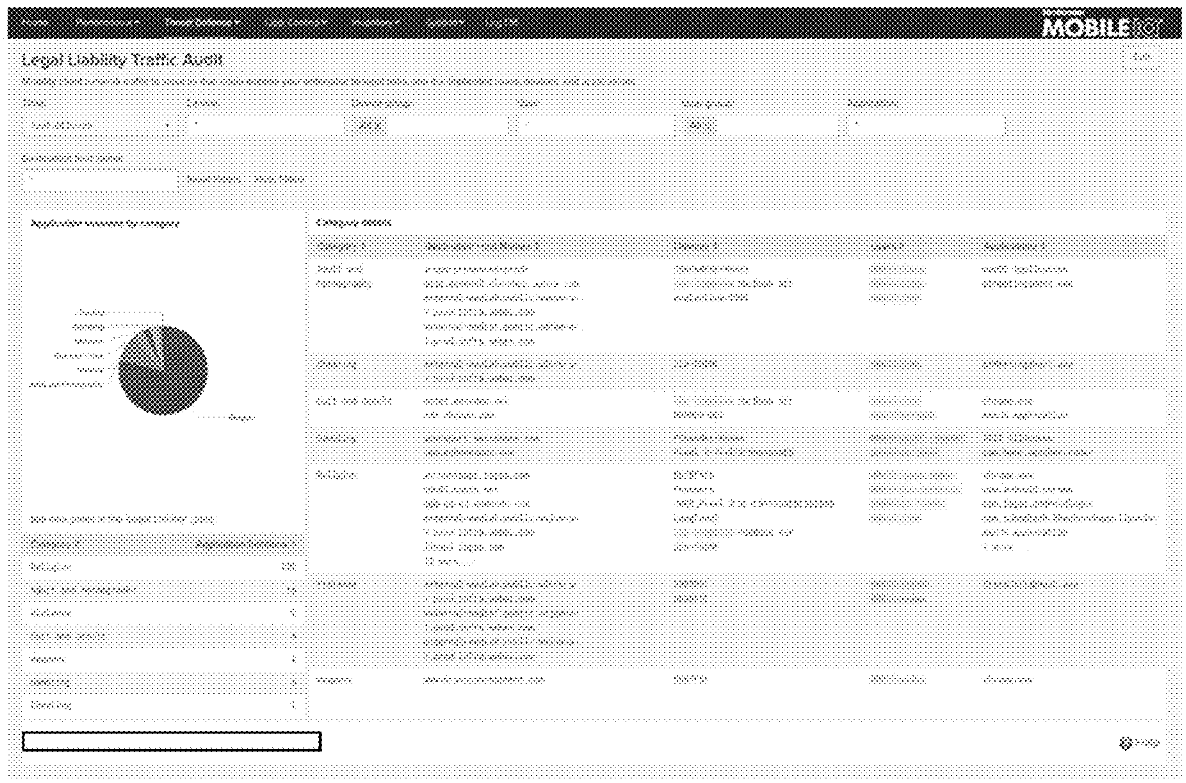

Traffic categorization is a feature of the Mobility Reputation service. When this service is enabled, destination host names are categorized according to site content, and assigned a risk level based on an analysis of various factors including known malicious content, and the popularity and longevity of the site. Each traffic category is assigned to a category group, configured on the Mobility server. The Legal Liability Traffic Audit dashboard in FIG. 64 has a pie chart and table that shows the number of application sessions (flows) by destination categories that are in the Legal Liability category group. To the right, a table displays the destination host names and the devices, users, and applications contacting them. If a destination is in multiple categories in the dashboard category group, its flow count is added to each category.

Figure 65:

The Licensing dashboard in FIG. 65 displays statistics for Mobile IQ and Mobility spanning the previous 30 days covering licensed data usage, total available client licenses, client licenses in use, and the percentage of licenses used in your deployment. Mobility license information is segmented by pool if a deployment contains multiple pools.

Figure 66:
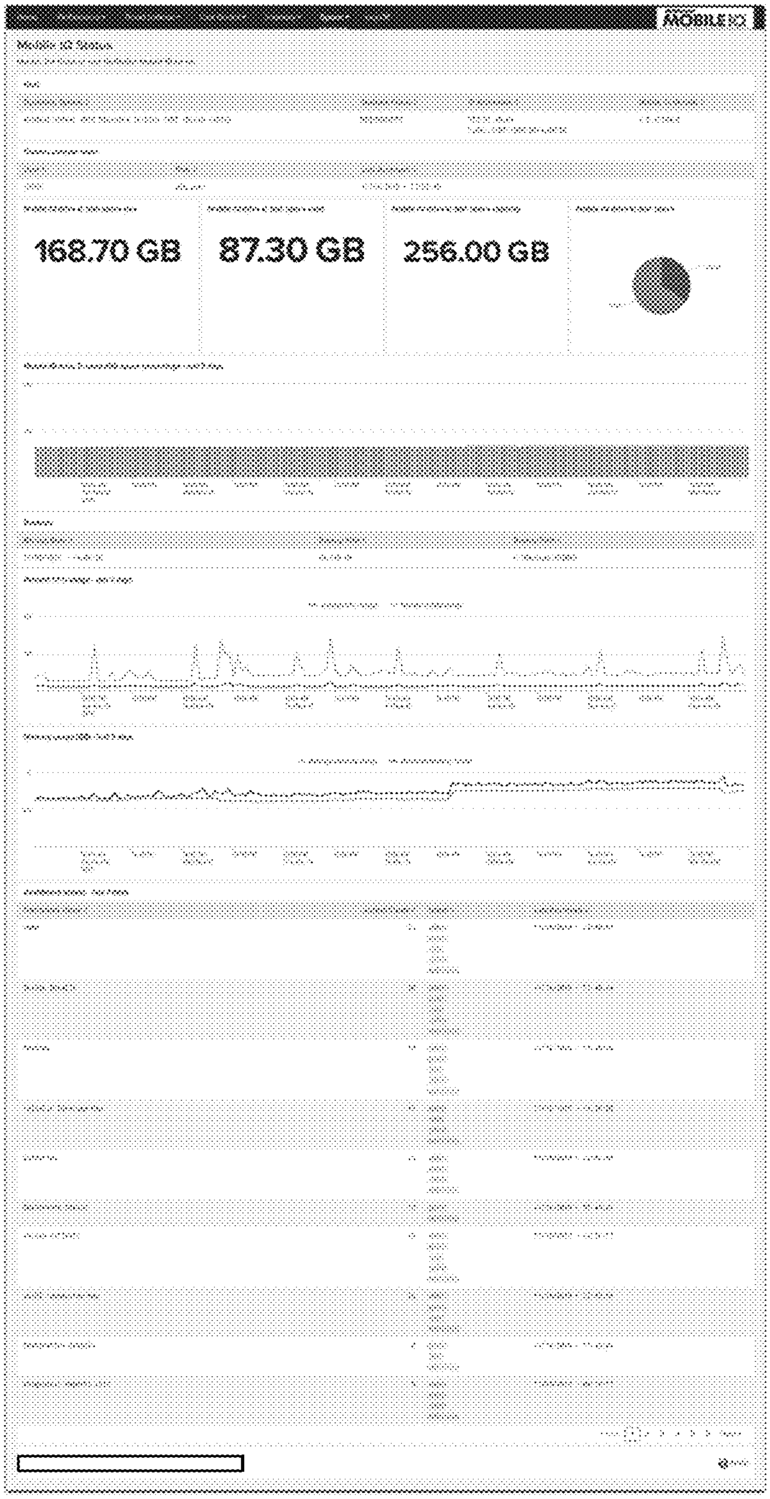

The Mobile IQ Status dashboard in FIG. 66 provides an overview of a NetMotion Mobile IQ server, including inventory information as well as usage statistics. Inventory information includes the server operating system, the version of Mobile IQ running on the server as well as current console users. Usage information includes Mobile IQ disk space, details on the most recent MIQ backups, CPU and memory usage, as well as recently accessed dashboards. Use this dashboard to ensure that a Mobile IQ server is running the correct software versions, using expected disk space, and to identify unexpected server resource usage.

Figure 67:
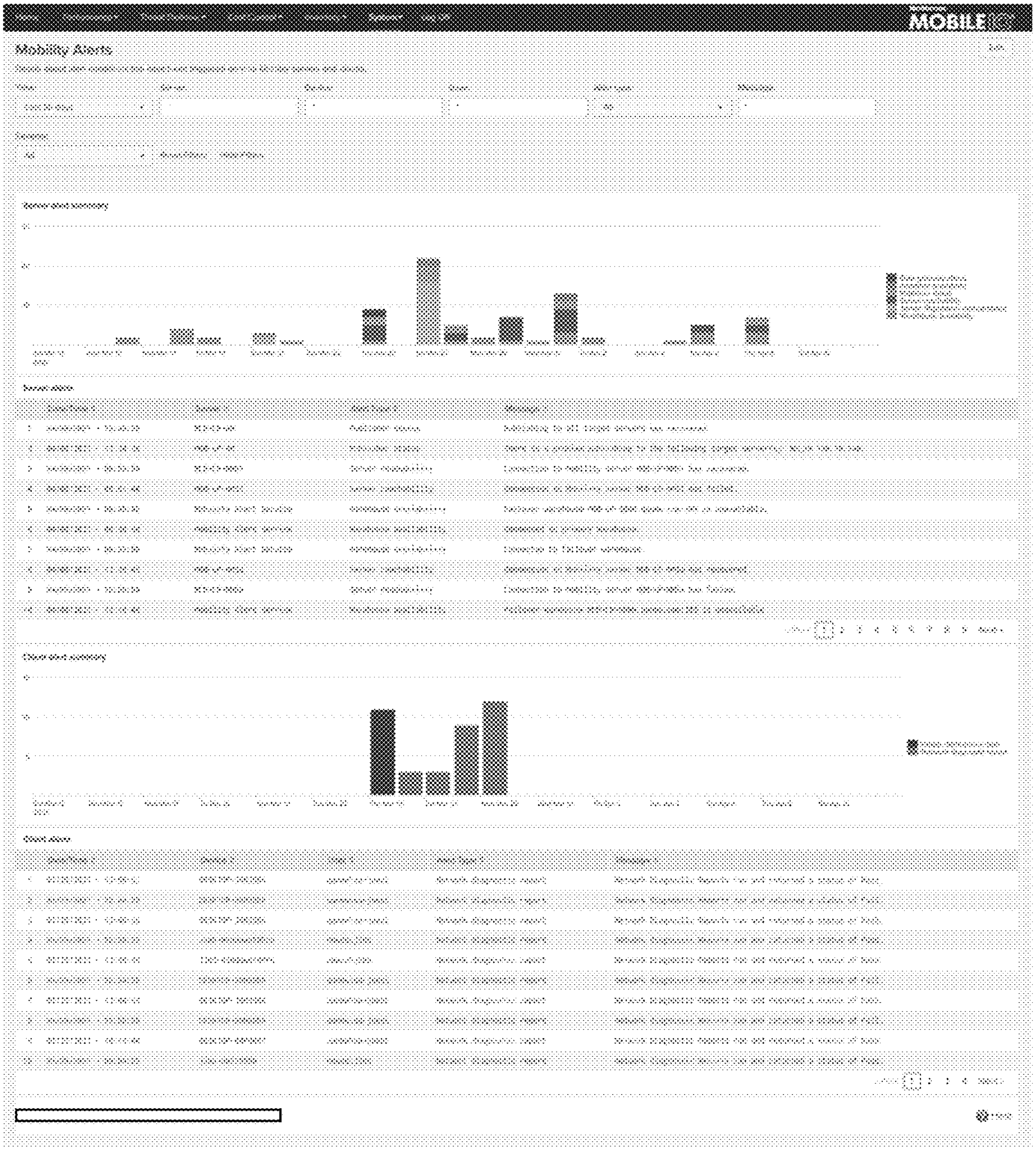

The Mobility Alerts dashboard in FIG. 67 allows administrators to monitor the alert conditions generated by Mobility servers and clients, including alert types, messages, and inventory details. Server alerts are generated when a problem is detected with a Mobility server or pool, a Mobility warehouse, or data publishing targets. For each server alert, a table displays the time of the alert, the server that generated the alert, as well as the alert type and message. Client alerts are generated when a problem is detected at the client level (such as a device connection failure), or a when a preconfigured client threshold has been surpassed (such as a device using battery power dropping below a preset limit). For each client alert, a table displays the time of the alert, the device and user that were connected to the client, as well as the alert type and message.

Figure 68:
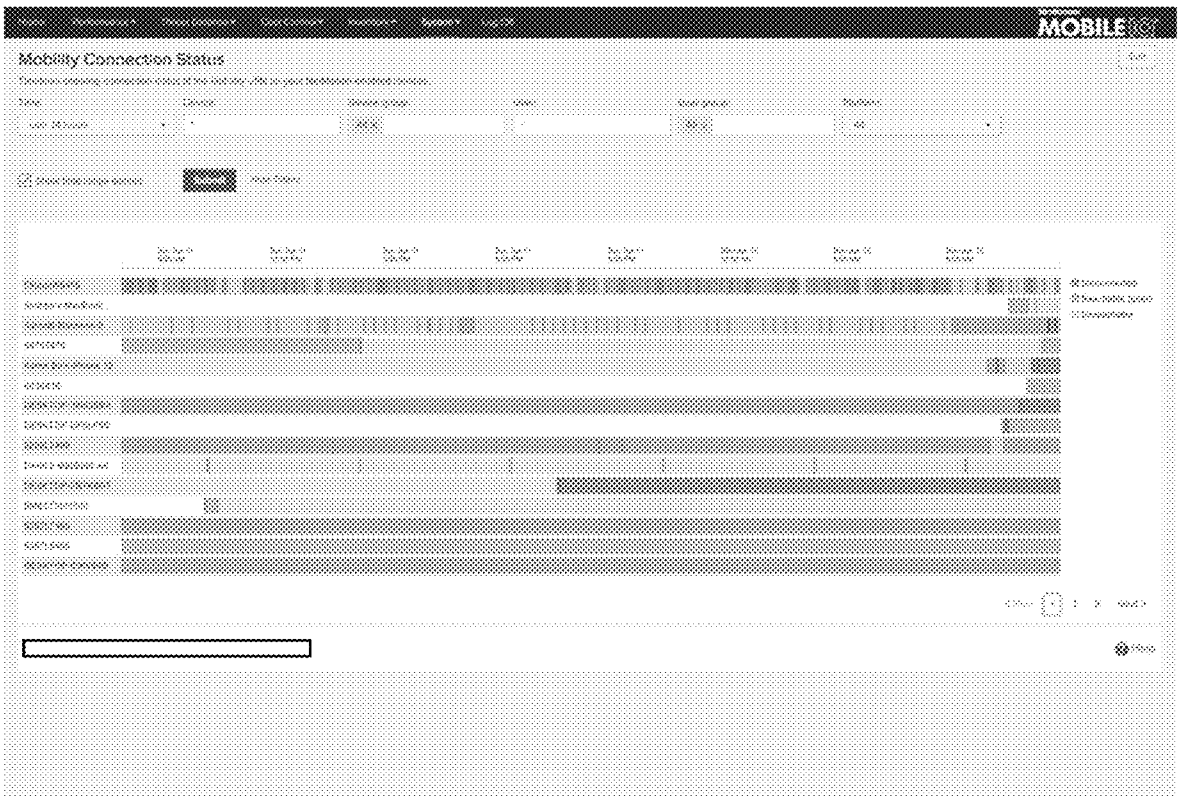

The Mobility Connection Status dashboard in FIG. 68 allows administrators to monitor the connection status of all devices in a deployment, reported by a Mobility server. Identify devices that are experiencing unexpected connection activity, such as devices that are unable to connect to a Mobility server, devices that are unreachable, and devices that remain connected during non-work hours. This dashboard displays information about device connection status from the perspective of a Mobility server. Connection status is updated at least once every half hour while connected to Mobility. Any other device state does not get updated until it changes.

Figure 69:
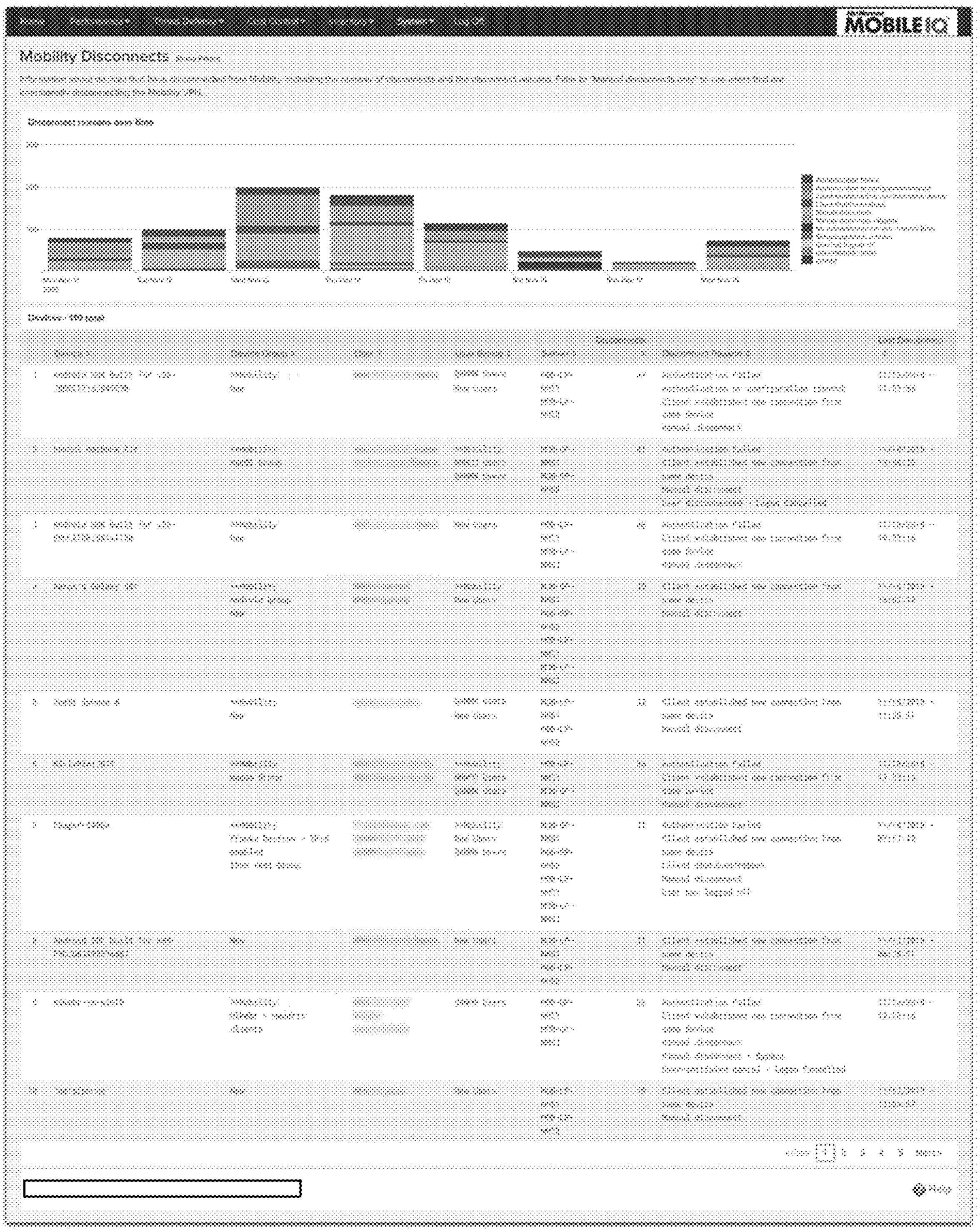

The Mobility Disconnects dashboard in FIG. 69 identifies devices that have disconnected from a Mobility server, and provides the disconnect reason. Use this information to monitor when devices are disconnecting from Mobility and to identify users that are manually disconnecting.

Figure 70:
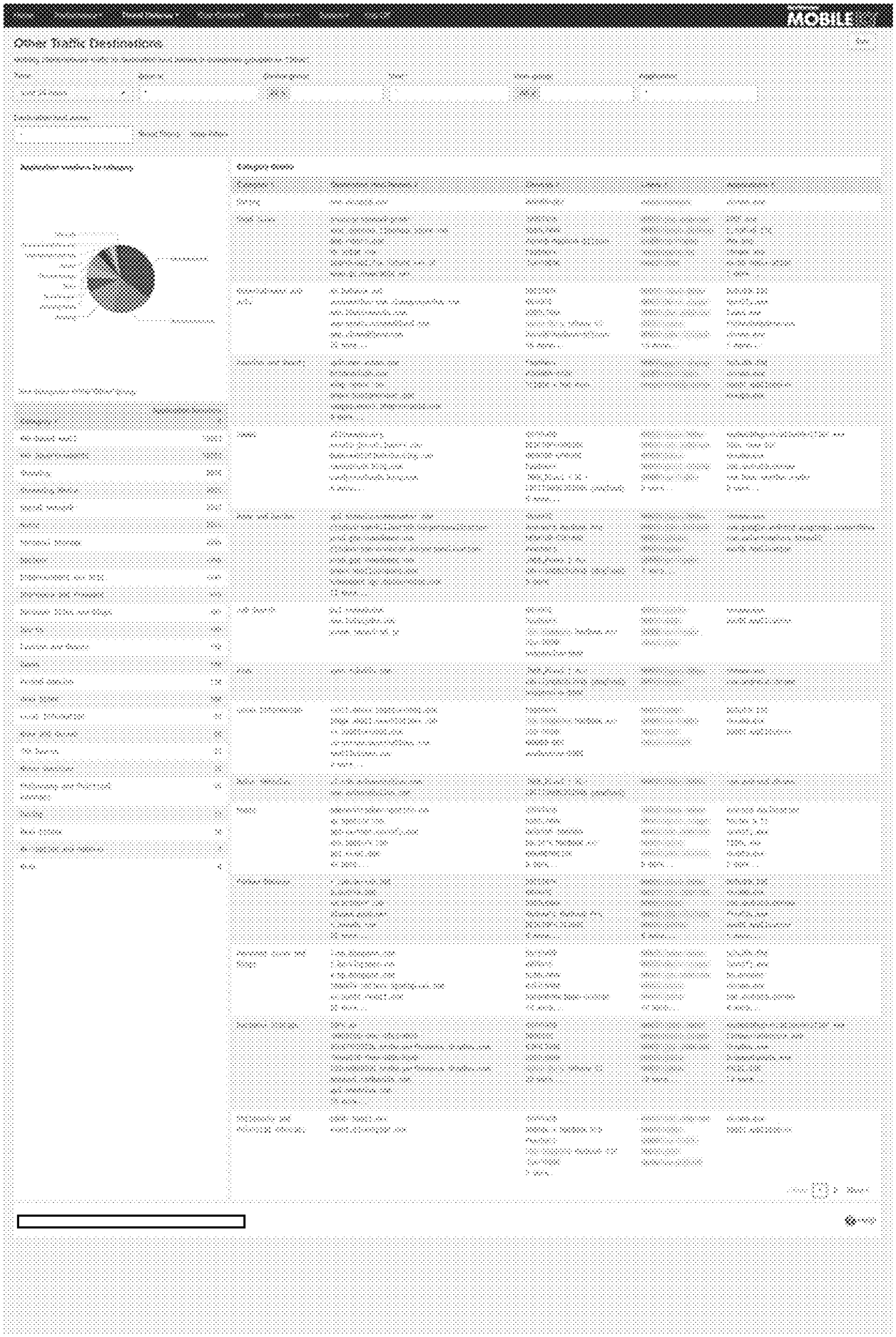

Traffic categorization is a feature of the Mobility Reputation service. When this service is enabled, destination host names are categorized according to site content, and assigned a risk level based on an analysis of various factors including known malicious content, and the popularity and longevity of the site. Each traffic category is assigned to a category group, configured on the Mobility server. The Other Traffic Destinations dashboard in FIG. 70 has a pie chart and table that shows the number of application sessions (flows) by destination categories that are in the Other Traffic category group. To the right, a table displays the destination host names and the devices, users, and applications contacting them. If a destination is in multiple categories in the dashboard category group, its flow count is added to each category.

Figure 71:
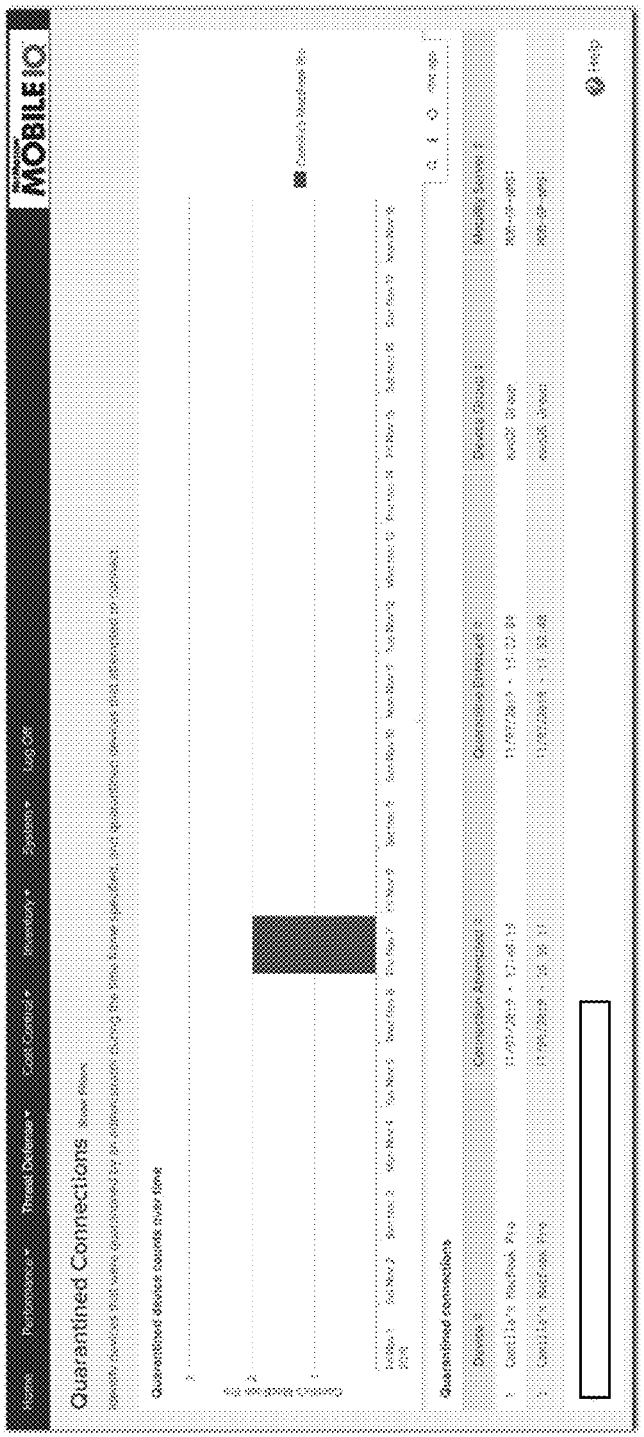

A Mobility client device or user that has been quarantined cannot connect to the Mobility server. Quarantines can be applied to a device, user, or group. A quarantined connection occurs when a quarantined entity (a device, user, or member of a group) attempts to make a connection to Mobility. The Quarantined Connections dashboard in FIG. 71 displays information about each time a quarantine was reported, including when the quarantine was enforced, the device name, group membership, and the Mobility server to which it last connected. Quarantines can be applied manually from the Mobility console, or can be triggered automatically by a device failing to comply with a Network Access Control (NAC) rule.

Figure 72:
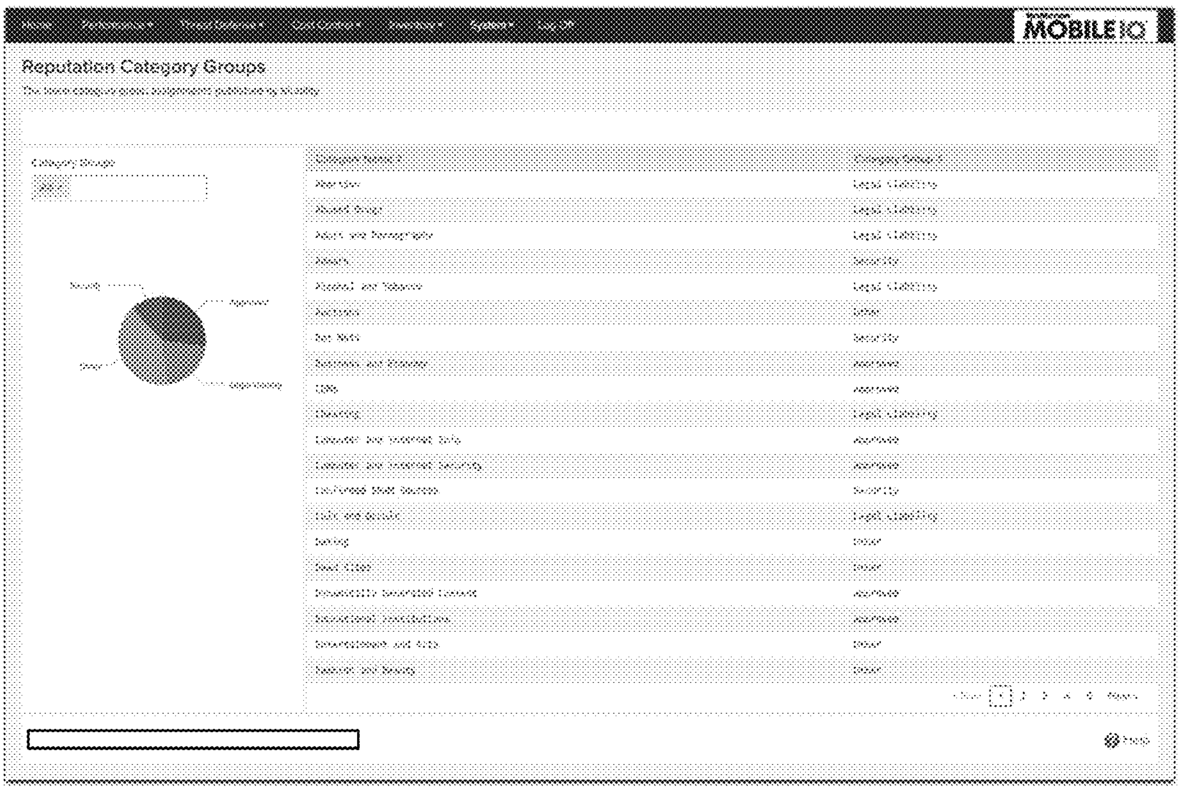

The NetMotion Reputation service, configured within the Mobility console, uses reputation categories, site history, age, rank, and location, in addition to other contextual and behavioral trends to determine risk level of a destination or application accessed by Mobility clients. Each reputation category (such as Gambling, or Violence) belongs to a larger category group (such as Legal Liability). These category groups are used by Mobile IQ dashboards (such as High Risk Traffic Audit, Legal Liability Traffic Audit, and Approved Traffic Destinations) to classify and analyze network traffic. The Reputation Category Groups dashboard in FIG. 72 allows administrators to explore the latest category group assignments without leaving the Mobile IQ console.

Figure 73:
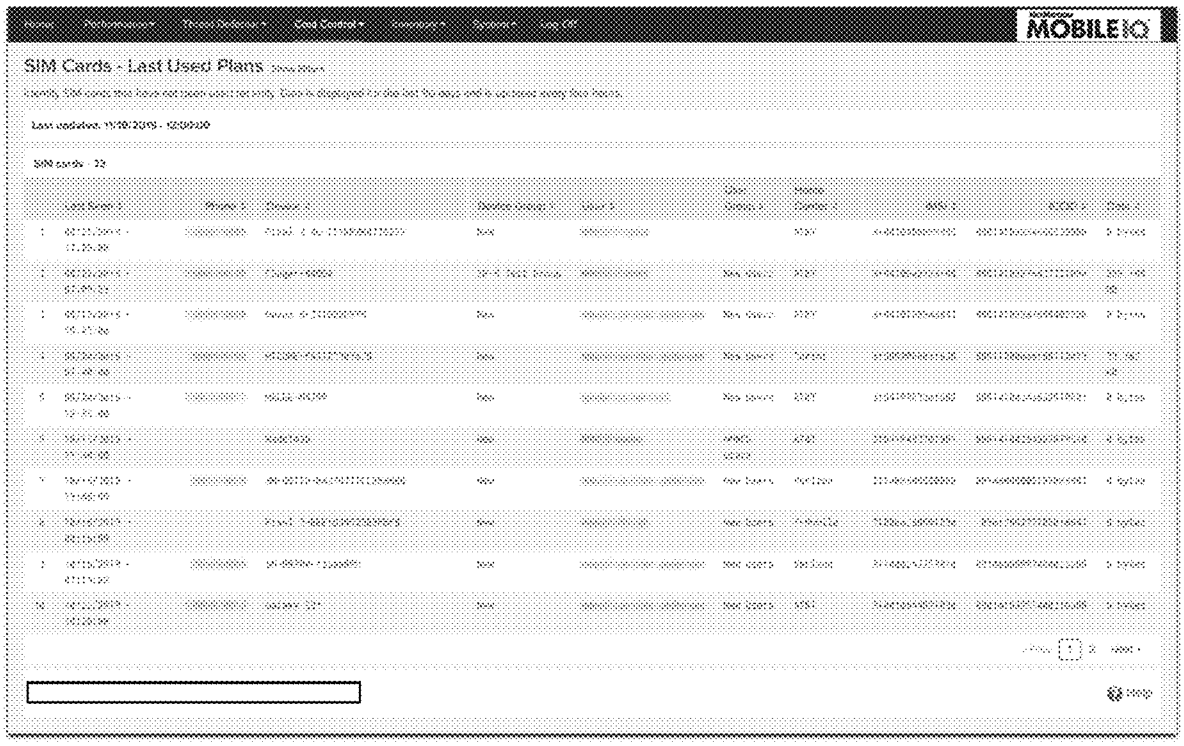

The SIM Cards—Last Used Plans dashboard in FIG. 73 identifies data plans within a mobile deployment that have not been used recently and that may be candidates for plan termination or redeployment to save costs. Track data plans by phone number, carrier and other identifying device information to determine which plans are dormant or in use. This dashboard does not have a time filter. Data is displayed for the complete 90-day retention period, to reveal the most complete data usage trends.

Figure 74:
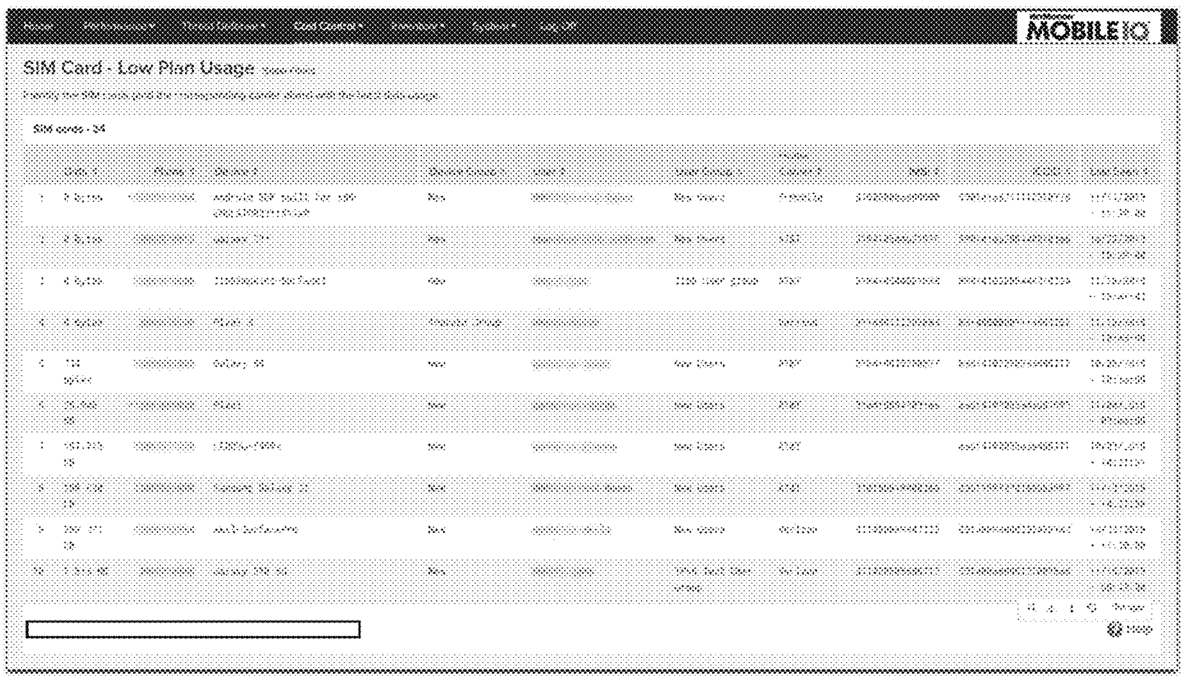

The SIM Cards—Low Plan Usage dashboard in FIG. 74 reveals potentially underused data plans and enables an organization to make better use of existing mobile devices. Use this dashboard to identify cellular data service(s) that could be canceled or redeployed to other mobile workers, and to identify plans that would be better pooled together. A table lists the SIM cards that have been detected on a network within the selected time frame, sorted by lowest data usage. Use the time filter to focus the data on a specific time range, such as a cellular billing period. Additional inventory information is displayed to identify the device and user(s) associated with a SIM card. This information includes device and device group, user and user group, phone number, home carrier, IMSI, and ICCID.

Figure 75:
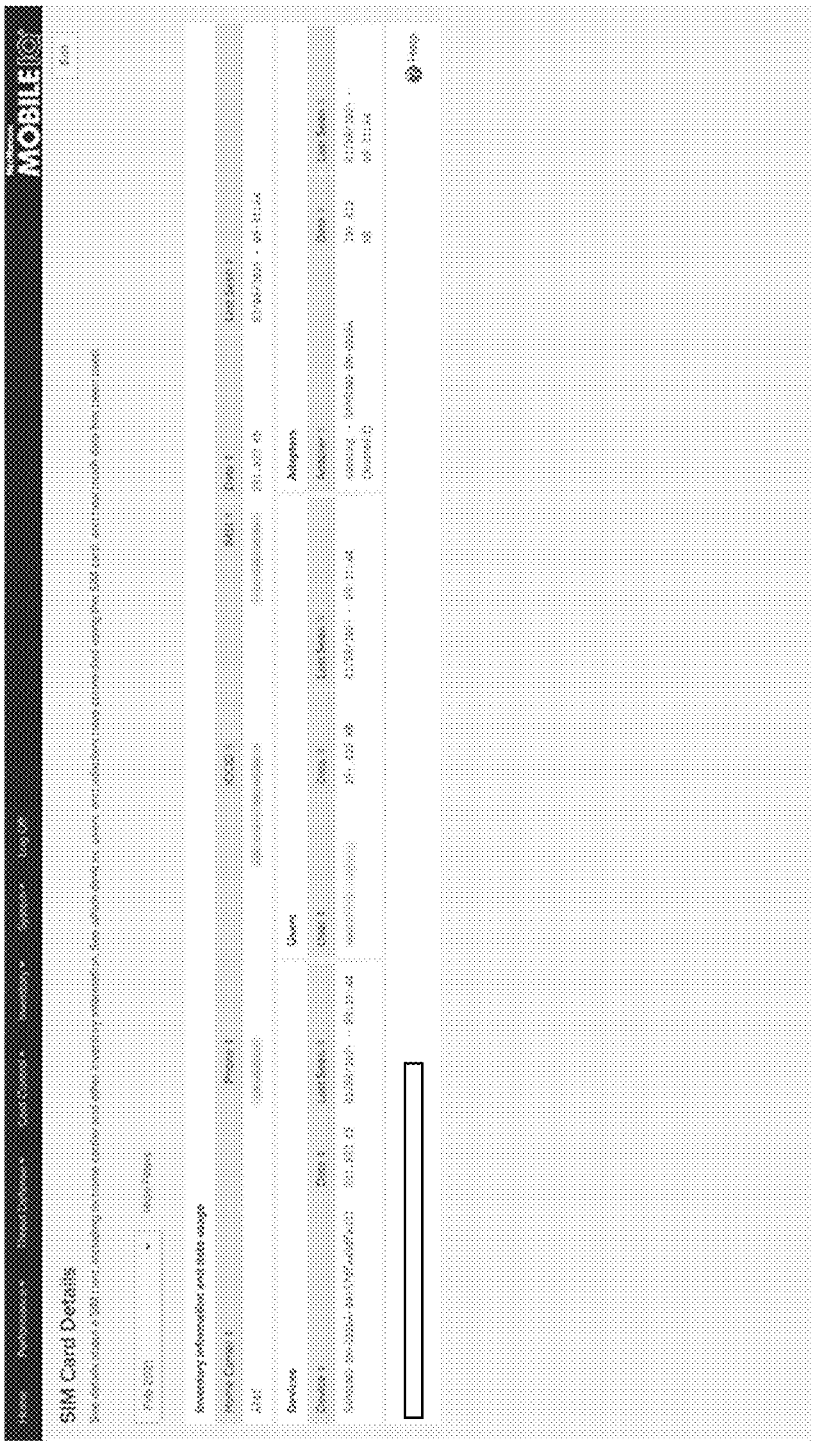

The SIM Card Details dashboard in FIG. 75 displays inventory and usage statistics for a single SIM card, including its home carrier and other inventory information. See which devices, users, and adapters have connected using this SIM card, and how much data has been used.

Figure 76:
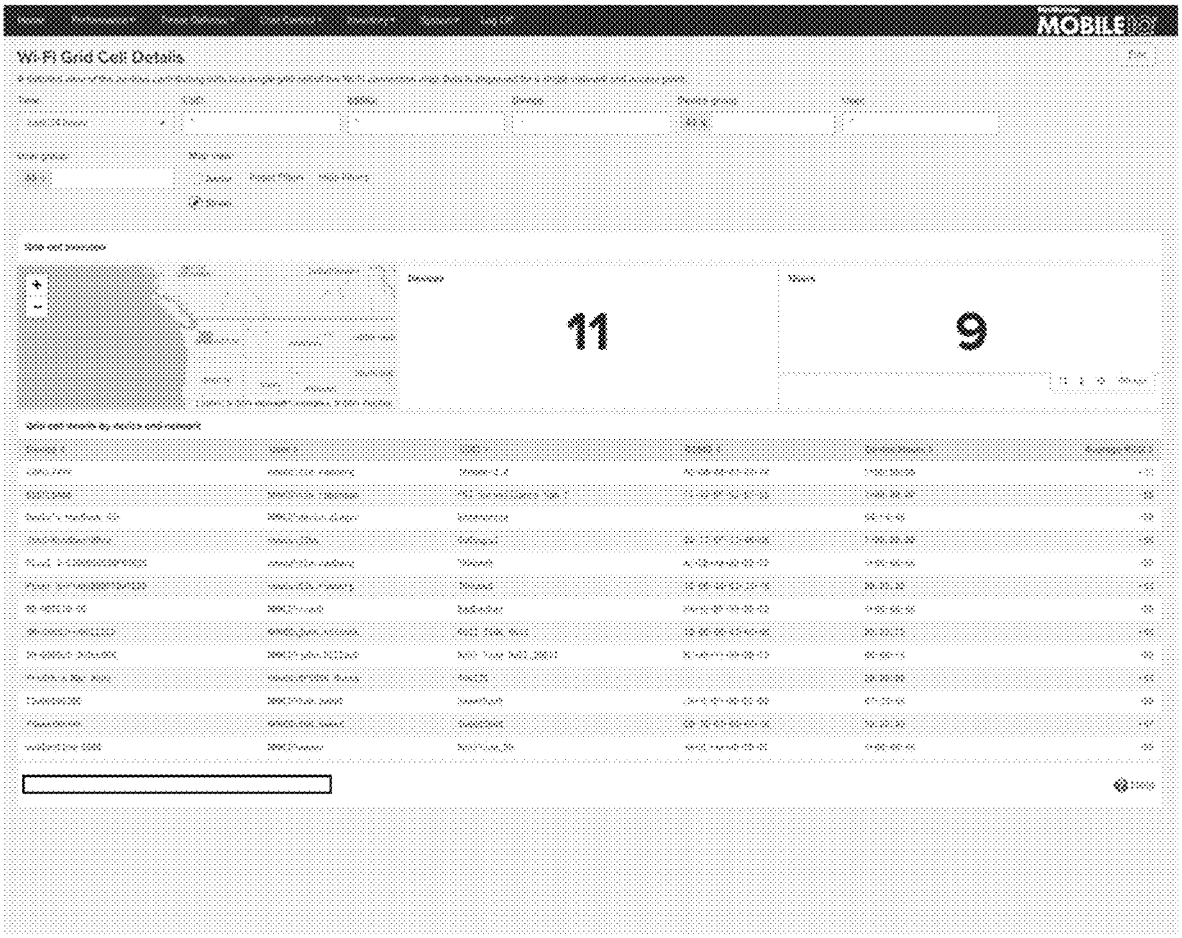

The Threat Status dashboard in FIG. 76 provides a high-level overview of potential security threats, including access to malicious servers and services, connections to low security connections outside of the Mobility VPN tunnel, and access to insecure Wi-Fi networks. Each dashboard panel displays a high-level count of the corresponding threat category. If the count is greater than zero, administrators will also see a timeline and a few further details, such as the number of implicated devices. Each panel drills down to a dashboard with more detail about that threat type.

Figure 77:
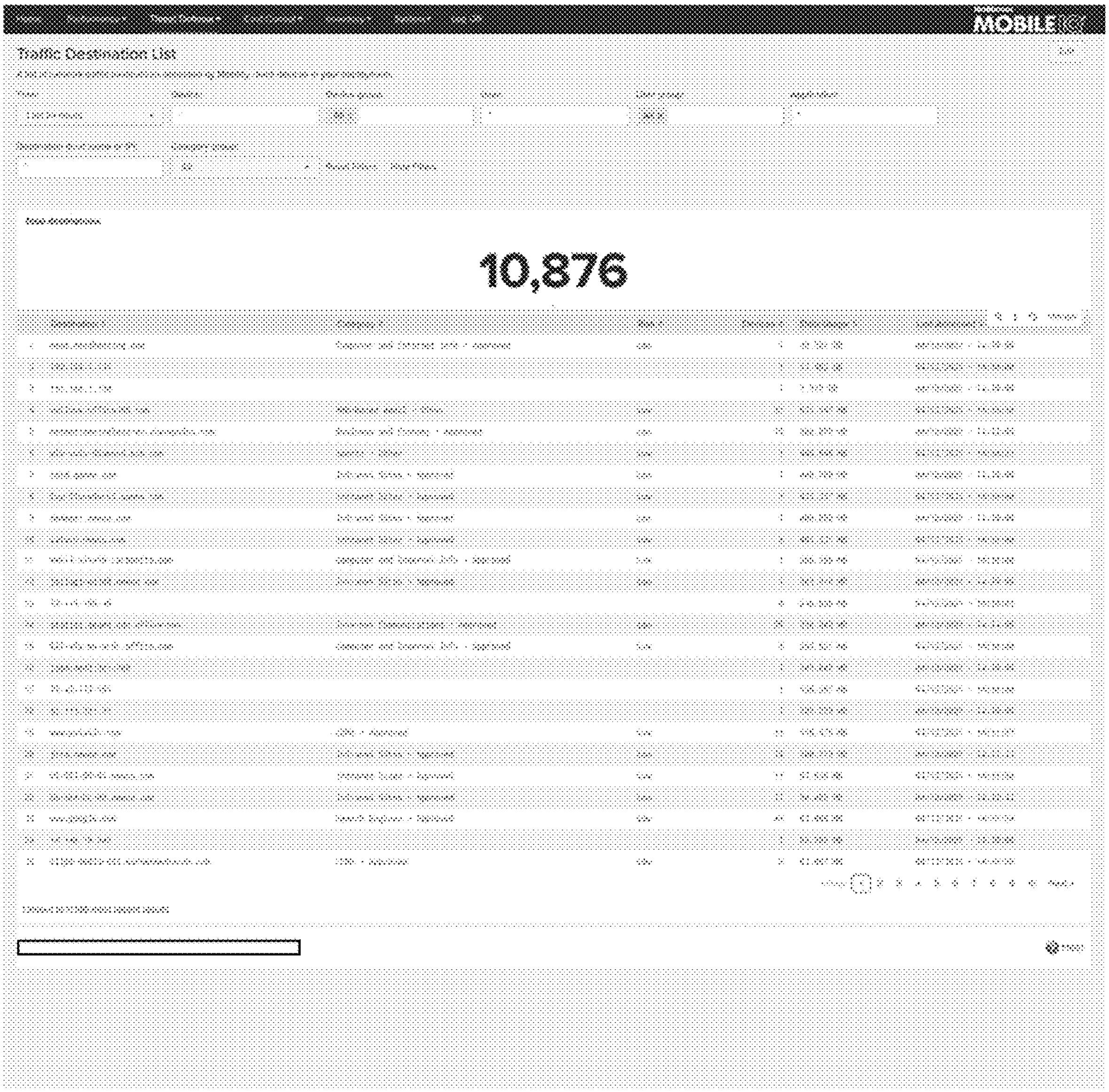

The Traffic Destination List dashboard in FIG. 77 shows high-level information about the destinations (host names and IP addresses) contacted by Mobility clients in a deployment. The dashboard can filtered by device, user, application, and destination. Click a row in the table to see complete details, including a timeline of data used while communicating with the destination, the devices, users, and applications contacting it, and a map of associated remote server locations, described in Destination Details. At the top of the dashboard is the total number of destinations that have been accessed by Mobility clients during the selected time frame. The table below displays the host name or IP address of individual destinations, the number of devices that have accessed each one, the total data that has been sent and received to each, and the time that the destination was last accessed by a Mobility client.

Figure 78:
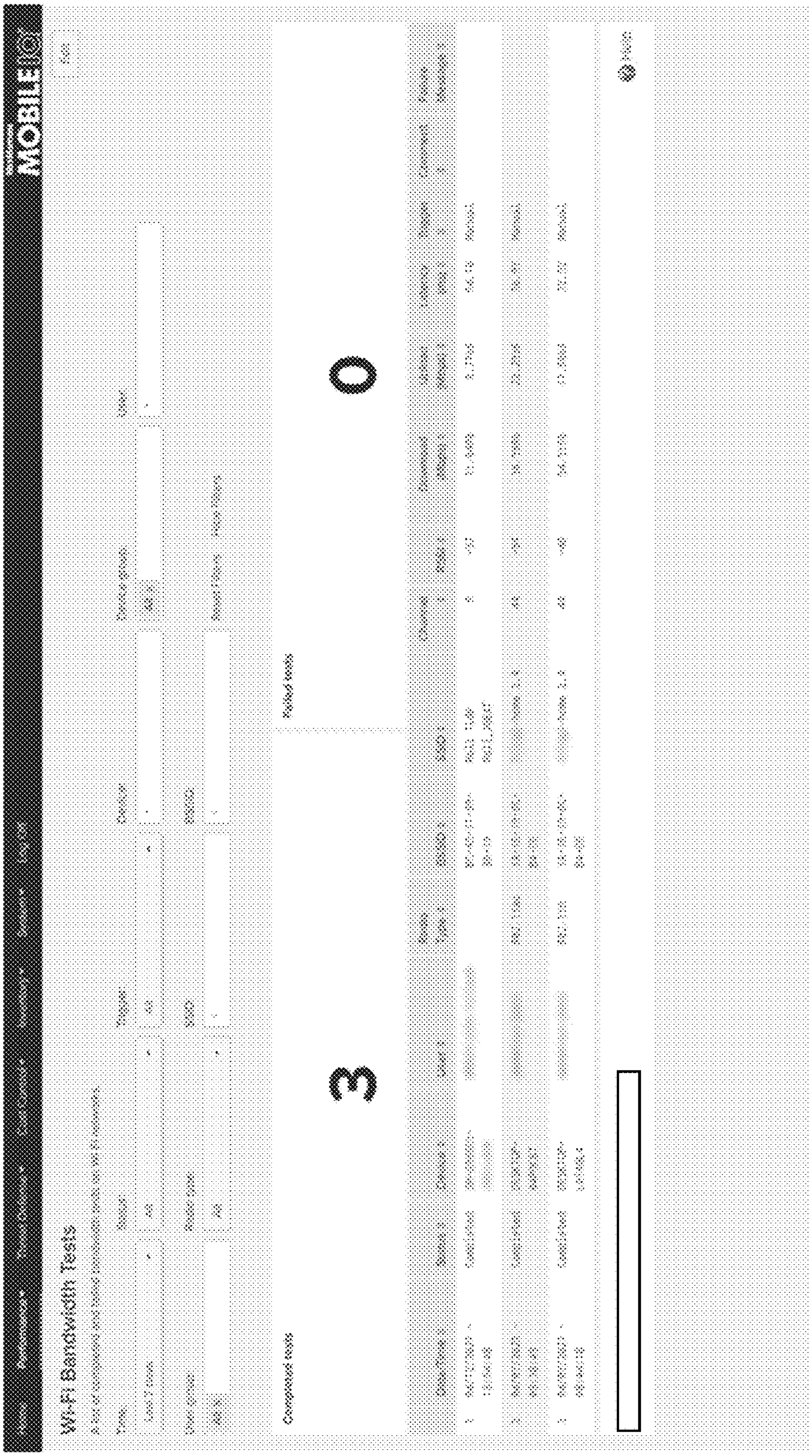

The Wi-Fi Bandwidth Tests dashboard in FIG. 78 display information about each Wi-Fi bandwidth test that occurred during a selected time frame. Data panels display the total count of completed and failed tests. The table of bandwidth tests provides additional information for each test that was run, including device and user information, network information (BSSID, SSID, Channel and RSSI), and test results and statistics about each throughput measurement (Download, Upload, Latency, Trigger, Comment, and Failure Message).

Figure 79:

The Wi-Fi Connection Map dashboard in FIG. 79 describes the Wi-Fi infrastructure in a NetMotion deployment. See where devices have connected to Wi-Fi, how long they have connected, and identify poorly performing areas of a network. The Wi-Fi Connection Map displays aggregated data from all Mobility clients that collected data during the selected time frame. Use the map legend to quickly compare the total wi-fi device hours across grid cells and identify potential problem areas by volume of usage (users, devices, connections, and duration).

Figure 80:
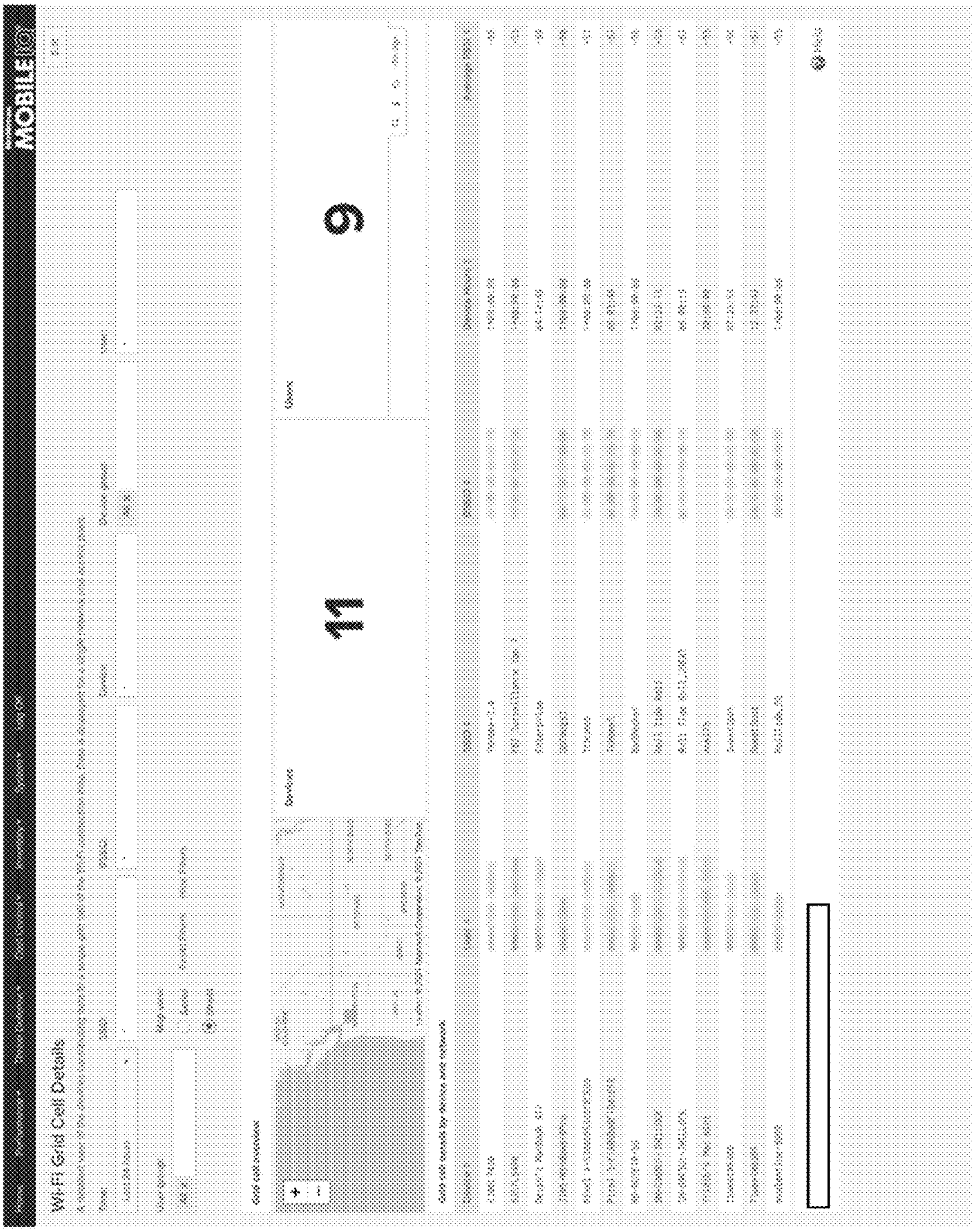

The Wi-Fi Grid Cell Details dashboard in FIG. 80 displays information about a specific grid cell that was selected from the Wi-Fi Connection Map dashboard. Dashboard filters for SSID and BSSID are pre-populated based on the selection made on the Wi-Fi Connection Map. Clear these filters to view statistics for all wi-Fi connections in the grid cell over a selected time frame. Panels within this dashboard display the grid cell and the map coordinates of the cell being viewed, a raw count of the number of devices and users that connected to a network in the specified grid cell, and aggregated statistics reported by clients in the selected grid cell.

The system and method in the presently disclosed embodiments use artificial intelligence (AI) and machine learning to improve performance, reliability, cost and security. In particular, the system and method are operated to automate performance, cost and security improvements in real-time, to maintain entity behavior awareness, e.g., user, device, application, battery, network, domains, reputation, in real-time and to perform cohort analysis and monitor group behavior in real-time. The AI and machine learning are likewise capable of performing cohort analysis, i.e., to identify entities not performing as others, as well as an entity analysis that can monitor changing usage patterns to determine that an entity is acting out of the ordinary. Moreover, the system and method can use any statistical or machine learning algorithms, or combinations thereof, for the purposes of anomaly detection, cluster analysis, cohort discovery, pattern recognition, etc. using data from groups of users, individual users, and/or discovered cohorts. Non-limiting examples of statistical and machine learning algorithms include deep learning neural networks; variational autoencoders; overcomplete autoencoders; support vector machines; random forests; DBScan, KMeans, and other clustering algorithms; and local outlier factors.

According to embodiments, AI and machine learning can address costs by identifying increases in data usage on metered networks and alert users to significant changes, identifying when users could be using Wi-Fi but are not, e.g., notifying users when in areas that have Wi-Fi coverage and/or offloading and roaming to Wi-Fi when available. Further, cohort analysis can be used to identify entities that are using more/less than others, e.g., doing more/less transactions than others, using more data/less than others, staying on costly metered networks instead of free Wi-Fi, and/or using unusual services.

The AI and machine learning can improve performance and productivity. To address issues of over usage of "recreational" applications, the method and system can be configured to notify, alert, automatically block usage, throttle usage, and/or restrict usage and to address issues of under usage of mission-important applications, the AI and machine learning can notify and alert the VPN server pool, which can issue an alert and log the data to productivity dashboards. Moreover, as performance and productivity changes over time, the method and system can be configured to notify, alert, automatically block usage, throttle usage, and/or restrict usage, and to reduce network wait times by blocking unneeded traffic, such as adware and advertisements. The AI and machine learning can also use cohort analysis to identify devices and users that are underperforming, e.g., specific users that are doing less transactions (productivity) than others, devices with batteries that are failing, devices with unusual applications, devices using unusual services, and/or unusual or changing time patterns. Moreover, the AI and machine learning can identify areas with historically poor network performance and switch to a better network, when available, or alert if nothing better is available. To address cohort analysis identifying devices and users that are underperforming, the AI and machine learning can identify specific users that are doing less transactions (productivity) than others, devices with batteries that are failing, devices with unusual applications, devices using unusual services, and/or unusual or changing time patterns.

With regard to security, the AI and machine learning can provide threat analysis to make it easier for businesses to find potentially malicious activity by sifting through enormous volumes of data to find only "Interesting Information". In this regard, the AI and machine learning can monitor and learn "normal" behavior for a given Entity (User, Device, Application) and identify behavior changes, monitor cohorts and identify entities that are different, e.g., a device that becomes infected and starts exhibiting strange behavior is placed into a heightened state of monitoring, detect entities uploading or downloading data to unusual services (such as DropBox), detect entities sending/receiving to unusual IP addresses, servers, services, locations and countries, security software enabled/disabled (e.g. firewall, DLP, AV, etc.), valid/invalid certificates, key application absent or present on device, device security controls enabled/disabled and/or frequency of attempts to access blocked sites. The AI and machine learning can also determine the boundaries of "normal" locations of individual devices and/or device cohorts and detect when a device is outside of its normal area.

Based on the findings and/or detections of the AI and machine learning, the method and system can block or allow traffic; switch between the use of different network interfaces; use multiple network interfaces; use or not use a proxy server; switch between different proxy servers; force encryption between two devices; force compression between two devices; force forward error detection between two devices; cause a device to launch an application; cause a device to run diagnostics; force advanced authentication; enable advanced logging; throttle network usage; limit network destinations; quarantine the device; and/or force traffic through encrypted tunnels.

Referring back to FIG. 5, all attempted network flows 511-513 are captured at the client or client device 510 and, depending upon the currently configured policy of the client, are routed either directly to their intended destinations 513 via a local proxy to a public or private network, proxied through the tunnel 511 and to their intended destinations 512 via VPN server pool, or blocked. All network flow metadata 514 from client 510 is sent to the VPN server pool 531 which processes and formats the stream of metadata, sending the results, as network flow metadata 515, to reporting engine 535 and to data intake servers 536. The data intake servers 536 further processes the results, preparing them for analysis and storing by sending network flow metadata 517 to data storage 533. Analysis servers 534 will periodically retrieve and process network flow metadata 518 from data storage 533, depending on the specific needs of the algorithms, including machine learning algorithms, being employed, and produce zero or more alerts. Alerts 540 are sent to VPN server pool 531 which will forward them to reporting engine 535 and, depending on how users have configured the VPN, update the configured policy 542 on one or more clients or client devices 510.

In the view of the above, it is understood that all network flows can be captured so that metadata or information about them may be collected and then all network flows can be rewritten back to the local network stack.

Embodiments are directed to a method and system for capturing all network flows to and from a computer, recording information on all such flows, and sending all information to common data storage. The invention is further comprised of aggregating flows of collected data in real-time and processing the aggregated results through one or more machine learning (ML) algorithms. The method and system further include a specific ML workflow which groups and aggregates flows of previous data, adds statistical metadata to produce specialized data sets, uses the specialized data sets to train a customized ML algorithm, and saves a trained ML model for each group of aggregated flows. As described herein, machine learning workflow can be understood to refer to all processing required to complete a particular task. The method and system further include grouping and aggregating flows of new data into the same specialized data sets and producing an anomaly score for the new data by processing the data sets through a given group's previously saved ML model. The method and system further include producing an anomaly events by comparing anomaly scores to a threshold, and being configured to allow for defining the grouping of data flows and for customizing the thresholds used to produce anomaly events.

Figure 39:
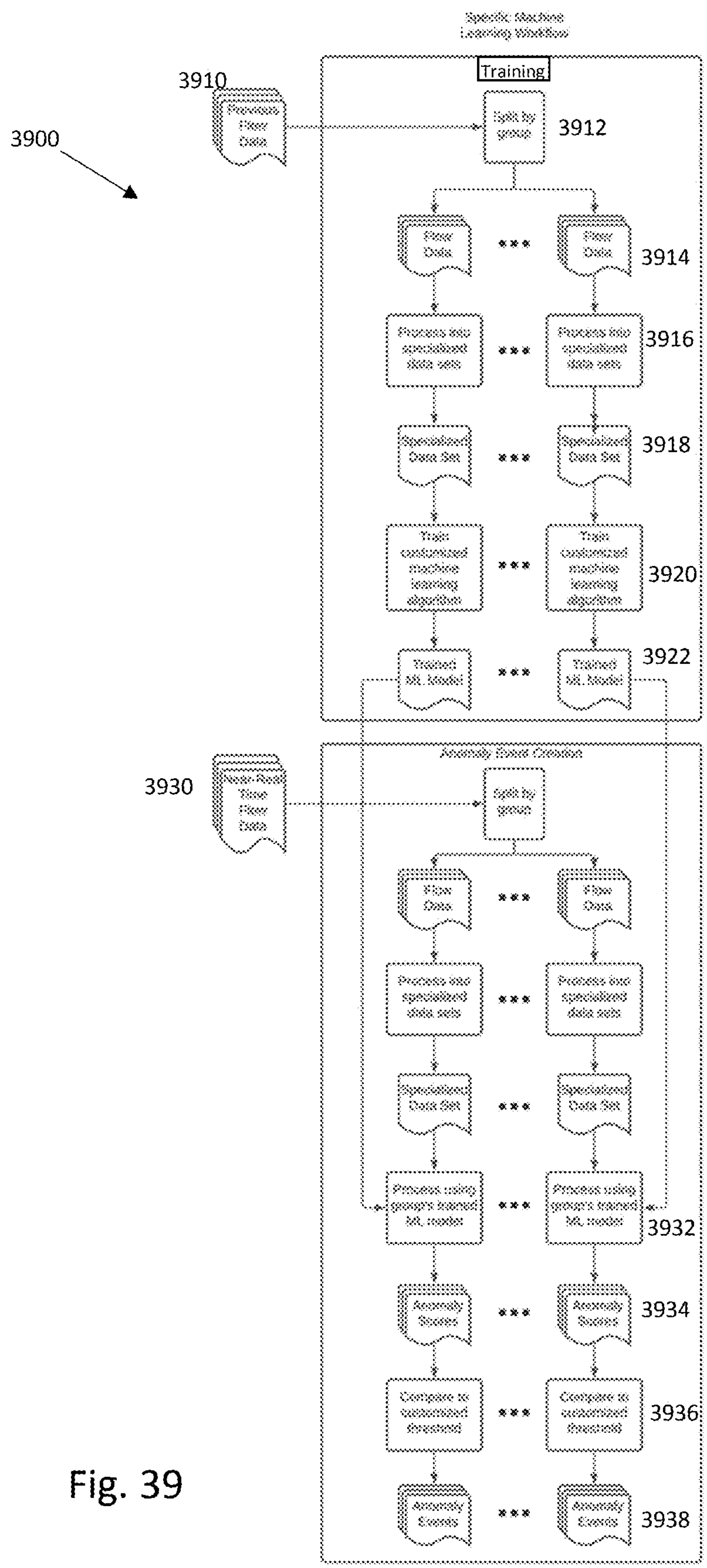
FIG. 39 shows an exemplary flow diagram of network flow metadata or information processing of a machine learning workflow.

FIG. 39 is an exemplary flow diagram 3900 of the network flow information processing of the ML workflow described above. FIG. 39 starts with the treatment of previous flow data 3910 used for training. Previous data 3910 is pulled from data storage in the server, split into groups 3912 as separate data flows 3914 and then processed 3916 into specialized data sets 3918. The specialized data sets 3918 can be used to train the ML model 3920 to produce trained ML models 3922. Real-time data 3930 received after ML model 3920 is trained is treated similarly to previous data 3910, except, instead of being used to train an ML model, real-time data 3930 is passed at 3932 through the trained ML model 3920, which produces anomaly scores 3934. Each anomaly score is compared against a threshold 3936 and, if the anomaly score is greater than the threshold, the data during that time is flagged as anomalous 3938 and an alert is sent to the VPN server pool.

Figure 40:
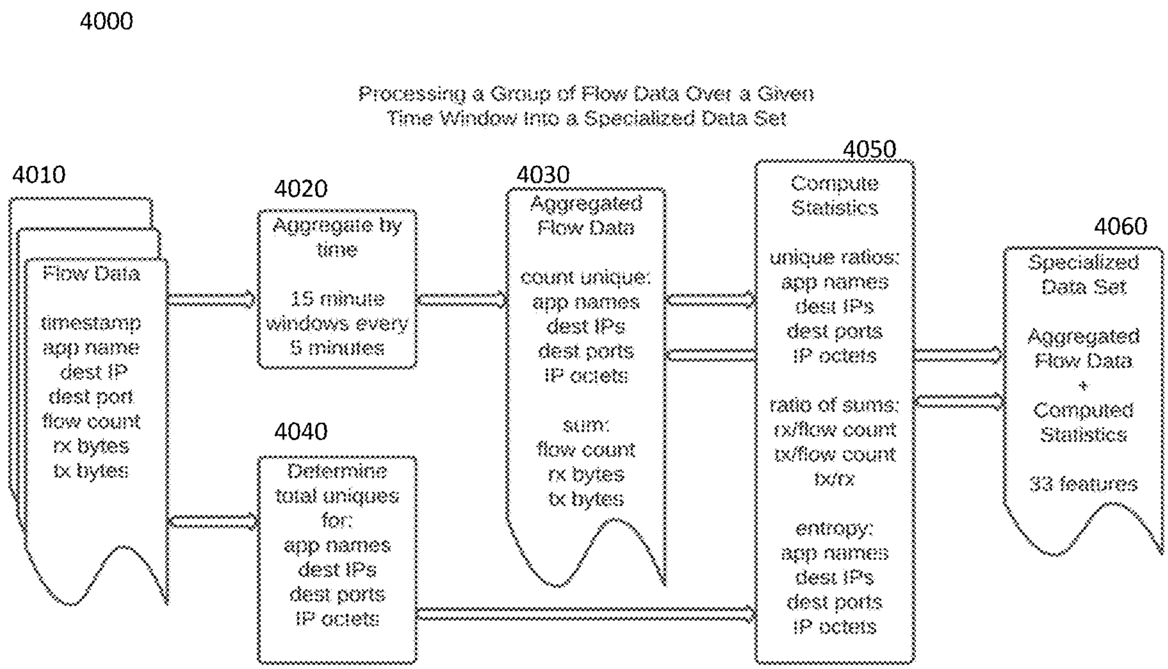
FIG. 40 shows an exemplary flow diagram depicting how network flow information or metadata is processed into specialized data sets.

FIG. 40 is an exemplary flow diagram 4000 depicting how network flow information or metadata from a group of devices 4010; namely the date and time of a group of flows, name of the client applications involved, the destination IP addresses, the destination ports, the number of individual flows in the group, the total number of bytes received ("rx"), and the total number of bytes sent ("tx"); is processed into specialized data sets. The group of flow data is aggregated into 15 minute windows 4020, then counts of unique values are determined for the applications involved, destination IP addresses, destination ports, and the sub fields of the address ("IP octets") and a total is calculated for the flow counts, received bytes ("rx") and transmitted bytes ("tx") 4030. Meanwhile, the total number of unique values across all flows are determined for the applications involved, destination IP addresses, destination ports, and the sub fields of the address ("IP octets") 4040 and used at 4050 to compute the ratios of the unique values for each flow group for the applications involved, destination IP addresses, destination ports, and the sub fields of the address ("IP octets"). The sum of the flow counts, received bytes ("rx"), and transmitted bytes ("tx") from 4030 are used at 4050 to calculate ratios of received bytes to flow count, transmitted bytes to flow count, and transmitted bytes to received bytes. Also, the overall count of unique values from 4040 are combined with the flow group's unique values from 4030 to calculate the entropy of the unique counts for the flow group in 4050. The computed statistics 4050 are appended to the aggregated flow data 4030 to form a specialized data set 4060.

Figure 41:
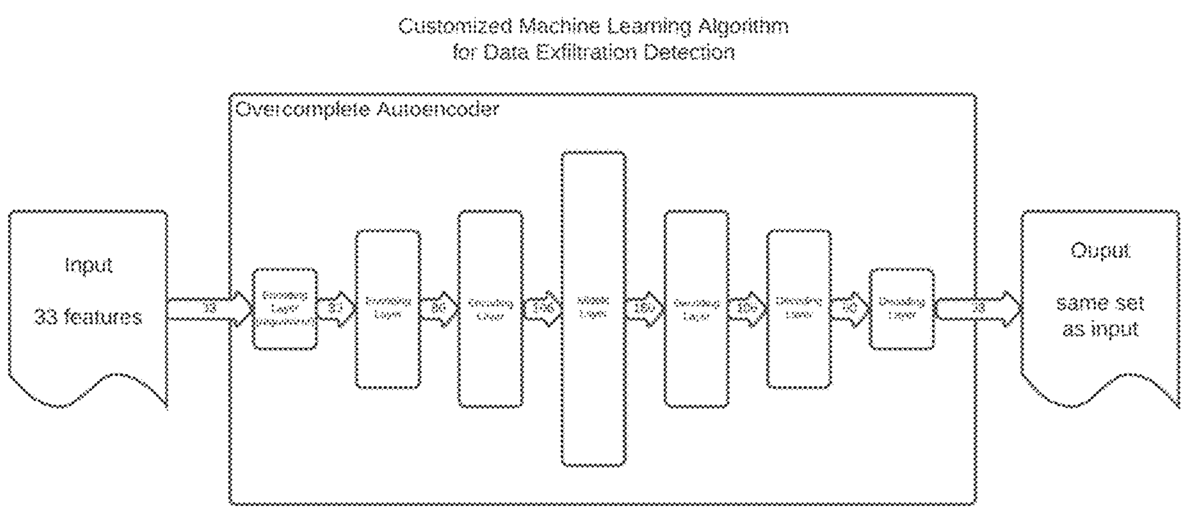
FIG. 41 shows an exemplary diagram depicting an exemplary ML algorithm.

FIG. 41 is an exemplary diagram 4100 depicting an exemplary ML algorithm according to embodiments that includes a series of neural network layers that, taken together, form an overcomplete autoencoder. As input, the ML algorithm takes in a specialized data set 4060, whose 33 values ("features") are regularized and used as input to a neural net whose output is 80 values. These 80 values are passed to a second neural net (or "layer") whose output is 106 values. These are passed to the middle neural net which acts as a bridge between the "encoding" and "decoding" halves of the ML algorithm, outputting 160 values. The middle neural net passes its 160 values to the next layer that output 106 values. The next neural net receives the 106 values and creates 80 values. Those 80 values are passed to one final neural net that output 33 values. In this way the overcomplete autoencoder attempts to reproduce its input at its output. The middle layer's 160 values can be interpreted as a mathematical representation of the original 33 input values (said to be an "encoding" of the original input). The process of attempting to reproduce the input at the output is done by the remaining layers (which are said to be "decoding" the middle layer's output). Given this architecture, training can be done using standard gradient decent by taking the difference between the original 33 input values and the 33 values produced at the output.

The method and system further include a specific ML workflow that generates specialized data sets by processing aggregated network traffic metadata to obtain higher dimensional input data. The aggregated network data has the following fields: date/time of transfer, received bytes, transmitted bytes, number of flows, application name, destination address, and destination port. Application names, destination addresses, and destination ports are treated as non-numeric (categorical) data. Each unique value for all categorical data is treated as a single input (feature) processed by the ML architecture. As described herein, machine learning architecture can be understood to refer to one or more machine learning algorithms that have been combined to accomplish a particular task. As a non-limiting example, if 'explorer' is an application name in the aggregated network traffic then all entries in the specialized data set will contain a value called 'explorer' which will be the number of times the aggregated network traffic contained 'explorer' as an application name within a 15-minute interval. The specialized data set will therefore include the set of all unique categorical values within the aggregated network data appended with the numerical values for received bytes, transmitted bytes, and number of flows. Therefore, a given entry in the specialized data set will be the count of each unique value seen in the aggregated network data over a 15-minute interval along with the numerical averages of received bytes, transmitted bytes, and number of flows reported in the aggregated network data over the same 15-minute interval. Therefore, the number of values in every entry of a given specialized data set is the number of unique application names plus the number of unique destination addresses plus the number of unique destination ports plus three (which are the average of received bytes, average of transmitted bytes, and average of number of flows).

After processing into specialized data sets, we limit subsequent processing to specialized data sets from a single computer or customized group of computers with at least 40 values (features) and at least 10 days' worth of data (approximately 1000 data points when grouped into 15-minute intervals).

The present invention uses a two-stage ML architecture. The first stage applies a Variational Auto-Encoder (VAE) ML algorithm using the specialized data sets as input. The VAE outputs a "mean error" for each entry in the specialized data set by attempting to reproduce the input entry at its output and calculating the difference between the two. The second stage includes multiple statistical methods which independently process the mean error, so that each statistical method produces a score indicative of how anomalous the given mean error is compared to all previous mean errors. A "mean score" is produced by averaging the scores from the statistical methods. The mean score is compared against a customizable threshold to determine if the original input should be considered an anomaly.

The present invention's second stage implements three statistical methods: One-Class Support-Vector Machine (OC-SVM), Isolation Forest (ISF) and Local Outlier Factors (LOF).

Figure 42:
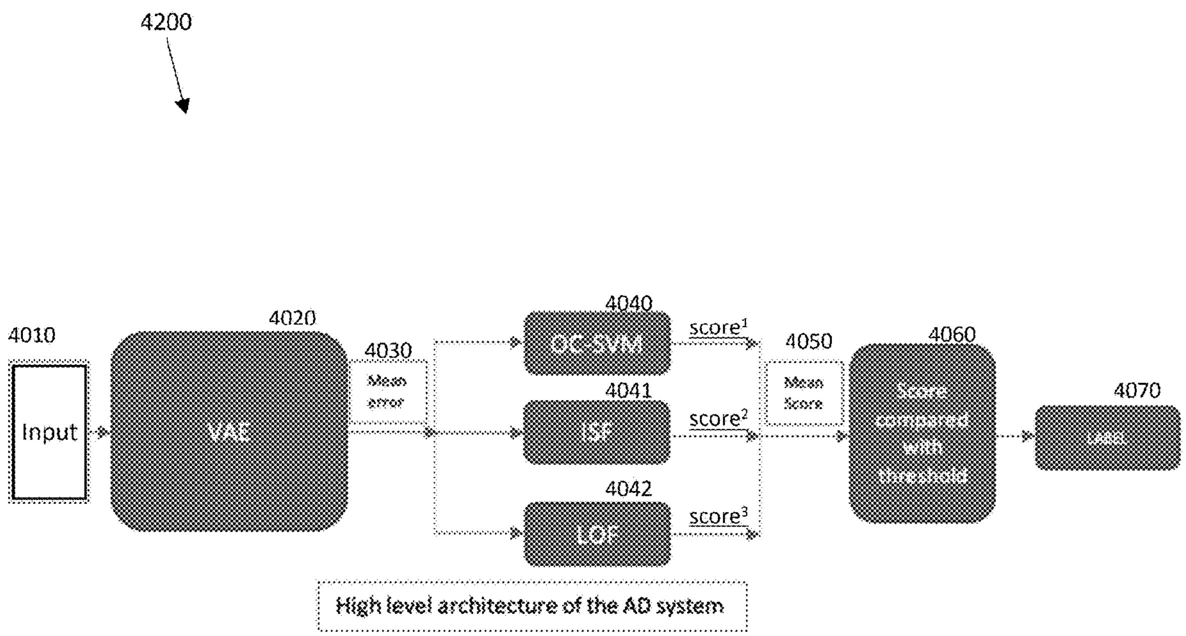
FIG. 42 shows exemplary diagram depicting machine learning workflow.

FIG. 42 is an exemplary diagram 4200 depicting the ML workflow. It takes as input 4210 a specialized data set (described above), passing it through a Variation Autoencoder (VAE) 4220 to produce a mean error value 4230. This mean error value can be passed through multiple different statistical methods, e.g., three different statistical methods that include one-class support-vector machine (OC-SVM) 4240, isolation forest (ISF) 4241 and local outlier factors (LOF) 4242, each producing a score $score^1$, $score^2$, $score^3$, respectively, indicating how rare the given mean error value is. The three scores can then be averaged to produce a mean score 4250, which can be compared to a threshold 4260 and, if above the threshold 4260, is treated or labeled as an anomaly 4270.

Figure 43:
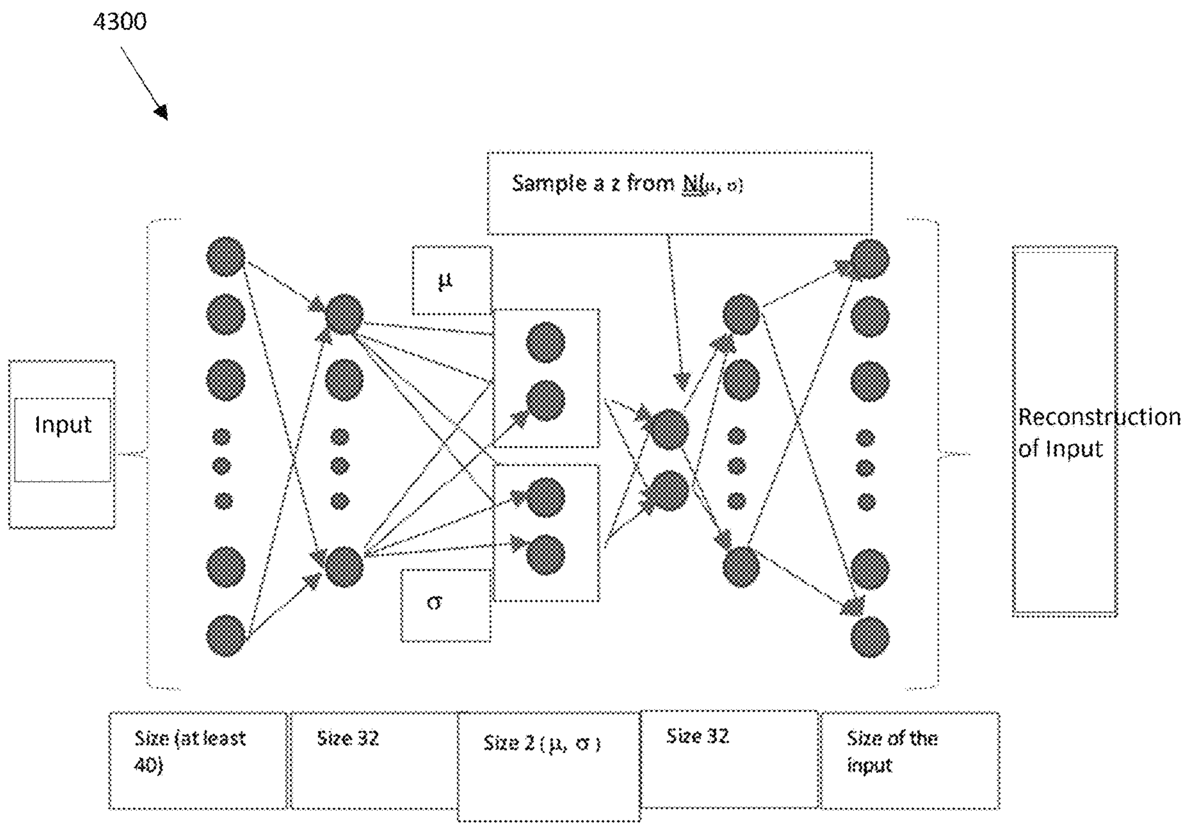
FIG. 43 shows exemplary diagram depicting a machine learning algorithm.

FIG. 43 is an exemplary diagram 4300 depicting the ML algorithm, which can be a Variational Autoencoder (VAE), used in the ML workflow depicted in FIG. 42. The ML algorithm can contain five neural network layers that decrease from the number of fields in the specialized data set down to 4 and symmetrically increase back up to the input size. At the central layer the four outputs are sampled down to two values to form a distribution that is then used for anomaly detection.

Figure 44:
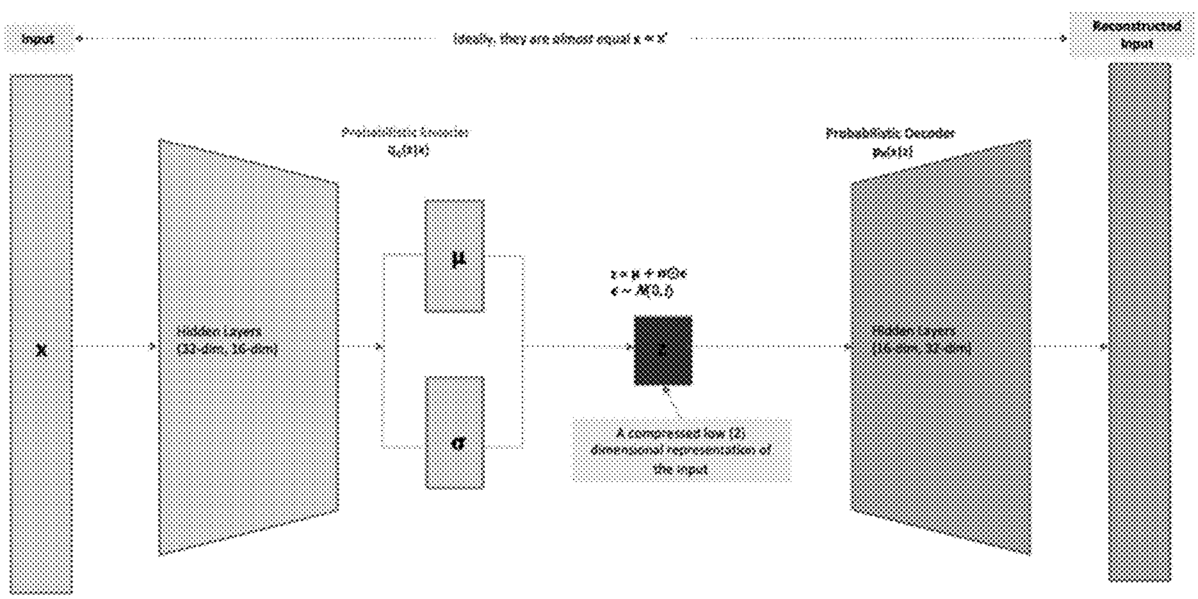
FIG. 44 shows an exemplary diagram depicting an idealized Variational Autoencoder.

FIG. 44 is an exemplary diagram 4400 depicting an idealized Variational Autoencoder as depicted in FIG. 43.

Aspects of embodiments of the present disclosure can be implemented by such special purpose hardware-based systems that perform the specified functions or acts, or combinations of special purpose hardware and computer instructions and/or software, as described above. In embodiments, the software elements can include firmware, resident software, microcode, etc.

As will be appreciated by those ordinarily skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., the VPN service, the reporting engine, the analysis server, the VPN policy engine) may take the form of a computer program product embodied in any tangible medium of expression having computer-usable program code embodied in the medium.

Any combination of one or more computer usable or computer readable medium(s) may be utilized in the server and in the client. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a USB key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the client or client device and partly on the server, whether on premises or in the cloud. The client or client device may be connected to the VPN server and/or to a destination server or service through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 45:
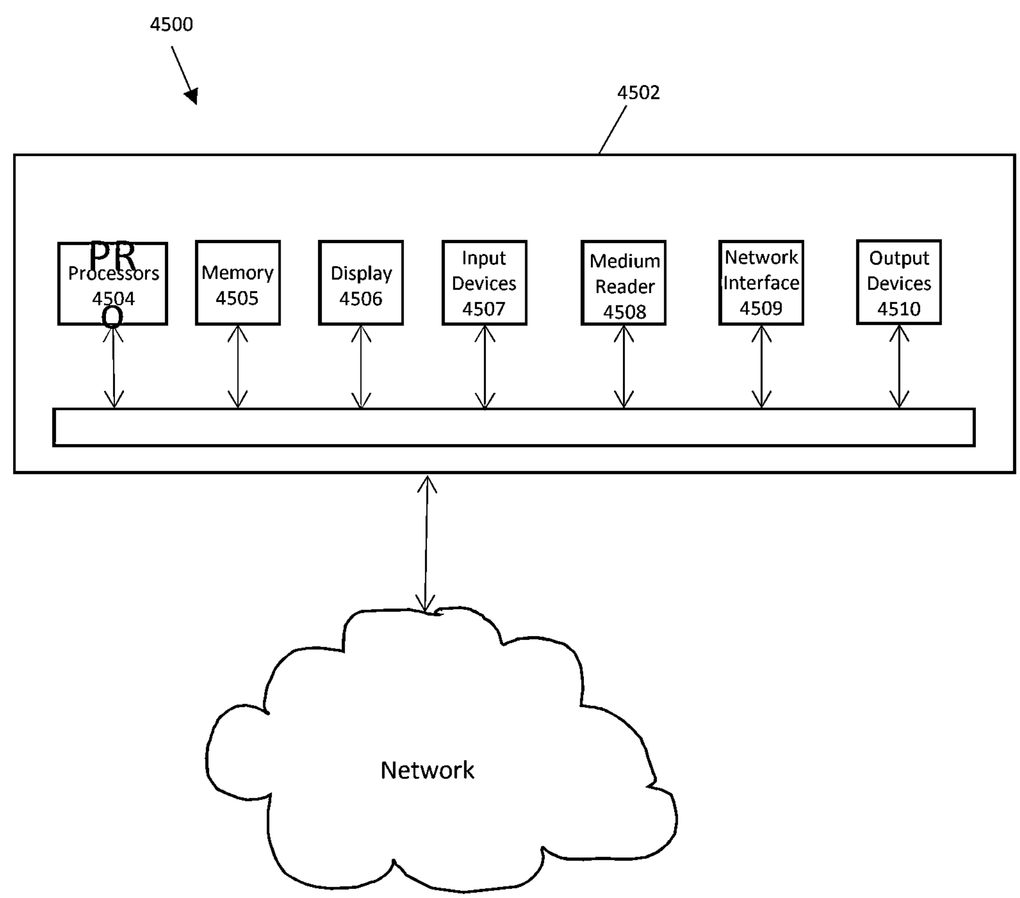
FIG. 45 shows an exemplary system environment for practicing embodiments of the invention.

FIG. 45 is an exemplary diagram of a system 4000 for use as the client and/or as the VPN server in accordance with the embodiments described herein. The system 4500 is generally shown and may include a computer system 4502, which is generally indicated, that is connectable to a network 4522. The computer system 4502 may operate as a standalone device or may be connected to other systems or peripheral devices. With regard to the VPN server, the computer system 4502 may include, or be included within, any one or more computers, servers, systems, communication networks or cloud environment.

The computer system 4502 may incorporated into one or both of the server and client. The computer system 4502, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 4502 is illustrated, additional embodiments may include any collection of systems or sub-systems that individually or jointly execute instructions or perform functions.

As illustrated in FIG. 45, the computer system 4502 may include at least one processor 4504, such as, for example, a central processing unit, a graphics processing unit, or both. The computer system 4502 may also include a computer memory 4506. The computer memory 4506 may include a static memory, a dynamic memory, or both. The computer memory 4506 may additionally or alternatively include a hard disk, random access memory, a cache, or any combination thereof. Of course, those skilled in the art appreciate that the computer memory 4506 may comprise any combination of known memories or a single storage.

As shown in FIG. 45, the computer system 4502 may include a computer display 4508, such as a liquid crystal display, an organic light emitting diode, a flat panel display, a solid state display, a cathode ray tube, a plasma display, or any other known display. The computer system 4502 may include at least one computer input device 4510, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 4502 may include multiple input devices 4510. Moreover, those skilled in the art further appreciate that the above-listed, exemplary input devices 4510 are not meant to be exhaustive and that the computer system 4502 may include any additional, or alternative, input devices 4510.

The computer system 4502 may also include a medium reader 4512 and a network interface 4514. Furthermore, the computer system 4502 may include any additional devices, components, parts, peripherals, hardware, software or any combination thereof which are commonly known and understood as being included with or within a computer system, such as, but not limited to, an output device 4516. The output device 4516 may be, but is not limited to, a speaker, an audio out, a video out, a remote control output, or any combination thereof. As shown in FIG. 45, a bus 4518 can be provided for communication between the various components of computer system 4502.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 45. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed is:

1. A mobile management method comprising:

receiving from an application on a client a DNS query for a host name;

retrieving reputation data associated with the host name from a local cache on the client;

determining a policy for the host name, which is associated with the host name and the reputation data associated with the host name; and determining, based on the determined policy for the host name, an action for network flows to be taken, wherein the determined action for the network flows is selected from the group comprising:

sending the network flows through a VPN tunnel to a server, sending the network flows out of a local proxy on the client to a private or public network, and blocking the network flows;

sending at least network flow metadata to a collector on the client; and transmitting the network flow metadata in the collector to a VPN server pool via the VPN tunnel, wherein, whether the network flows are sent through the VPN tunnel, sent out of the local proxy or blocked, the network flow metadata is sent to the VPN server pool, and wherein the VPN server pool comprises a data gateway that receives the network flow metadata, and a data publisher coupled to the data gateway instructs at least one of:

a reporting engine to generate at least one of reports or dashboards; or a machine learning unit to find anomalies, determine cohorts, deduce trends, determine location boundaries, detect network security issues, detect compromised devices, and/or optimize network usage.

2. The mobile management method according to claim 1, wherein, based upon the found anomalies, determined cohorts, deduced trends, determined location boundaries, detected network security issues, detect compromised devices, and optimized network usage, the machine learning unit sends an alert to the VPN server pool; and the VPN server pool one of sends an alert to the client or sends an update to the client.

3. The mobile management method according to claim 1, wherein the machine learning unit comprises a data storage server collecting and storing network flow metadata from the VPN server pool and an analysis server, and the method further comprises:

aggregating in the analysis server the collected network flow metadata stored on the data storage server using statistical algorithms; and processing the aggregated metadata through machine learning algorithms to automatically detect at least one of abnormal data transfers or usage that is abnormal for a user of the client.

4. The mobile management method according to claim 1, further comprising updating the reputation data for the host name each time a DNS query for the host name is received by the client.

5. The mobile management method according to claim 4, wherein the updating of the reputation data for the host name comprises:

sending a request through the VPN tunnel to retrieve reputation data for the host name from the server; and receiving the retrieved reputation data for the host name from the server through the VPN tunnel.

6. The mobile management method according to claim 1, wherein, when the DNS query for the host name is resolved in the client, the method further comprises:

returning the resolved host name to the application;

receiving a request for forwarding the network flows to a remote host for the resolved host name;

retrieving reputation data associated with the remote host from the local cache on the client;

determining whether a policy associated with the remote host and the reputation data associated with the remote host exists; and one of:

sending the network flows one of: through a VPN tunnel to a server or out of a local proxy on the client to a private or public network; or blocking the network flows based on the determined policy for the remote host.

7. A mobile management method comprising:

receiving from an application on a client a DNS query for a host name;

retrieving reputation data associated with the host name from a local cache on the client;

determining a policy for the host name, which is associated with the host name and the reputation data associated with the host name;

determining, based on the determined policy for the host name, an action for network flows to be taken, wherein the determined action for the network flows is selected from the group comprising:

sending the network flows through a VPN tunnel to a server, sending the network flows out of a local proxy on the client to a private or public network, and blocking the network flows;

sending at least network flow metadata to a collector on the client; and transmitting the network flow metadata in the collector to a VPN server pool via the VPN tunnel, wherein the VPN server pool comprises a machine learning unit using artificial intelligence and machine learning to determine boundaries of normal locations of at least one of individual client devices or device cohorts and to detect when an individual device or device cohort is outside of the normal locations.

8. A mobile management method comprising:

receiving from an application on a client a DNS query for a host name;

retrieving reputation data associated with the host name from a local cache on the client;

determining a policy for the host name, which is associated with the host name and the reputation data associated with the host name; and determining, based on the determined policy for the host name, an action for network flows to be taken, wherein the determined action for the network flows is selected from the group comprising:

sending the network flows through a VPN tunnel to a server, sending the network flows out of a local proxy on the client to a private or public network, and blocking the network flows;

sending at least network flow metadata to a collector on the client; and transmitting the network flow metadata in the collector to a VPN server pool via the VPN tunnel, wherein the VPN server pool comprises a machine learning unit using artificial intelligence and machine learning to make findings and detections based upon at least the network flow metadata, and based on the findings and detections of the artificial intelligence and machine learning, the method further comprises at least one of:

allowing or blocking traffic;

switching between using different network interfaces;

using multiple network interfaces;

using or not using a proxy server;

switching between different proxy servers;

forcing compression between two devices;

forming forward error detection between two devices;

causing a device to launch an application;

causing a device to run diagnostics;

forcing advanced authentication;

enabling advanced logging;

throttling network usage;

limiting network destinations;

quarantining the device client; or forcing traffic through encrypted tunnels.

9. A mobile management method comprising:

receiving from an application on a client a DNS query for a host name;

retrieving reputation data associated with the host name from a local cache on the client;

determining a policy for the host name, which is associated with the host name and the reputation data associated with the host name; and determining, based on the determined policy for the host name, an action for network flows to be taken, wherein the determined action for the network flows is selected from the group comprising:

sending the network flows through a VPN tunnel to a server, sending the network flows out of a local proxy on the client to a private or public network, and blocking the network flows, and wherein, when the DNS query for the host name cannot be resolved in the client, the method further comprises:

sending the DNS query to a VPN server pool through the VPN tunnel;

receiving a resolved host name through the VPN tunnel and forwarding the resolved host name to the application;

receiving a request for forwarding the network flows to a remote host for the resolved host name;

retrieving reputation data associated with the remote host from the local cache on the client;

determining whether a policy associated with the remote host and the reputation data associated with the remote host exists; and one of:

sending the network flows one of: through a VPN tunnel to a server or out of a local proxy on the client to a private or public network; or blocking the network flows based on the determined policy for the remote host.

10. The mobile management method according to claim 9, wherein the client is a mobile client roaming between plural dissimilar networks, and wherein the DNS query is processed while the VPN tunnel is established over a first network and the network flows, to the remote host, are sent through the VPN tunnel while it is established over a second network dissimilar to the first network.

11. A mobile management method comprising:

receiving from an application on a client a DNS query for a host name;

retrieving reputation data associated with the host name from a local cache on the client;

determining a policy for the host name, which is associated with the host name and the reputation data associated with the host name; and determining, based on the determined policy for the host name, an action for network flows to be taken, wherein the determined action for the network flows is selected from the group comprising:

sending the network flows through a VPN tunnel to a server, sending the network flows out of a local proxy on the client to a private or public network, and blocking the network flows, and wherein, when the DNS query for the host name cannot be resolved in the client, the method further comprises:

sending the DNS query to a local network;

receiving a resolved host name through the local network and forwarding the resolved host name to the application;

receiving a request for forwarding the network flows to a remote host for the resolved host name;

retrieving reputation data associated with the remote host from a local cache on the client;

determining whether a policy associated with the remote host and the reputation data associated with the remote host exists; and one of:

sending the network flows one of: through a VPN tunnel to a server or out of a local proxy on the client to a private or public network; or blocking the network flows based on the determined policy for the remote host.

12. A mobile management method comprising:

sending at least network flow metadata to a collector on a client;

transmitting the network flow metadata in the collector to a VPN server pool via a VPN tunnel;

processing the network flow metadata to find and detect events and conditions within a network;

sending the found and detected events and conditions to the client;

determining whether a policy associated with the found and detected events and conditions exists; and changing at least one of network usage or device behaviors based on the determined policy, wherein, whether network flows are sent through the VPN tunnel, sent out of a local proxy or blocked, the network flow metadata is sent to a data gateway on a server, and wherein a data publisher coupled to the data gateway instructs at least one of:

a reporting engine to generate at least one of reports or dashboards; or a machine learning unit to find anomalies, determine cohorts, deduce trends, determine location boundaries, detect network security issues, detect compromised devices, and/or optimize network usage.

13. The mobile management method according to claim 12, wherein, based upon the found anomalies, determined cohorts, deduced trends, determined location boundaries, detected network security issues, detected compromised devices, and optimize optimized network usage, the machine learning unit sends an alert to the VPN server pool; and the VPN server pool one of sends an alert to the client or sends an update to the client.

14. The mobile management method according to claim 12, wherein the machine learning unit comprises a data storage server collecting and storing network flow metadata from the VPN server pool and an analysis server, and the method further comprises:

aggregating in the analysis server the collected network flow metadata stored on the data storage server using statistical algorithms; and processing the aggregated metadata through machine learning algorithms to automatically detect at least one of abnormal data transfers or usage that is abnormal for a user of the client.

15. The mobile management method according to claim 14, wherein the processing of the aggregated metadata through the machine learning algorithms comprises at least one of:

processing the aggregated metadata through a variational autoencoder machine learning algorithm to automatically find and detect the events and the conditions without human aid;

processing the aggregated metadata through an overcomplete autoencoder machine learning algorithm to automatically find and detect the events and the conditions without human aid; or processing the aggregated metadata through an undercomplete autoencoder machine learning algorithm to automatically find and detect the events and the conditions without human aid.

16. A mobile management method comprising:

sending at least network flow metadata to a collector on a client;

transmitting the network flow metadata in the collector to a VPN server pool via a VPN tunnel;

processing the network flow metadata to find and detect events and conditions within a network;

sending the found and detected events and conditions to the client;

determining whether a policy associated with the found and detected events and conditions exists; and changing at least one of network usage or device behaviors based on the determined policy, and wherein the VPN server pool comprises a machine learning unit using artificial intelligence and machine learning to determine boundaries of normal locations of at least one of individual client devices or device cohorts and to detect when an individual device or device cohort is outside of the normal locations.

17. A mobile management method comprising:

sending at least network flow metadata to a collector on a client;

transmitting the network flow metadata in the collector to a VPN server pool via a VPN tunnel;

processing the network flow metadata to find and detect events and conditions within a network;

sending the found and detected events and conditions to the client;

determining whether a policy associated with the found and detected events and conditions exists; and changing at least one of network usage or device behaviors based on the determined policy, and wherein the VPN server pool comprises a machine learning unit using artificial intelligence and machine learning to find and detect the events and the conditions based upon at least the network flow metadata, and based on the events and conditions found and detected by the artificial intelligence and machine learning, the method further comprises at least one of:

allowing or blocking traffic;

switching between using different network interfaces;

using multiple network interfaces;

using or not using a proxy server;

switching between different proxy servers;

forcing compression between two devices;

forming forward error detection between two devices;

causing a device to launch an application;

causing a device to run diagnostics;

forcing advanced authentication;

enabling advanced logging;

throttling network usage;

limiting network destinations;

quarantining the client; or forcing traffic through encrypted tunnels.

* * * * *